(12) United States Patent
Buckley et al.

(10) Patent No.: US 11,848,187 B2
(45) Date of Patent: Dec. 19, 2023

(54) MASS SPECTROMETER

(71) Applicant: Micromass UK Limited, Wilmslow (GB)

(72) Inventors: Frank Buckley, Warrington (GB); Roger Smith, Manchester (GB)

(73) Assignee: Micromass UK Limited, Wilmslow (GB)

( * ) Notice: Subject to any disclaimer, the term of this patent is extended or adjusted under 35 U.S.C. 154(b) by 0 days.

(21) Appl. No.: 17/718,526

(22) Filed: Apr. 12, 2022

(65) Prior Publication Data

US 2022/0246418 A1    Aug. 4, 2022

Related U.S. Application Data

(63) Continuation of application No. 17/056,990, filed as application No. PCT/GB2019/051510 on May 31, 2019, now Pat. No. 11,367,607.

(30) Foreign Application Priority Data

May 31, 2018 (GB) ...................................... 1808889
Nov. 5, 2018 (GB) ...................................... 1818003

(51) Int. Cl.
*H01J 49/40* (2006.01)
*H01J 49/02* (2006.01)
*H01J 49/10* (2006.01)
*H02M 1/14* (2006.01)
*H01J 49/00* (2006.01)
*H02M 1/00* (2006.01)

(52) U.S. Cl.
CPC ........ *H01J 49/401* (2013.01); *H01J 49/0086* (2013.01); *H01J 49/022* (2013.01); *H01J 49/10* (2013.01); *H01J 49/403* (2013.01); *H02M 1/14* (2013.01); *H02M 1/0016* (2021.05)

(58) Field of Classification Search
CPC ........ H01J 49/401; H01J 49/022; H01J 49/10; H01J 49/40; H01J 49/0086; H01J 49/403; H02M 1/14; H02M 1/0016
USPC ....................................................... 250/287
See application file for complete search history.

(56) References Cited

U.S. PATENT DOCUMENTS

| 6,305,975 | B1 | 10/2001 | Steiner |
| 6,570,152 | B1 | 5/2003 | Hoyes |
| 8,536,523 | B2 | 9/2013 | Li et al. |
| 2003/0050679 | A1 | 3/2003 | Park |
| 2005/0213353 | A1 | 9/2005 | Lys |
| 2007/0125954 | A1 | 6/2007 | Frosien |
| 2007/0200060 | A1 | 8/2007 | Russ et al. |

(Continued)

FOREIGN PATENT DOCUMENTS

| CN | 1447031 A | 10/2003 |
| CN | 103684817 A | 3/2014 |

(Continued)

*Primary Examiner* — Kiet T Nguyen
(74) *Attorney, Agent, or Firm* — Goodwin Procter LLP

(57) ABSTRACT

A drive unit for driving an acceleration electrode of a mass spectrometer is disclosed. The drive unit includes a power converter comprising a switching element and pulsing circuitry that can form output pulses suitable for driving an acceleration electrode of a mass spectrometer. The drive unit also includes a controller that is configured to synchronise operation of the switching element with the pulsing circuitry.

20 Claims, 42 Drawing Sheets

(56) References Cited

U.S. PATENT DOCUMENTS

| | | |
|---|---|---|
| 2007/0284520 A1 | 12/2007 | Yamamoto |
| 2008/0272289 A1 | 11/2008 | Vestal |
| 2010/0176292 A1 | 7/2010 | Yamauchi et al. |
| 2012/0085901 A1 | 4/2012 | Gilbert et al. |
| 2013/0015342 A1 | 1/2013 | Steiner et al. |
| 2014/0097338 A1 | 4/2014 | Eiler |
| 2015/0014524 A1 | 1/2015 | Chiappetta et al. |
| 2015/0107824 A1* | 4/2015 | Signorelli .............. H01G 11/62 166/244.1 |
| 2015/0228467 A1 | 8/2015 | Grinfeld et al. |
| 2015/0270115 A1 | 9/2015 | Furuhashi |
| 2017/0011897 A1 | 1/2017 | Yamaguchi |
| 2017/0169633 A1 | 6/2017 | Leung et al. |
| 2020/0312647 A1 | 10/2020 | Imazu et al. |

FOREIGN PATENT DOCUMENTS

| | | |
|---|---|---|
| CN | 104517798 A | 4/2015 |
| CN | 105030148 A | 11/2015 |
| CN | 105474351 A | 4/2016 |
| CN | 206955673 U | 2/2018 |
| EP | 3211781 A1 | 8/2017 |
| GB | 2443952 A | 5/2008 |
| GB | 2525960 A | 11/2015 |
| GB | 2530367 A | 3/2016 |
| JP | S63146963 U | 9/1988 |
| WO | 2011106640 A2 | 9/2011 |
| WO | 2012125318 A2 | 9/2012 |
| WO | 2012125381 A1 | 9/2012 |
| WO | 2015189550 A1 | 12/2015 |
| WO | 2017060991 A1 | 4/2017 |
| WO | 2019224948 A1 | 11/2019 |

\* cited by examiner

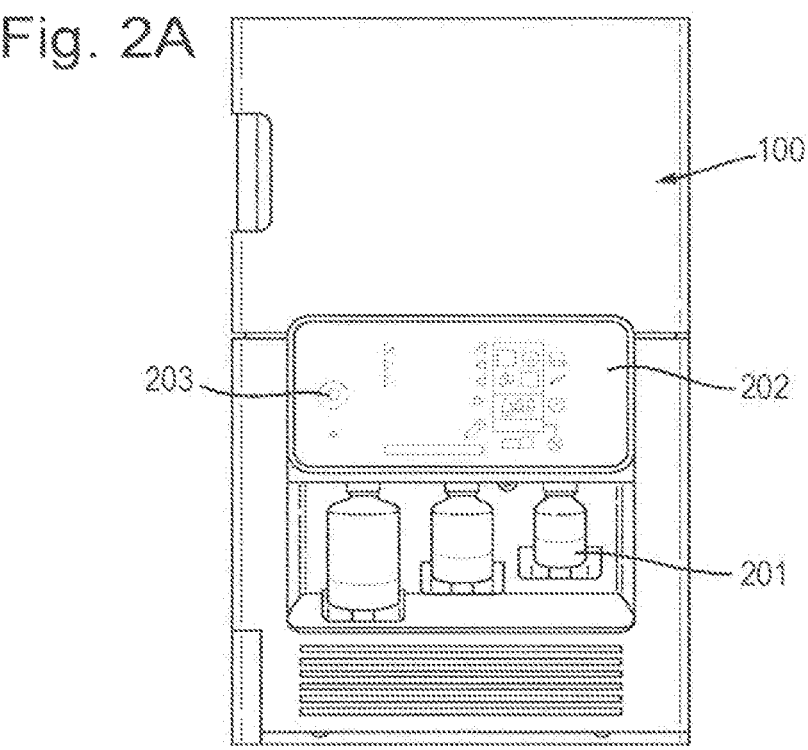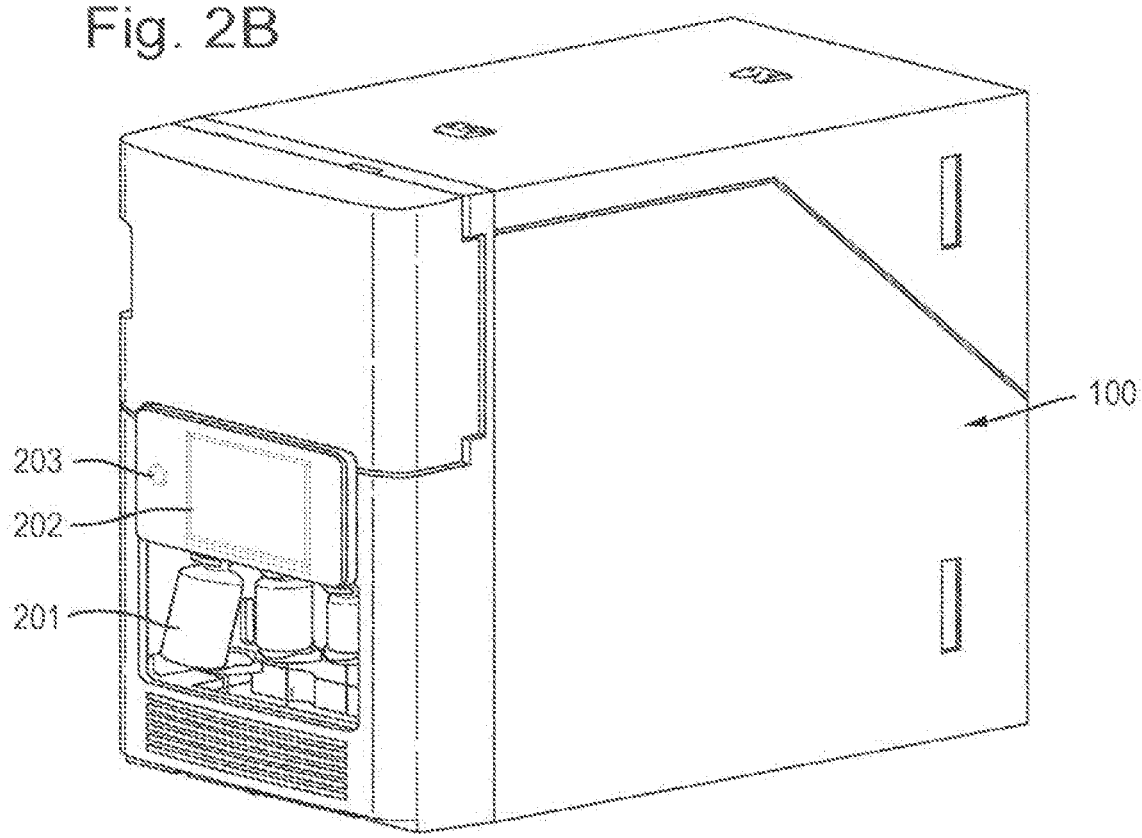

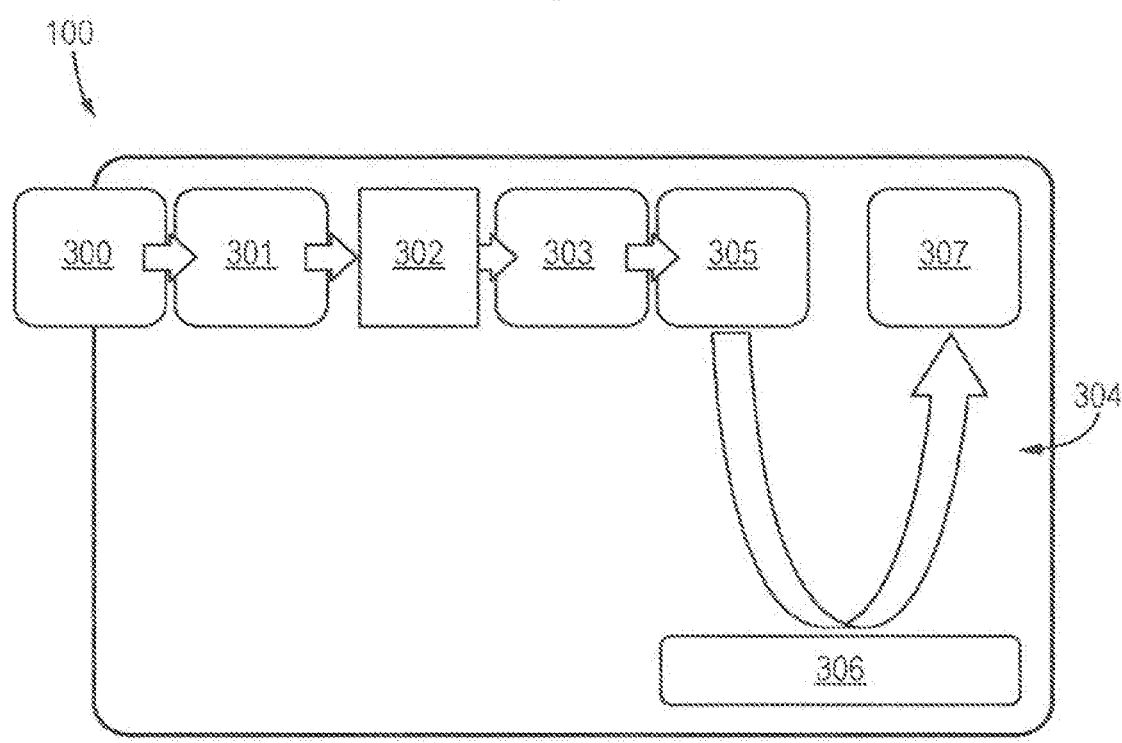

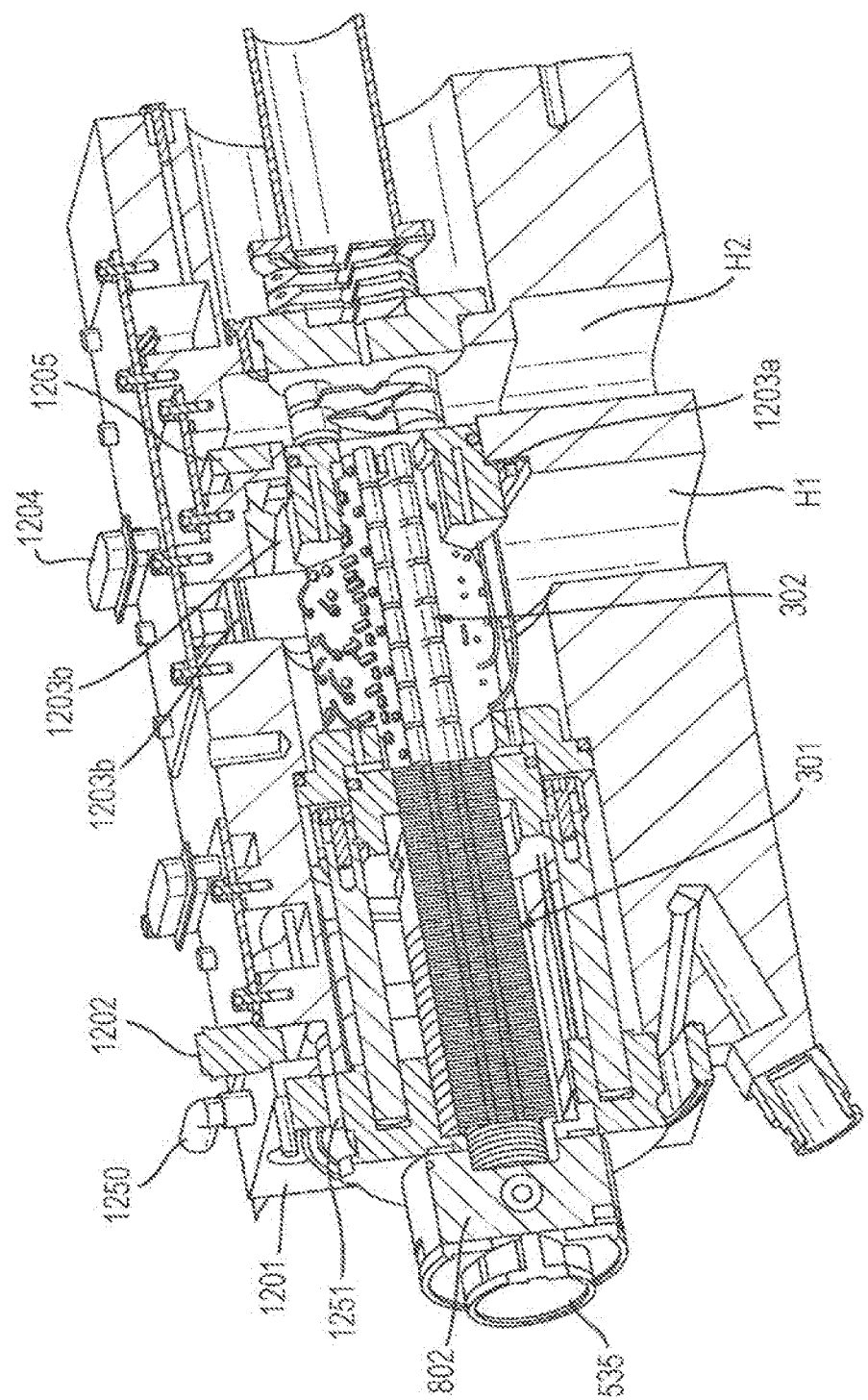

Fig. 16F

| Control Name | Relative voltage | | | Absolute volatge range (V) | Polarity* |
|---|---|---|---|---|---|
| | Range from (V) | Range (V) | w.r.t. | | |
| Capillary | 0 | 1500 | Ground | 1500 | Same |
| Source offset | 0 | 30 | Step 1 gradient | 400 | Same |
| Step 1 gradient | 0 | 30 | Step 1 offset | 370 | Same |
| Step 1 offset | 0 | 40 | Step 2 offset (cone) | 340 | Same |
| Step 2 gradient | 0 | 40 | Step 2 offset (cone) | 340 | Same |
| Step 2 offset (cone) | 0 | 200 | Aperture 1 | 300 | Same |
| Aperture 1 | 0 | 10 | Ion guide gradient | 100 | Same |
| Ion guide gradient | 0 | 5 | Ion guide offset A | 90 | Same |
| Ion guide offset A | 0 | 5 | Ion guide offset B (entrance) | 85 | Same |
| Ion guide offset B (entrance) | 0 | 80 | Ground | 80 | Same |
| Aperture 2 | 0 | 10 | Ion guide offset (entrance) | 80 | Opposite |
| Aperture 2 trap | 0 | 10 | Ion guide offset (entrance) | 90 | Same |
| Acceleration 1 | 0 | 100 | Ion guide offset (entrance) | 80 | Opposite |
| Acceleration 2 | 0 | 100 | Ion guide offset (entrance) | 80 | Opposite |
| Aperture 3 | 0 | 0 | Ground | 0 | n/a |
| Transport 1 | 0 | 100 | Ion guide offset (entrance) | 80 | Opposite |
| Transport 2 | 0 | 100 | Ion guide offset (entrance) | 85 | Opposite |
| Steering | -5 | 5 | Transport 2 | 85 | Opposite |
| Tube lens | 0 | 0 | Ground | 0 | n/a |
| Entrance plate | 0 | 0 | Ground | 0 | n/a |
| Pusher | 0 | 1100 | Ground | 1000 | Same |
| Pusher offset | -5 | 5 | Ground | 10 | Same |
| Third grid | 0 | 0 | Ground | 0 | n/a |
| Second grid | 0 | 0 | Ground | 0 | n/a |
| Flight tube | 0 | 4500 | Ground | 4500 | Opposite |
| Reflectron grid | 0 | 0 | Ground | 0 | n/a |
| Reflectron | 0 | 1725 | Ground | 1725 | Same |
| Detector | 0 | 4000 | Flight tube | 8500 | Positive |

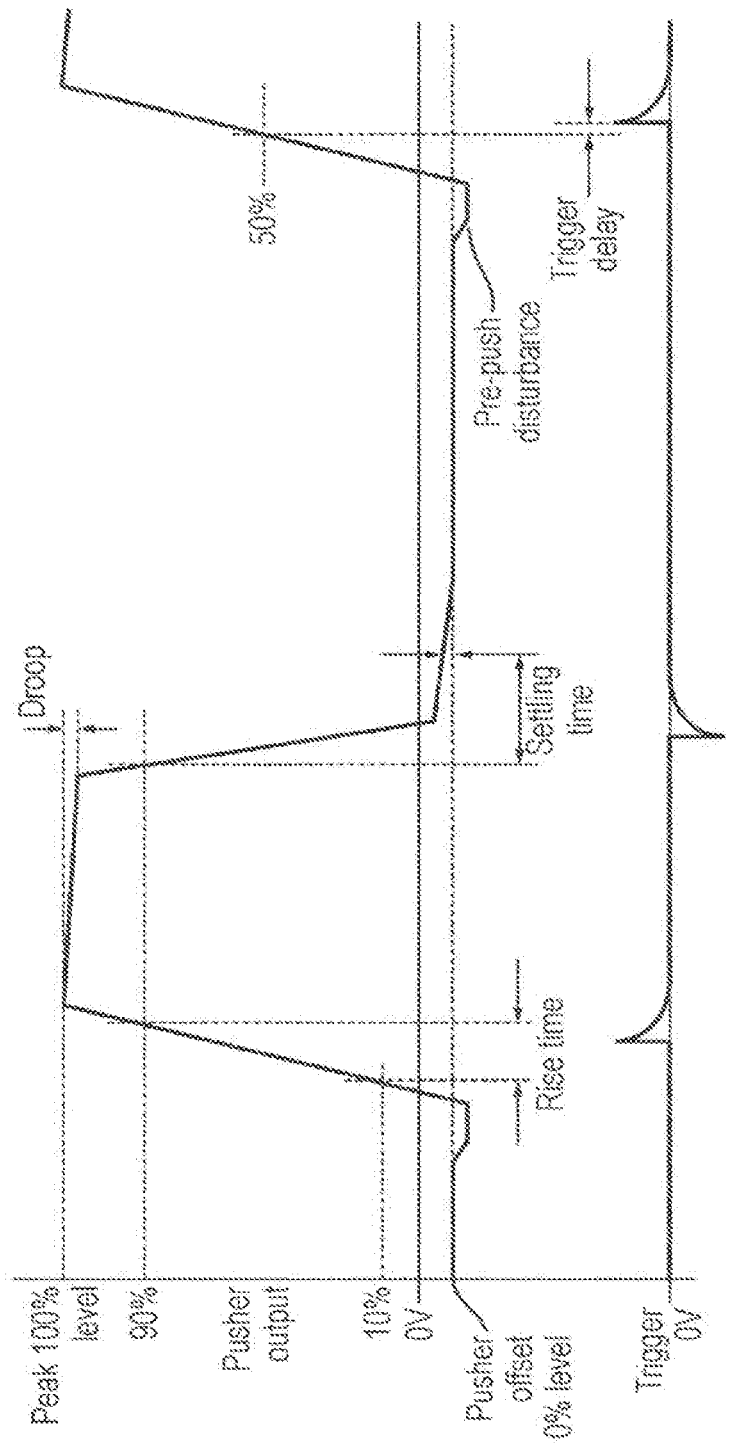

MASS SPECTROMETER

CROSS-REFERENCE TO RELATED APPLICATIONS

This application is a continuation of U.S. patent application Ser. No. 17/056,990, filed on Nov. 19, 2020, which is a national phase filing claiming the benefit of and priority to International Patent Application No. PCT/GB2019/051510, filed on May 31, 2019, which claims priority from and the benefit of United Kingdom patent application No. 1808889.8 filed on May 31, 2018 and United Kingdom patent application No. 1818003.4 filed on Nov. 5, 2018. The entire contents of these applications are incorporated herein by reference.

FIELD OF THE INVENTION

The present invention relates generally to analytical instruments such as mass spectrometers, and in particular to a drive unit for driving an acceleration electrode of a mass spectrometer.

BACKGROUND

The provision of a stable power supply is important for various components of a mass spectrometer. For example, in Time of Flight ("ToF") mass spectrometry, packets of ions are accelerated into a drift region by supplying high voltage pulses to an acceleration electrode. The resulting drift velocity of an ion, and so its drift time through the drift region, is related to the mass to charge ratio of the ion.

The high voltage pulses supplied to the acceleration electrode are provided using a high voltage power supply, such as a step-up converter. Variations in the output of the high voltage supply can reduce pulse shape uniformity, and ultimately mass resolution.

To reduce voltage ripple and improve pulse shape uniformity, filters comprising relatively large capacitors are typically added to such a converter's output.

The Applicants believe that there remains scope for improvements to mass spectrometers, and drive units for mass spectrometer acceleration electrodes.

SUMMARY

According to an aspect, there is provided a drive unit for producing electrical pulses for an acceleration electrode of a mass spectrometer, the drive unit comprising:

a power converter comprising a switching element; and pulsing circuitry operable to form electrical output pulses from an output of the power converter for an acceleration electrode of a mass spectrometer;

wherein the drive unit is configured such that the switching element is operated in synchronism with the pulsing circuitry.

Various embodiments are directed to a drive unit that can generate high voltage pulses to drive an acceleration electrode, such as a pusher and/or puller electrode, of a mass spectrometer. The drive unit comprises a power converter comprising a switching element, e.g. a switched mode power supply or a forward converter, and pulsing circuitry, e.g. comprising a switch, configured to form pulses from the output of the power converter, e.g. so as to form output pulses suitable for driving the acceleration electrode of the mass spectrometer.

According to various embodiments, the drive unit is configured such that the switching element is operated in synchronism with the pulsing circuitry, e.g. such that switching of the switching element is performed in synchronisation with formation of output pulses by the pulsing circuitry.

In this regard, conventional power converters are generally operated at relatively high frequencies compared to the operating frequency of the pulsing circuitry. This is because the performance, e.g. power conversion efficiency and ripple, of the power converter is in general improved by using such frequencies.

The Applicants have now recognised that it is possible to operate the power converter of the drive unit at a frequency that corresponds to the operating frequency of the pulsing circuitry (e.g. of around 1 to 100 kHz), and moreover that doing this can improve performance of the overall mass spectrometer (despite reducing the performance, including the efficiency and ripple, of the power converter).

In particular, and as will be described in more detail below, by synchronising the operation of the switching element with the pulsing circuitry (e.g. by synchronising formation of output pulses with the switching of the switching element), each electrical pulse output by the drive unit can be generated at the same point in the switching cycle, and so the output ripple cycle, of the power converter. This has the effect of substantially improving the uniformity of the output pulses produced by the drive unit, and means, e.g., that the drive unit can output pulses each having substantially the same pulse shape, even where the output of the power converter suffers from ripple.

This also means that the requirements for filtering the output from the power converter, i.e. to reduce ripple, can be reduced. Thus, for example, fewer and/or smaller capacitors can be used for output filtering, while maintaining sufficient pulse shape uniformity. Accordingly, various embodiments can provide a relatively simple and inexpensive drive unit for an acceleration electrode of a mass spectrometer.

It will be appreciated, therefore, that various embodiments provide an improved mass spectrometer, and in particular, an improved drive unit for an acceleration electrode of a mass spectrometer.

The power converter may comprise a step-up converter.

The power converter may be configured to step up the voltage of an input to provide the output, wherein the voltage of the output is higher than the voltage of the input.

The power converter may comprise a DC-DC step-up converter configured to step-up the voltage of a DC input to provide a DC output, wherein the voltage of the DC output is higher than the voltage of the DC input.

The power converter may comprise a forward converter.

The power converter may comprise a voltage multiplier.

The forward converter may comprise a planar transformer.

The pulsing circuitry may comprise a switch.

The switch may be switched or pulsed to form the output pulses.

The switch may be a changeover switch.

The pulsing circuitry may further comprise polarity circuitry configured to control the polarity of the output pulses.

The polarity of the output pulses may be positive or negative.

The pulsing circuitry may further comprise offset circuitry configured to control an offset voltage $V_{offset}$ of the output pulses.

The offset voltage $V_{offset}$ may be selected from the group consisting of: (i) $<-10V$; (ii) $-10V$ to $-5V$; (iii) $-5V$ to $0V$; (iv) $0V$ to $5V$; (v) $5V$ to $10V$; and (vi) $>10V$.

The output pulses may be substantially square wave voltage pulses.

The peak voltage amplitude of the output pulses may be selected from the group consisting of: (i) <600V; (ii) 600V to 700V; (iii) 700V to 800V; (iv) 800V to 900V; (v) 900V to 1000V; (vi) 1000V to 1100V; and (vii) >1100V.

The output pulses may be formed periodically with a period $T_{pulse}$.

The period $T_{pulse}$ may be selected from the group consisting of: (i) <1 μs; (ii) 1 μs to 2 μs; (iii) 2 μs to 10 μs; (iv) 10 μs to 20 μs; (v) 20 μs to 50 μs; (vi) 50 μs to 70 μs; (vii) 70 μs to 85 μs; (viii) 85 μs to 100 μs; and (ix) >100 μs.

The switching element and the pulsing circuitry may be operated with the same frequency.

The switching element may be switched periodically with a period $T_{switch}$; wherein $T_{switch}=T_{pulse}$.

The switching element may be switched after a predetermined time delay $T_{delay}$ after formation of an output pulse by the pulsing circuitry.

$T_{delay}$ may be selected from the group consisting of: (i) <0 ns; (ii) 0 ns to 50 ns; (iii) 50 ns to 100 ns; (iv) 100 ns to 1 μs; (v) 1 μs to 10 μs; (vi) 10 μs to 50 μs; (vii) 50 μs to 85 μs; (viii) 85 μs to 100 μs; and (ix) >100 μs.

The ratio between the predetermined time delay $T_{delay}$ and the pulsing period $T_{pulse}$, $T_{delay}/T_{pulse}$, may be selected from the group consisting of: (i) <0.001%; (ii) 0.001% to 0.01%; (iii) 0.01% to 0.1%; (iv) 0.1% to 0.5%; (v) 0.5% to 1%; (vi) 1% to 10%; and (vii) >10%.

The switching element and the pulsing circuitry may be operated in synchronism by operating the switching element and the pulsing circuitry using the same clock signal.

The drive unit may comprise control circuitry configured to synchronise the switching element with the pulsing circuitry.

The control circuitry may comprise a field programmable gate array ("FPGA").

The control circuitry may be configured to synchronise the switching element with the pulsing circuitry by causing gate pulses to be applied to a gate electrode of the switching element in synchronisation with the pulsing circuitry.

The control circuitry may further comprise feedback and/or feedforward circuitry configured to control the voltage of the output.

The feedback and/or feedforward circuitry may be configured to control the voltage of the output by controlling the width of the gate pulses based on an output voltage feedback signal and/or an input voltage feedforward signal.

The width of a gate pulse may be selected from the group consisting of: (i) <1 μs; (ii) 1 μs to 3 μs; (iii) 3 μs to 5 μs; (iv) 5 μs to 7 μs; (v) 7 μs to 8 μs; and (vi) >8 μs.

The feedback and/or feedforward circuitry may be operable to control the width of the gate pulses with a resolution selected from the group consisting of: (i) <1 ns; (ii) 1 ns to 5 ns; (iii) 5 ns to 10 ns; (iv) 10 ns to 20 ns; and (v) >10 ns.

The drive unit may be configured to control the power converter by controlling the width of the gate pulses applied to the gate electrode of the switching element.

The drive unit may be configured to, in response to a change in a desired parameter for the electrical output pulses, cause the gate pulses to be applied to the gate electrode of the switching element at a selected rate for a selected time period.

The drive unit may comprise:

processing circuitry configured to predict the effect of a change in a desired parameter for the electrical output pulses on an output voltage of the power converter; and control circuitry configured to control the power converter based on the prediction.

The parameter for the electrical output pulses comprises: (i) a voltage amplitude; (ii) a voltage polarity; (iii) a pulse period; (iv) a pulse width; and/or (v) an inter-pulse period; of the electrical output pulses.

The control circuitry may further comprise an oscilloscope, wherein the drive unit is configured such that the electrical output pulses produced by the drive unit are supplied to the oscilloscope.

The drive unit may comprise:

measuring circuitry configured to measure an output voltage of the power converter; and control circuitry configured to control the power converter based on the measured output voltage.

The drive unit may comprise:

measuring circuitry configured to measure an input voltage to the power converter; and control circuitry configured to control the power converter based on the measured input voltage.

According to another aspect there is provided a mass spectrometer comprising:

a Time of Flight (ToF) mass analyser comprising an acceleration electrode; and a drive unit as described above;

wherein the mass spectrometer is configured such that electrical output pulses produced by the drive unit are supplied to the acceleration electrode.

The mass spectrometer may comprise damping circuitry configured to damp the electrical output pulses produced by the drive unit before the electrical output pulses are supplied to the acceleration electrode. The damping circuitry may comprise one or more damping resistors.

The mass spectrometer may comprise a conductive pin configured to supply the electrical output pulses produced by the drive unit to the acceleration electrode.

The conductive pin may be spring loaded.

The Time of Flight ("ToF") mass analyser may comprise a field free or drift region.

The Time of Flight ("ToF") mass analyser may be configured to cause ions to be accelerated into the field free or drift region as a result of an output pulse being supplied to the acceleration electrode.

According to another aspect, there is provided a method of generating electrical pulses for an acceleration electrode of a mass spectrometer, the method comprising:

forming, from an output of a power converter comprising a switching element, electrical output pulses for an acceleration electrode of a mass spectrometer; and operating the switching element in synchronism with the electrical output pulses.

The power converter may comprise a step-up converter.

The method may comprise the power converter stepping up the voltage of an input to provide the output, wherein the voltage of the output is higher than the voltage of the input.

The method may comprise the power converter stepping up the voltage of a DC input to provide a DC output, wherein the voltage of the DC output is higher than the voltage of the DC input.

The power converter may comprise a forward converter.

The power converter may comprise a voltage multiplier.

The forward converter may comprise a planar transformer.

The method may comprise forming the output pulses by switching or pulsing a switch.

The switch may comprise a changeover switch.

The method may comprise controlling the polarity of the output pulses.

The polarity of the output pulses may be positive or negative.

The method may comprise controlling an offset voltage $V_{offset}$ of the output pulses.

The offset voltage $V_{offset}$ may be selected from the group consisting of: (i) <−10V; (ii) −10V to −5V; (iii) −5V to 0V; (iv) 0V to 5V; (v) 5V to 10V; and (vi) >10V.

The output pulses may be substantially square wave voltage pulses.

The peak voltage amplitude of the output pulses may be selected from the group consisting of: (i) <600V; (ii) 600V to 700V; (iii) 700V to 800V; (iv) 800V to 900V; (v) 900V to 1000V; (vi) 1000V to 1100V; and (vii) >1100V.

The method may comprise forming the output pulses periodically with a period $T_{pulse}$.

The pulsing period $T_{pulse}$ may be selected from the group consisting of: (i) <1 µs; (ii) 1 µs to 2 µs; (iii) 2 µs to 10 µs; (iv) 10 µs to 20 µs; (v) 20 µs to 50 µs; (vi) 50 µs to 70 µs; (vii) 70 µs to 85 µs; (viii) 85 µs to 100 µs; and (ix) >100 µs.

The method may comprise forming the output pulses and operating the switching element with the same frequency.

The method may comprise switching the switching element periodically with a period $T_{switch}$; wherein $T_{switch}=T_{pulse}$.

The method may comprise switching the switching element after a predetermined time delay $T_{delay}$ from forming an output pulse.

$T_{delay}$ may be selected from the group consisting of: (i) <0 ns; (ii) 0 ns to 50 ns; (iii) 50 ns to 100 ns; (iv) 100 ns to 1 µs; (v) 1 µs to 10 µs; (vi) 10 µs to 50 µs; (vii) 50 µs to 85 µs; (viii) 85 µs to 100 µs; and (ix) >100 µs.

The ratio between the predetermined time delay $T_{delay}$ and the pulsing period $T_{pulse}$, $T_{delay}/T_{pulse}$, may be selected from the group consisting of: (i) <0.001%; (ii) 0.001% to 0.01%; (iii) 0.01% to 0.1%; (iv) 0.1% to 0.5%; (v) 0.5% to 1%; (vi) 1% to 10%; and (vii) >10%.

The method may comprise operating the switching element in synchronism with the electrical output pulses by operating the switching element and forming the output pulses using the same clock signal.

The method may comprise operating the switching element in synchronism with the electrical output pulses by causing gate pulses to be applied to a gate electrode of the switching element in synchronisation with the output pulses.

The method may comprise controlling the voltage of the output of the power converter using feedback and/or feedforward circuitry.

The method may comprise controlling the voltage of the output of the power converter by controlling the width of the gate pulses based on an output voltage feedback signal and/or an input voltage feedforward signal.

The width of a gate pulse may be selected from the group consisting of: (i) <1 µs; (ii) 1 µs to 3 µs; (iii) 3 µs to 5 µs; (iv) 5 µs to 7 µs; (v) 7 µs to 8 µs; and (vi) >8 µs.

The method may comprise controlling the width of the gate pulses with a resolution selected from the group consisting of: (i) <1 ns; (ii) 1 ns to 5 ns; (iii) 5 ns to 10 ns; (iv) 10 ns to 20 ns; and (v) >10 ns.

The method may comprise controlling the power converter by controlling the width of the gate pulses applied to the gate electrode of the switching element.

The method may comprise, in response to a change in a desired parameter for the electrical output pulses, causing the gate pulses to be applied to the gate electrode of the switching element at a selected rate for a selected time period.

The method may comprise:
predicting the effect of a change in a desired parameter for the electrical output pulses on an output voltage of the power converter; and
controlling the power converter based on the prediction.

The parameter for the electrical output pulses comprises: (i) a voltage amplitude; (ii) a voltage polarity; (iii) a pulse period; (iv) a pulse width; and/or (v) an inter-pulse period; of the electrical output pulses.

The method may comprise supplying the electrical output pulses to an oscilloscope.

The method may comprise:
measuring an output voltage of the power converter; and
controlling the power converter based on the measured output voltage.

The method may comprise:
measuring an input voltage to the power converter; and
controlling the power converter based on the measured input voltage.

According to another aspect, there is provided a method of mass spectrometry comprising:
generating electrical output pulses using a method as described above; and
supplying the electrical output pulses to an acceleration electrode of a Time of Flight (ToF) mass analyser.

The method may comprise damping the output pulses supplied to the acceleration electrode of the mass analyser.

The method may comprise accelerating ions into a field free or drift region of the Time of Flight ("ToF") mass analyser as a result of an output pulse being supplied to the acceleration electrode.

According to an aspect, there is provided a drive unit for producing electrical pulses for an acceleration electrode of a mass spectrometer, the drive unit comprising:
a power converter;
pulsing circuitry operable to form electrical output pulses from an output of the power converter for an acceleration electrode of a mass spectrometer; and
an oscilloscope, wherein the drive unit is configured such that electrical output pulses produced by the drive unit are supplied to the oscilloscope.

According to an aspect there is provided a mass spectrometer comprising:
a Time of Flight (ToF) mass analyser comprising an acceleration electrode; and
the drive unit described above;
wherein the mass spectrometer is configured such that electrical output pulses produced by the drive unit are supplied to the acceleration electrode.

The drive unit and/or the oscilloscope may comprise an analogue to digital converter configured to digitise the electrical output pulses.

The pulsing circuitry may be configured to form electrical output pulses that repeat periodically with a pulse period $T_{pulse}$.

The oscilloscope and/or the analogue to digital converter may be configured to digitise the electrical output pulses during a first pulse period $T^1_{pulse}$ using a first sequence of sampling points, and to digitise the electrical output pulses during a second pulse period $T^2_{pulse}$ using a second sequence of sampling points.

The second pulse period $T^2_{pulse}$ may immediately follow the first pulse period $T^1_{pulse}$.

The oscilloscope and/or the analogue to digital converter may be configured to digitise the electrical output pulses during one or more third pulse periods.

The one or more third periods may immediately follow the second pulse period.

The oscilloscope and/or the analogue to digital converter may be configured to periodically digitise (sample) the electrical output pulses during each pulse period with a sampling period $T_{sampling}$.

An initial sampling point of the first sequence of sampling points may have a first offset time with respect to a start time of the first pulse period $T^1_{pulse}$, and an initial sampling point of the second sequence of sampling points may have a second different offset time with respect to a start time of the second pulse period $T^2_{pulse}$.

Each initial sampling point of each of the one or more third sequences of sampling points may have one or more third different offset times with respect to a respective start time of the one or more third pulse periods.

The drive unit and/or the mass spectrometer may be configured to combine (interleave) samples from the first, second and optionally one or more third sequences of sampling points to produce a digitised representation of an electrical output pulse.

The drive unit and/or the mass spectrometer may be configured to analyse the digitised representation of the electrical output pulse to determine one or more diagnostic parameters of the electrical output pulses. The one or more diagnostic parameters may be selected from: (i) a rise time; (ii) a fall time; (iii) a peak amplitude; and/or (iv) one or more other characteristics, of the electrical output pulses. The one or more other characteristics may be selected from: (i) overshoot; (ii) undershoot; (iii) droop; (iv) pre-push disturbance; (v) post-push disturbance; and (vi) another characteristic or characteristics.

According to another aspect, there is provided a method of operating a drive unit for producing electrical pulses for an acceleration electrode of a mass spectrometer, the method comprising:

the drive unit forming electrical output pulses for an acceleration electrode of a mass spectrometer; and supplying the electrical output pulses to an oscilloscope of the drive unit.

According to another aspect, there is provided a method of operating a mass spectrometer, the method comprising:

forming electrical output pulses for an acceleration electrode of a mass spectrometer; and supplying the electrical output pulses to an oscilloscope of the mass spectrometer.

The method may comprise supplying the electrical output pulses to an acceleration electrode of a Time of Flight (ToF) mass analyser of the mass spectrometer.

The method may comprise digitising the electrical output pulses using an analogue to digital converter.

The method may comprise forming electrical output pulses that repeat periodically with a pulse period $T_{pulse}$.

The method may comprise digitising the electrical output pulses during a first pulse period $T^1_{pulse}$ using a first sequence of sampling points, and digitising the electrical output pulses during a second pulse period $T^2_{pulse}$ using a second sequence of sampling points.

The second pulse period $T^2_{pulse}$ may immediately follow the first pulse period $T^1_{pulse}$.

The method may comprise digitising the electrical output pulses during one or more third pulse periods.

The one or more third periods may immediately follow the second pulse period.

The method may comprise periodically digitising (sampling) the electrical output pulses during each pulse period with a sampling period $T_{sampling}$.

An initial sampling point of the first sequence of sampling points may have a first offset time with respect to a start time of the first pulse period $T^1_{pulse}$, and an initial sampling point of the second sequence of sampling points may have a second different offset time with respect to a start time of the second pulse period $T^2_{pulse}$.

Each initial sampling point of each of the one or more third sequences of sampling points may have one or more third different offset times with respect to a respective start time of the one or more third pulse periods.

The method may comprise combining (interleaving) samples from the first, second and optionally one or more third sequences of sampling points to produce a digitised representation of an electrical output pulse.

The method may comprise analysing the digitised representation of the electrical output pulse to determine one or more diagnostic parameters of the electrical output pulses. The one or more diagnostic parameters may be selected from: (i) a rise time; (ii) a fall time; (iii) a peak amplitude; and/or (iv) one or more other characteristics, of the electrical output pulses. The one or more other characteristics may be selected from: (i) overshoot; (ii) undershoot; (iii) droop; (iv) pre-push disturbance; (v) post-push disturbance; and (vi) another characteristic or characteristics.

Although various embodiments relate to output pulses produced by the acceleration electrode drive unit being measured by the oscilloscope, other embodiments are also contemplated where other mass spectrometer voltages, such as a voltage applied to an ion guide, are also or instead measured by the oscilloscope.

Thus, according to another aspect of the present invention, there is provided a mass spectrometer comprising:

one or more electrodes;

output circuitry operable to form one or more output voltages and to apply the one or more output voltages to the one or more electrodes of the mass spectrometer; and an oscilloscope, wherein the mass spectrometer is configured such that the one or more output voltages produced by the output circuitry are supplied to the oscilloscope.

The one or more electrodes may comprise one or more electrodes of one or more of: an ion source, an ion guide, ion optics, a ToF acceleration electrode, and the like.

The oscilloscope may digitise the one or more output voltages to form one or more digitised representations of the one or more output voltages.

The oscilloscope and/or the mass spectrometer may comprise a processor configured to automatically analyse the one or more digitised representations of the one or more output voltages to determine one or more diagnostic parameters.

According to another aspect of the present invention, there is provided a method of mass spectrometry comprising:

providing a mass spectrometer comprising one or more electrodes, and an oscilloscope; forming one or more output voltages;

applying the one or more output voltages to the one or more electrodes; and supplying the one or more output voltages to the oscilloscope.

The one or more electrodes may comprise one or more electrodes of one or more of: an ion source, an ion guide, ion optics, a ToF acceleration electrode, and the like.

The oscilloscope may digitise the one or more output voltages to form one or more digitised representations of the one or more output voltages.

The method may comprise automatically analysing the one or more digitised representations of the one or more output voltages to determine one or more diagnostic parameters.

Although various embodiments relate to operating the switching element of the power converter of the acceleration electrode drive unit in synchronisation with the pulsing circuitry, other embodiments are also contemplated where the switching element of another mass spectrometer power converter is operated in synchronisation with the pulsing circuitry.

Thus, according to another aspect of the present invention, there is provided a mass spectrometer comprising:

a power converter comprising a switching element; and pulsing circuitry operable to form electrical output pulses for an acceleration electrode of the mass spectrometer;

wherein the mass spectrometer is configured such that the switching element is operated in synchronisation with the pulsing circuitry.

The pulsing circuitry may be operable to form electrical output pulses from an output of the power converter. Alternatively, the pulsing circuitry may be operable to form electrical output pulses from an output of a second different power converter.

The output of the power converter may be supplied to one or more of: an ion source; one or more ion guides; a detector; ion optics, and the like, of the mass spectrometer.

According to another aspect of the present invention, there is provided a method of mass spectrometry comprising:

forming electrical output pulses for an acceleration electrode of a mass spectrometer; and operating a switching element of a power converter of the mass spectrometer in synchronism with the electrical output pulses.

The electrical output pulses may be formed from an output of the power converter. Alternatively, the electrical output pulses may be formed from an output of a second different power converter.

The output of the power converter may be supplied to one or more of: an ion source; one or more ion guides; a detector; ion optics, and the like, of the mass spectrometer.

According to an aspect there is provided a mass spectrometer comprising:

a power converter configured to convert an input voltage to an output voltage;

measuring circuitry configured to measure the input voltage; and control circuitry configured to control the power converter based on the measured input voltage.

The output of the power converter may be supplied to one or more of: an ion source; one or more ion guides; a detector; ion optics, and the like, of the mass spectrometer.

The mass spectrometer may comprise pulsing circuitry operable to form electrical output pulses from the output of the power converter. The output pulses may be suitable for supplying to an acceleration electrode of the mass spectrometer.

The mass spectrometer may comprise:

processing circuitry configured to predict the effect of a change in a desired parameter for the electrical output pulses on the power converter output voltage; and control circuitry configured to control the power converter based on the prediction.

According to an aspect there is provided a mass spectrometer comprising:

a power converter configured to convert an input voltage to an output voltage;

pulsing circuitry operable to form electrical output pulses from the output of the power converter;

processing circuitry configured to predict the effect of a change in a desired parameter for the electrical output pulses on the power converter output voltage; and control circuitry configured to control the power converter based on the prediction.

Various embodiments are directed to a mass spectrometer having a power converter that is controlled based on its input voltage and/or based on a prediction of the effect on the output voltage of a change in a desired parameter for electrical output pulses to be formed from the output voltage, e.g. such as a change in a desired output voltage (output voltage set-point).

Thus, the output voltage of the power converter may be controlled based on a change to the input voltage and/or based on a change to one or more desired electrical output pulse parameters. In other words, various embodiments are directed to a mass spectrometer having a power converter that is (and whose output voltage is) controlled based on a feedforward signal (a signal that is fed forward to the power converter), the feedforward signal being based on an input voltage and/or based on (prediction of the effect of) a change to a desired electrical output pulse parameter.

By controlling the power converter based on a feedforward signal, the operation of the power converter can be adjusted to take into account input variations that it is known (in advance) will affect the output of the power converter. This can be contrasted with controlling the power converter based on a feedback signal, whereby the operation of the power converter is adjusted according to variations measured on the output of the power converter.

Thus, in various embodiments, the power converter can be controlled based on the (DC) voltage of input electrical power supplied to the power converter, whereby a change in the input voltage is fed forward to the power converter, and the operation of the power converter is adjusted accordingly so that the output voltage generated by the power converter remains substantially constant, despite the change in input voltage.

By using a feedforward signal in this manner, a change in input voltage can be taken into account (and compensated for) before any effects of the change are seen on the output voltage, and so before any feedback signals have had chance to compensate for the change.

In this regard, the Applicants have recognised that the input voltage to the power converter can affect the output voltage, and that a feedforward signal based on the input voltage can be used to correct the output voltage sooner than would be possible by using only a feedback signal based on the output voltage.

In various embodiments, the power converter can additionally or alternatively be controlled based on a prediction of the effect of a change to a desired voltage pulse parameter.

The voltage pulse parameter can be any parameter, the changing of which may affect output pulse formation. The voltage pulse parameter may be a parameter for which it is known that changing the parameter will cause the output (voltage) of the power converter to change. Moreover, the effect of changing the voltage pulse parameter on the power converter output may be predictable.

Thus, in various embodiments, the control circuitry is operable to control the power converter according to a prediction of the effect of changing the voltage pulse parameter on the power converter output (voltage).

In this regard, the Applicants have recognised that changes to desired voltage pulse parameters, such as an output voltage set-point, can affect the stability of the output of the power converter. Moreover, such effects may be predictable. Accordingly, by using a feedforward signal based on (a prediction of the effect of) such a change to a voltage pulse parameter, any variations to the output voltage of the power converter resulting from the change to the voltage pulse parameter can be corrected sooner than would be possible by using only a feedback signal based on the output voltage.

It will be appreciated therefore, that by controlling the power converter based on the input voltage and/or based on a prediction of the effect on the output voltage of a change in a desired parameter for electrical output pulses to be formed from the output voltage in the manner of various embodiments, the output of the power converter can be made more robust and stable with respect to input variations.

This means that the requirements for filtering the output from the power converter, i.e. to reduce ripple, can be reduced. Thus, for example, fewer and/or smaller capacitors can be used for output filtering, while maintaining sufficient output uniformity. Accordingly, various embodiments can provide a relatively simple, inexpensive and stable power supply for a mass spectrometer.

It will be appreciated, therefore, that various embodiments provide an improved mass spectrometer, and in particular, an improved drive unit for an acceleration electrode of a mass spectrometer.

The parameter for the electrical output pulses may comprise: (i) a voltage amplitude; (ii) a voltage polarity; (iii) a pulse period; (iv) a pulse width; and/or (v) an inter-pulse period; of the electrical output pulses.

The mass spectrometer may comprise a Time of Flight (ToF) mass analyser comprising an acceleration electrode.

The mass spectrometer may be configured such that the electrical output pulses are supplied to the acceleration electrode.

The Applicants have recognised that it is particularly desirable to be able to control the stability of a power converter that is generating an output for forming electrical output pulses for supplying to an acceleration electrode of a Time of Flight (ToF) mass spectrometer. By controlling the output voltage of the power converter based on a feedforward signal, power converter output uniformity, and so pulse uniformity, can be improved. This can help to provide improve mass resolution, for example.

The power converter may comprise a step-up converter comprising a switching element. Thus, the power converter may be a switched mode power supply.

The mass spectrometer may comprise synchronisation circuitry configured to synchronise the switching element with the pulsing circuitry. Synchronising the switching element with the pulsing circuitry can improve uniformity of output pulses since each output pulse can be generated at the same point in the switching cycle, and so the output ripple cycle, of the power converter.

The switching element may comprise a gate electrode.

The control circuitry may comprise pulse generating circuitry configured to generate gate pulses to be applied to a gate electrode of the switching element.

The control circuitry may be configured to control the power converter by controlling one or more properties of gate pulses applied to the gate electrode of the switching element (based on the feedforward (and feedback) signal).

The control circuitry may be configured to control the power converter based on the measured input voltage by controlling the width of the gate pulses applied to the gate electrode of the switching element.

The control circuitry may be configured to cause the pulse generating circuitry to generate (apply) gate pulses at a selected (predetermined (fixed)) rate for a selected time period in response to a change in a desired parameter for the electrical output pulses. The selected time period may be a predetermined (fixed) time period, or may continue until an output voltage criterion has been satisfied. The output voltage criterion may comprise reaching a predetermined output voltage.

The mass spectrometer may comprise a master power supply configured to supply the input voltage to the power converter. The master power supply may be a mains power supply, e.g. an AC to DC PSU.

The mass spectrometer may comprise one or more operational units, wherein the master power supply is configured to supply (DC) electrical power to each of the one or more operational units.

The master power supply may supply the same (DC) voltage to each of the one or more operational units and to the power converter.

At least one of the one or more operational units may comprise a heater. Thus at least one of the one or more operational units may be a heater unit. The heater may be, e.g. an ion source heater and/or a desolvation heater.

The control circuitry may control the power converter based on (a measured change in the input voltage due to or a prediction of the effect on the power converter output voltage of) a change to an input operational parameter of the one or more operational units.

In this regard, the Applicants have recognised that where a single master power supply is supplying (DC) electrical power to a power converter as well as to another operational unit (or units) of the mass spectrometer, such as and in particular one or more heater units, changes in the operation of the operational unit (heater unit) may affect the (DC) input supplied by the master power supply to the power converter. This may occur, for example, when an operational unit (heater unit) (abruptly) increases or decreases its load on the master power supply.

For example, a heater of a heater unit turning on and/or off may cause a large load change which can cause a variation in the (DC) voltage of the input electrical power supplied by the master power supply to the power converter, which can lead to a variation on the output of the power converter.

The Applicants have recognised that in the particular case of a mass spectrometer comprising a master power supply that supplies (DC) electrical power to one or more heaters, as well as to a power converter which is operating to generate an output voltage for driving an acceleration electrode of a Time of Flight (ToF) mass spectrometer, a heater turning on and/or off can cause variations on the output of the power converter which can degrade the uniformity of output pulses supplied to the acceleration electrode. This can ultimately degrade mass resolution of the Time of Flight (ToF) mass spectrometer.

Controlling the power converter according to a feedforward signal based on a measured change in input voltage supplied to the power converter and/or based on a prediction of the effect of turning on and/or off of the heater can accordingly help to control any variations in the output of the power converter that could arise as a result of the heater turning on and/or off. This can result in improved pulse uniformity, and so improved mass resolution.

The mass spectrometer may comprise:

measuring circuitry configured to measure the output voltage; and control circuitry configured to control the power converter based on the measured output voltage.

Thus, the control circuitry may additionally be operable to control the power converter based on a feedback signal. The feedback signal should be based on an output (voltage) of the power converter. The feedback signal may be based on an (peak) output voltage of the output pulses. The feedback signal may be based on at least one, or all, of: (i) a proportional term; (ii) an integral term; and (iii) a derivative term.

According to an aspect there is provided a method of mass spectrometry comprising:

using a power converter to convert an input voltage to an output voltage;

measuring the input voltage; and controlling the power converter based on the measured input voltage.

The method may comprise forming electrical output pulses from the output of the power converter.

The method may comprise predicting the effect of a change in a desired parameter for the electrical output pulses on the power converter output voltage and controlling the power converter based on the prediction.

According to an aspect there is provided a method of mass spectrometry comprising:

using a power converter to convert an input voltage to an output voltage;

forming electrical output pulses from the output of the power converter;

predicting the effect of a change in a desired parameter for the electrical output pulses on the power converter output voltage; and controlling the power converter based on the prediction.

The parameter for the electrical output pulses may comprise: (i) a voltage amplitude; (ii) a voltage polarity; (iii) a pulse period; (iv) a pulse width; and/or (v) an inter-pulse period; of the electrical output pulses.

The control circuitry may control the power converter based on one or more, or all, of the above (and other) parameters.

The method may comprise supplying the electrical output pulses to an acceleration electrode of a Time of Flight (ToF) mass analyser.

The power converter may comprise a step-up converter comprising a switching element comprising a gate electrode.

The method may comprise synchronising the switching element with the pulsing circuitry.

The switching element may comprise a gate electrode.

The method may comprise generating gate pulses to be applied to the gate electrode of the switching element.

The method may comprise controlling the power converter by controlling one or more properties of gate pulses applied to the gate electrode of the switching element.

The method may comprise controlling the power converter based on the measured input voltage by controlling the width of the gate pulses applied to the gate electrode.

The method may comprise, in response to a change in a desired parameter for the electrical output pulses, generating gate pulses at a selected rate for a selected time period.

The method may comprise a master power supply supplying the input voltage to the power converter.

The method may comprise the master power supply supplying electrical power to each of one or more operational units of the mass spectrometer.

At least one of the one or more operational units may comprise a heater.

The method may comprise measuring the output voltage and controlling the power converter based on the measured output voltage.

According to an aspect, there is provided a drive unit for producing electrical pulses for an acceleration electrode of a mass spectrometer, the drive unit comprising:

a power converter configured to convert an input voltage to an output voltage;

measuring circuitry configured to measure the input voltage; and control circuitry configured to control the power converter based on the measured input voltage.

According to an aspect there is provided a drive unit for producing electrical pulses for an acceleration electrode of a mass spectrometer, the drive unit comprising:

a power converter configured to convert an input voltage to an output voltage;

pulsing circuitry operable to form electrical output pulses from the output of the power converter;

processing circuitry configured to predict the effect of a change in a desired parameter for the electrical output pulses on the power converter output voltage; and control circuitry configured to control the power converter based on the prediction.

According to an aspect, there is provided a mass spectrometer comprising:

a Time of Flight (ToF) mass analyser comprising an acceleration electrode; and the drive unit described above;

wherein the mass spectrometer is configured such that electrical output pulses produced by the drive unit are supplied to the acceleration electrode.

The drive unit may be configured such that the switching element is operated in synchronism with the pulsing circuitry.

The power converter may comprise a step-up converter.

The power converter may be configured to step up the voltage of the input to provide the output, wherein the voltage of the output is higher than the voltage of the input.

The power converter may comprise a DC-DC step-up converter configured to step-up the voltage of a DC input to provide a DC output, wherein the voltage of the DC output is higher than the voltage of the DC input.

The power converter may comprise a forward converter.

The power converter may comprise a voltage multiplier.

The forward converter may comprise a planar transformer.

The pulsing circuitry may comprise a switch.

The switch may be switched or pulsed to form the output pulses.

The switch may be a changeover switch.

The pulsing circuitry may further comprise polarity circuitry configured to control the polarity of the output pulses.

The polarity of the output pulses may be positive or negative.

The pulsing circuitry may further comprise offset circuitry configured to control an offset voltage $V_{offset}$ of the output pulses.

The offset voltage $V_{offset}$ may be selected from the group consisting of: (i) <−10V; (ii) −10V to −5V; (iii) −5V to 0V; (iv) 0V to 5V; (v) 5V to 10V; and (vi) >10V.

The output pulses may be substantially square wave voltage pulses.

The peak voltage amplitude of the output pulses may be selected from the group consisting of: (i) <600V; (ii) 600V to 700V; (iii) 700V to 800V; (iv) 800V to 900V; (v) 900V to 1000V; (vi) 1000V to 1100V; and (vii) >1100V.

The output pulses may be formed periodically with a period $T_{pulse}$.

The period $T_{pulse}$ may be selected from the group consisting of: (i) <1 μs; (ii) 1 μs to 2 μs; (iii) 2 μs to 10 μs; (iv) 10 μs to 20 μs; (v) 20 μs to 50 μs; (vi) 50 μs to 70 μs; (vii) 70 μs to 85 μs; (viii) 85 μs to 100 μs; and (ix) >100 μs.

The switching element and the pulsing circuitry may be operated with the same frequency.

The switching element may be switched periodically with a period $T_{switch}$; wherein $T_{switch}=T_{pulse}$.

The switching element may be switched after a predetermined time delay $T_{delay}$ after formation of an output pulse by the pulsing circuitry.

$T_{delay}$ may be selected from the group consisting of: (i) <0 ns; (ii) 0 ns to 50 ns; (iii) 50 ns to 100 ns; (iv) 100 ns to 1 μs; (v) 1 μs to 10 μs; (vi) 10 μs to 50 μs; (vii) 50 μs to 85 μs; (viii) 85 μs to 100 μs; and (ix) >100 μs.

The ratio between the predetermined time delay $T_{delay}$ and the pulsing period $T_{pulse}$, $T_{delay}/T_{pulse}$, may be selected from the group consisting of: (i) <0.001%; (ii) 0.001% to 0.01%; (iii) 0.01% to 0.1%; (iv) 0.1% to 0.5%; (v) 0.5% to 1%; (vi) 1% to 10%; and (vii) >10%.

The switching element and the pulsing circuitry may be operated in synchronism by operating the switching element and the pulsing circuitry using the same clock signal.

The drive unit may comprise control circuitry configured to synchronise the switching element with the pulsing circuitry.

The control circuitry may comprise a field programmable gate array ("FPGA").

The control circuitry may be configured to synchronise the switching element with the pulsing circuitry by causing the gate pulses to be applied to the gate electrode of the switching element in synchronisation with the pulsing circuitry.

The control circuitry may comprise circuitry configured to control the output voltage of the power converter.

The control circuitry may be configured to control the output voltage by controlling the width (duty cycle) of the gate pulses.

The width of a gate pulse may be selected from the group consisting of: (i) <1 μs; (ii) 1 μs to 3 μs; (iii) 3 μs to 5 μs; (iv) 5 μs to 7 μs; (v) 7 μs to 8 μs; and (vi) >8 μs.

The control circuitry may be operable to control the width of the gate pulses with a resolution selected from the group consisting of: (i) <1 ns; (ii) 1 ns to 5 ns; (iii) 5 ns to 10 ns; (iv) 10 ns to 20 ns; and (v) >10 ns.

The control circuitry may further comprise an oscilloscope, wherein the mass spectrometer may be configured such that the electrical output pulses are supplied to the oscilloscope.

The mass spectrometer may comprise damping circuitry configured to damp the electrical output pulses before the electrical output pulses are supplied to the acceleration electrode. The damping circuitry may comprise one or more damping resistors.

The Time of Flight ("ToF") mass analyser may comprise a field free or drift region.

The Time of Flight ("ToF") mass analyser may be configured to cause ions to be accelerated into the field free or drift region as a result of an output pulse being supplied to the acceleration electrode.

According to an aspect, there is provided a method of generating electrical pulses for an acceleration electrode of a mass spectrometer, the method comprising:

a power converter converting an input voltage to an output voltage;

measuring the input voltage; and controlling the power converter based on the measured input voltage.

According to an aspect there is provided a method of generating electrical pulses for an acceleration electrode of a mass spectrometer, the method comprising:

a power converter converting an input voltage to an output voltage;

forming, from the output of the power converter, electrical output pulses for an acceleration electrode of a mass spectrometer;

predicting the effect of a change in a desired parameter for the electrical output pulses on the power converter output voltage; and controlling the power converter based on the prediction.

The power converter may comprise a switching element. The power converter may be a switched mode power supply.

The method may comprise operating the switching element in synchronism with the formation of output pulses.

The power converter may comprise a step-up converter.

The method may comprise the power converter stepping up the voltage of the input to provide the output, wherein the voltage of the output is higher than the voltage of the input.

The method may comprise the power converter stepping up the voltage of a DC input to provide a DC output, wherein the voltage of the DC output is higher than the voltage of the DC input.

The power converter may comprise a forward converter.

The power converter may comprise a voltage multiplier.

The forward converter may comprise a planar transformer.

The method may comprise forming the output pulses by switching or pulsing a switch.

The switch may comprise a changeover switch.

The method may comprise controlling the polarity of the output pulses.

The polarity of the output pulses may be positive or negative.

The method may comprise controlling an offset voltage $V_{offset}$ of the output pulses.

The offset voltage $V_{offset}$ may be selected from the group consisting of: (i) <−10V; (ii) −10V to −5V; (iii) −5V to 0V; (iv) 0V to 5V; (v) 5V to 10V; and (vi) >10V.

The output pulses may be substantially square wave voltage pulses.

The peak voltage amplitude of the output pulses may be selected from the group consisting of: (i) <600V; (ii) 600V to 700V; (iii) 700V to 800V; (iv) 800V to 900V; (v) 900V to 1000V; (vi) 1000V to 1100V; and (vii) >1100V.

The method may comprise forming the output pulses periodically with a period $T_{pulse}$.

The pulsing period $T_{pulse}$ may be selected from the group consisting of: (i) <1 μs; (ii) 1 μs to 2 μs; (iii) 2 μs to 10 μs; (iv) 10 μs to 20 μs; (v) 20 μs to 50 μs; (vi) 50 μs to 70 μs; (vii) 70 μs to 85 μs; (viii) 85 μs to 100 μs; and (ix) >100 μs.

The method may comprise forming the output pulses and operating the switching element with the same frequency.

The method may comprise switching the switching element periodically with a period $T_{switch}$; wherein $T_{switch}=T_{pulse}$.

The method may comprise switching the switching element after a predetermined time delay $T_{delay}$ from forming an output pulse.

$T_{delay}$ may be selected from the group consisting of: (i) <0 ns; (ii) 0 ns to 50 ns; (iii) 50 ns to 100 ns; (iv) 100 ns to 1

µs; (v) 1 µs to 10 µs; (vi) 10 µs to 50 µs; (vii) 50 µs to 85 µs; (viii) 85 µs to 100 µs; and (ix) >100 µs.

The ratio between the predetermined time delay $T_{delay}$ and the pulsing period $T_{pulse}$, $T_{delay}/T_{pulse}$, may be selected from the group consisting of: (i) <0.001%; (ii) 0.001% to 0.01%; (iii) 0.01% to 0.1%; (iv) 0.1% to 0.5%; (v) 0.5% to 1%; (vi) 1% to 10%; and (vii) >10%.

The method may comprise operating the switching element in synchronism with the electrical output pulses by operating the switching element and forming the output pulses using the same clock signal.

The method may comprise operating the switching element in synchronism with the electrical output pulses by causing the gate pulses to be applied to the gate electrode of the switching element in synchronisation with the output pulses.

The method may comprise controlling the voltage of the output of the power converter.

The method may comprise controlling the voltage of the output of the power converter by controlling the width (duty cycle) of the gate pulses.

The width of a gate pulse may be selected from the group consisting of: (i) <1 µs; (ii) 1 µs to 3 µs; (iii) 3 µs to 5 µs; (iv) 5 µs to 7 µs; (v) 7 µs to 8 µs; and (vi) >8 µs.

The method may comprise controlling the width of the gate pulses with a resolution selected from the group consisting of: (i) <1 ns; (ii) 1 ns to 5 ns; (iii) 5 ns to 10 ns; (iv) 10 ns to 20 ns; and (v) >10 ns.

The method may comprise supplying the electrical output pulses to an oscilloscope.

According to another aspect, there is provided a method of mass spectrometry comprising:

generating electrical output pulses using a method as described above; and supplying the electrical output pulses to an acceleration electrode of a Time of Flight (ToF) mass analyser.

The method may comprise damping the output pulses supplied to the acceleration electrode of the mass analyser.

The method may comprise accelerating ions into a field free or drift region of the Time of Flight ("ToF") mass analyser as a result of an output pulse being supplied to the acceleration electrode.

The output of the power converter may be supplied to one or more of: an ion source; one or more ion guides; a detector; ion optics, and the like, of the mass spectrometer.

Each of the aspects described herein can, and in various embodiments do, include one or more, or all, of the optional features described herein.

According to various embodiments a relatively small footprint or compact Time of Flight ("TOF") mass spectrometer ("MS") or analytical instrument is provided which has a relatively high resolution. The mass spectrometer may have particular application in the biopharmaceutical industry and in the field of general analytical Electrospray Ionisation ("ESI") and subsequent mass analysis. The mass spectrometer according to various embodiments is a high performance instrument wherein manufacturing costs have been reduced without compromising performance.

The instrument according to various embodiments is particularly user friendly compared with the majority of other conventional instruments. The instrument may have single button which can be activated by a user in order to turn the instrument ON and at the same time initiate an instrument self-setup routine. The instrument may, in particular, have a health diagnostics system which is both helpful for users whilst providing improved diagnosis and fault resolution.

According to various embodiments the instrument may have a health diagnostics or health check which is arranged to bring the overall instrument, and in particular the mass spectrometer and mass analyser, into a state of readiness after a period of inactivity or power saving. The same health diagnostic system may also be utilised to bring the instrument into a state of readiness after maintenance or after the instrument switches from a maintenance mode of operation into an operational state. Furthermore, the health diagnostics system may also be used to monitor the instrument, mass spectrometer or mass analyser on a periodic basis in order to ensure that the instrument in operating within defined operational parameters and hence the integrity of mass spectral or other data obtained is not compromised.

The health check system may determine various actions which either should automatically be performed or which are presented to a user to decide whether or not to proceed with. For example, the health check system may determine that no corrective action or other measure is required i.e. that the instrument is operating as expected within defined operational limits. The health check system may also determine that an automatic operation should be performed in order, for example, to correct or adjust the instrument in response to a detected error warning, error status or anomaly. The health check system may also inform the user that the user should either take a certain course of action or to give approval for the control system to take a certain course of action. Various embodiments are also contemplated wherein the health check system make seek negative approval i.e. the health check system may inform a user that a certain course of action will be taken, optionally after a defined time delay, unless the user instructs otherwise or cancels the proposed action suggested by the control system.

Embodiments are also contemplated wherein the level of detail provided to a user may vary dependent upon the level of experience of the user. For example, the health check system may provide either very detailed instructions or simplified instructions to a relatively unskilled user.

The health check system may provide a different level of detail to a highly skilled user such as a service engineer. In particular, additional data and/or instructions may be provided to a service engineer which may not be provided to a regular user. It is also contemplated that instructions given to a regular user may include icons and/or moving graphical images. For example, a user may be guided by the health check system in order to correct a fault and once it is determined that a user has completed a step then the control system may change the icon and/or moving graphical images which are displayed to the user in order to continue to guide the user through the process.

The instrument according to various embodiments has been designed to be as small as possible whilst also being generally compatible with existing UPLC systems. The instrument is easy to operate and has been designed to have a high level of reliability. Furthermore, the instrument has been designed so as to simplify diagnostic and servicing thereby minimising instrument downtime and operational costs.

According to various embodiments the instrument has particular utility in the health services market and may be integrated with Desorption Electrospray Ionisation ("DESI") and Rapid Evaporative Ionisation Mass Spectrometry ("REIMS") ion sources in order to deliver commercially available In Vitro Diagnostic Medical Device ("IVD")/Medical Device ("MD") solutions for targeted applications.

The mass spectrometer may, for example, be used for microbe identification purposes, histopathology, tissue imaging and surgical (theatre) applications.

The mass spectrometer has a significantly enhanced user experience compared with conventional mass spectrometers and has a high degree of robustness. The instrument is particularly easy to use (especially for non-expert users) and has a high level of accessibility.

The mass spectrometer has been designed to integrate easily with liquid chromatography ("LC") separation systems so that a LC-TOF MS instrument may be provided. The instrument is particularly suited for routine characterisation and monitoring applications in the biopharmaceutical industry. The instrument enables non-expert users to collect high resolution accurate mass data and to derive meaningful information from the data quickly and easily. This results in improved understanding of products and processes with the potential to shorten time to market and reduce costs.

The instrument may be used in biopharmaceutical last stage development and quality control ("QC") applications. The instrument also has particular application in small molecule pharmaceutical, food and environmental ("F&E") and chemical materials analyses.

The instrument has enhanced mass detection capabilities i.e. high mass resolution, accurate mass and an extended mass range. The instrument also has the ability to fragment parent ions into daughter or fragment ions so that MS/MS type experiments may be performed.

BRIEF DESCRIPTION OF THE DRAWINGS

Various embodiments together with other arrangements given for illustrative purposes only will now be described, by way of example only, and with reference to the accompanying drawings in which:

FIG. 2A shows a front view of a bench-top mass spectrometer according to various embodiments showing three solvent bottles loaded into the instrument and a front display panel, FIG. 2B shows a perspective view of a mass spectrometer according to various embodiments and FIG. 2C illustrates in more detail various icons which may be displayed on the front display panel in order to highlight the status of the instrument to a user and to indicate if a potential fault has been detected;

FIG. 3 shows a schematic representation of mass spectrometer according to various embodiments, wherein the instrument comprises an Electrospray Ionisation ("ESI") or other ion source, a conjoined ring ion guide, a segmented quadrupole rod set ion guide, one or more transfer lenses and a Time of Flight mass analyser comprising a pusher electrode, a reflectron and an ion detector;

FIG. 12A shows in greater detail three separate pumping ports of a turbo molecular pump according to various embodiments and FIG. 12B shows in greater detail two of the three pumping ports which are arranged to pump separate vacuum chambers;

FIG. 16F illustrates the relative voltages and absolute voltage ranges at which the various ion optical components such as the Electrospray capillary probe, differential pumping apertures, transfer lens electrodes, pusher electrodes, reflectron electrodes and the detector are maintained according to various embodiments.

FIG. 27 shows schematically characteristics of output pulses which may be measured using an oscilloscope in accordance with various embodiments.

DETAILED DESCRIPTION

Various aspects of a newly developed mass spectrometer are disclosed. The mass spectrometer may comprise a modified and improved ion inlet assembly, a modified first ion guide, a modified quadrupole rod set ion guide, improved transfer optics, a novel cantilevered time of flight arrangement, a modified reflectron arrangement together with advanced electronics and an improved user interface.

The mass spectrometer has been designed to have a high level of performance, to be highly reliable, to offer a significantly improved user experience compared with the majority of conventional mass spectrometers, to have a very high level of EMC compliance and to have advanced safety features.

The instrument comprises a highly accurate mass analyser and overall the instrument is small and compact with a high degree of robustness. The instrument has been designed to reduce manufacturing cost without compromising performance at the same time making the instrument more reliable and easier to service. The instrument is particularly easy to use, easy to maintain and easy to service. The instrument constitutes a next-generation bench-top Time of Flight mass spectrometer.

Figure 1:
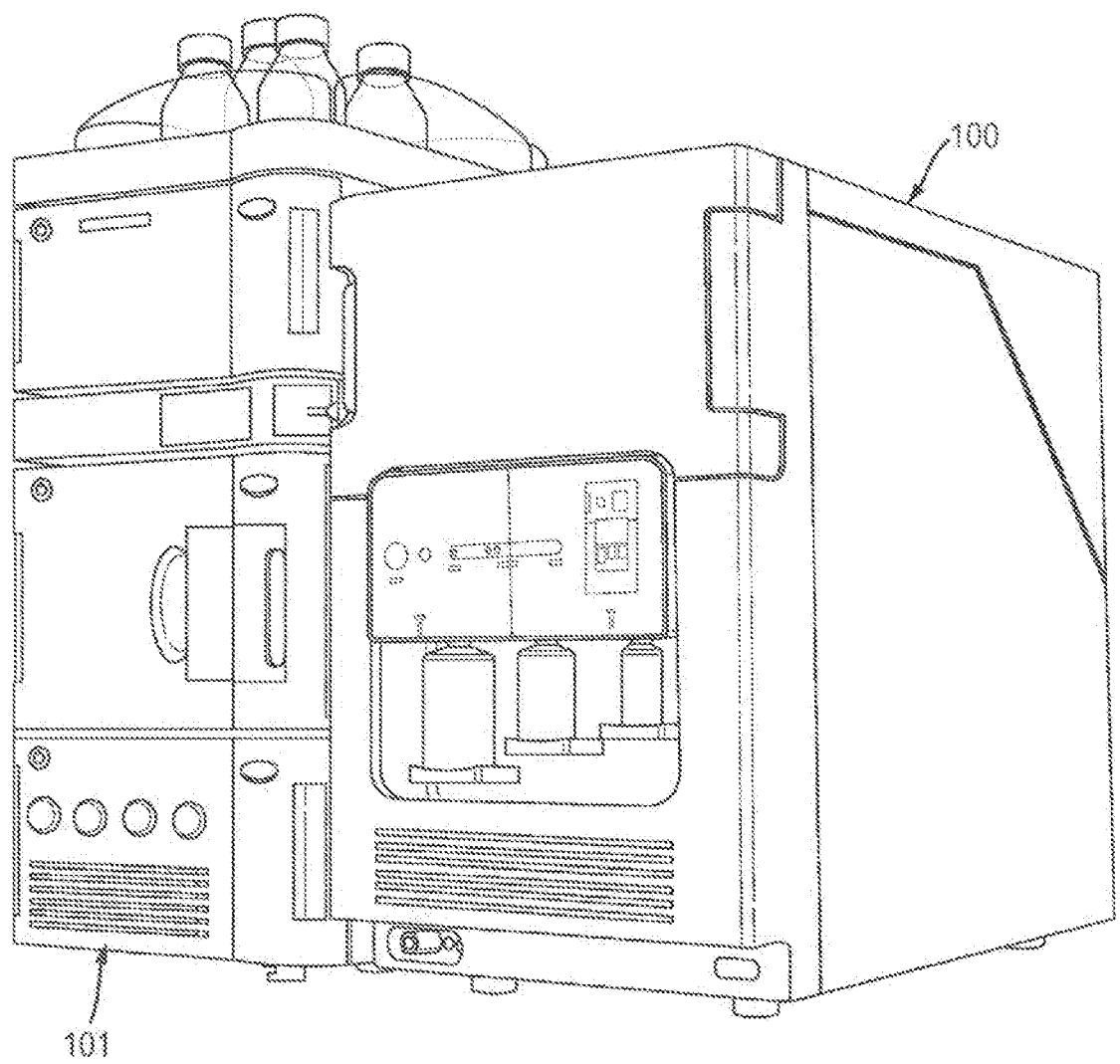
FIG. 1 shows a perspective view of a bench-top Time of Flight mass spectrometer according to various embodiments coupled to a conventional bench-top liquid chromatography ("LC") separation system.

FIG. 1 shows a bench-top mass spectrometer 100 according to various embodiments which is shown coupled to a conventional bench-top liquid chromatography separation device 101. The mass spectrometer 100 has been designed with ease of use in mind. In particular, a simplified user interface and front display is provided and instrument serviceability has been significantly improved and optimised relative to conventional instruments. The mass spectrometer 100 has an improved mechanical design with a reduced part count and benefits from a simplified manufacturing process thereby leading to a reduced cost design, improved reliability and simplified service procedures. The mass spectrometer has been designed to be highly electromagnetic compatible ("EMC") and exhibits very low electromagnetic interference ("EMI").

FIG. 2A shows a front view of the mass spectrometer 100 according to various embodiments and FIG. 2B shows a perspective view of the mass spectrometer according to various embodiments. Three solvent bottles 201 may be coupled, plugged in or otherwise connected or inserted into the mass spectrometer 100. The solvent bottles 201 may be back lit in order to highlight the fill status of the solvent bottles 201 to a user.

One problem with a known mass spectrometer having a plurality of solvent bottles is that a user may connect a solvent bottle in a wrong location or position. Furthermore, a user may mount a solvent bottle but conventional mounting mechanisms will not ensure that a label on the front of the solvent bottle will be positioned so that it can be viewed by a user i.e. conventional instruments may allow a solvent bottle to be connected where a front facing label ends up facing away from the user. Accordingly, one problem with conventional instruments is that a user may not be able to read a label on a solvent bottle due to the fact that the solvent bottle ends up being positioned with the label of the solvent bottle facing away from the user. According to various embodiments conventional screw mounts which are conventionally used to mount solvent bottles have been replaced with a resilient spring mounting mechanism which allows the solvent bottles 201 to be connected without rotation.

According to various embodiments the solvent bottles 201 may be illuminated by a LED light tile in order to indicate the fill level of the solvent bottles 201 to a user. It will be understood that a single LED illuminating a bottle will be insufficient since the fluid in a solvent bottle 201 can attenuate the light from the LED. Furthermore, there is no good single position for locating a single LED.

The mass spectrometer 100 may have a display panel 202 upon which various icons may be displayed when illuminated by the instrument control system.

A start button 203 may be positioned on or adjacent the front display panel 202. A user may press the start button 203 which will then initiate a power-up sequence or routine. The power-up sequence or routine may comprise powering-up all instrument modules and initiating instrument pump-down i.e. generating a low pressure in each of the vacuum chambers within the body of the mass spectrometer 100.

According to various embodiments the power-up sequence or routine may or may not include running a source pressure test and switching the instrument into an Operate mode of operation.

According to various embodiments a user may hold the start button 203 for a period of time, e.g. 5 seconds, in order to initiate a power-down sequence.

If the instrument is in a maintenance mode of operation, then pressing the start button 203 on the front panel of the instrument may initiate a power-up sequence. Furthermore, when the instrument is in a maintenance mode of operation then holding the start button 203 on the front panel of the instrument for a period of time, e.g. 5 seconds, may initiate a power-down sequence.

Figure 2C:
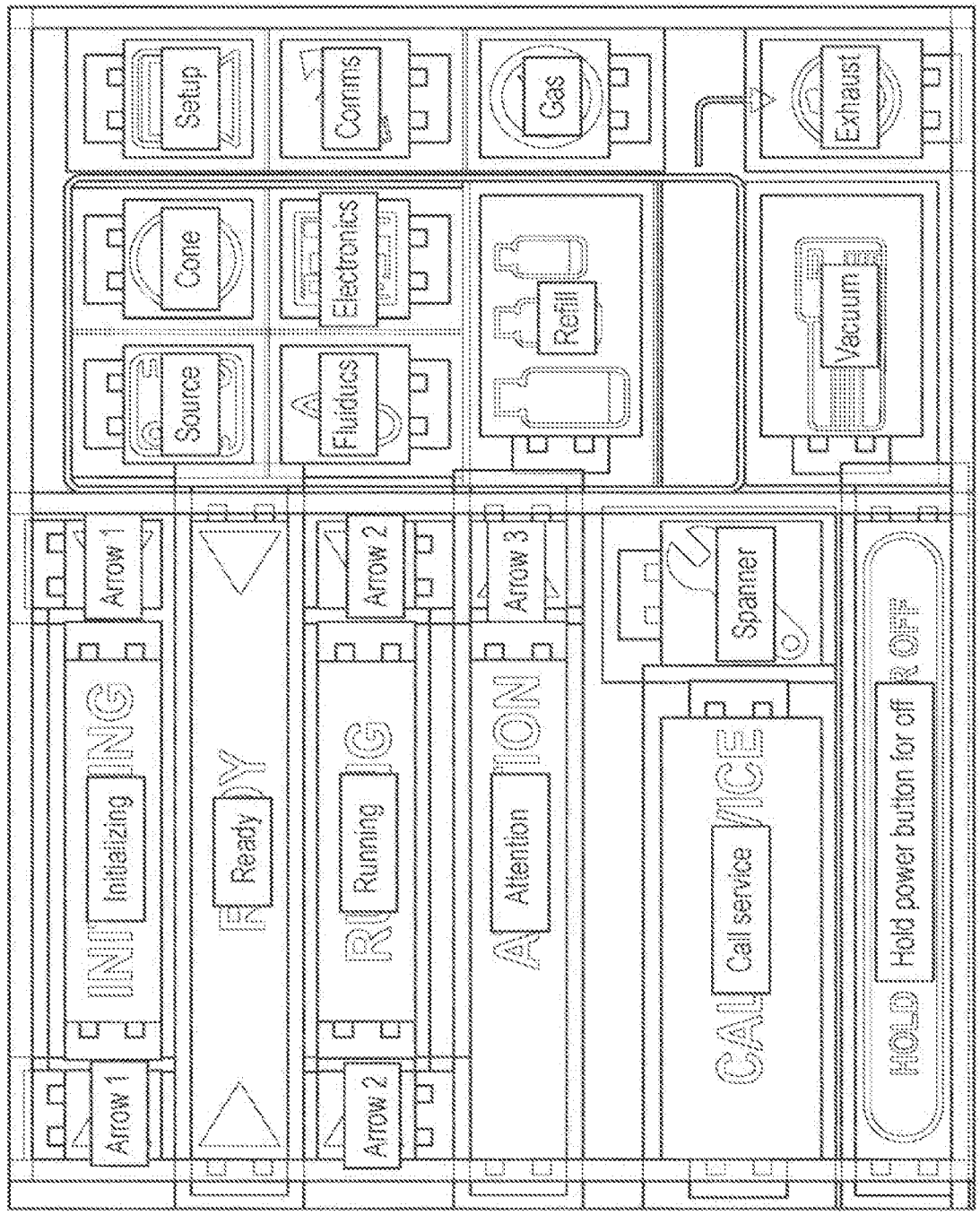

FIG. 2C illustrates in greater detail various icons which may be displayed on the display panel 202 and which may be illuminated under the control of instrument hardware and/or software. According to various embodiments one side of the display panel 202 (e.g. the left-hand side) may have various icons which generally relate to the status of the instrument or mass spectrometer 100. For example, icons may be displayed in the colour green to indicate that the instrument is in an initialisation mode of operation, a ready mode of operation or a running mode of operation.

In the event of a detected error which may require user interaction or user input a yellow or amber warning message may be displayed. A yellow or amber warning message or icon may be displayed on the display panel 202 and may convey only relatively general information to a user e.g. indicating that there is a potential fault and a general indication of what component or aspect of the instrument may be at fault.

According to various embodiments it may be necessary for a user to refer to an associated computer display or monitor in order to get fuller details or gain a fuller appreciation of the nature of the fault and to receive details of potential corrective action which is recommended to perform in order to correct the fault or to place the instrument in a desired operational state.

A user may be invited to confirm that a corrective action should be performed and/or a user may be informed that a certain corrective action is being performed.

In the event of a detected error which cannot be readily corrected by a user and which instead requires the services of a skilled service engineer then a warning message may be displayed indicating that a service engineer needs to be called. A warning message indicating the need for a service engineer may be displayed in the colour red and a spanner or other icon may also be displayed or illuminated to indicate to a user that an engineer is required.

The display panel 202 may also display a message that the power button 203 should be pressed in order to turn the instrument OFF.

According to an embodiment one side of the display panel 202 (e.g. the right-hand side) may have various icons which indicate different components or modules of the instrument where an error or fault has been detected. For example, a yellow or amber icon may be displayed or illuminated in order to indicate an error or fault with the ion source, a fault in the inlet cone region, a fault with the fluidic systems, an electronics fault, a fault with one or more of the solvent or other bottles 201 (i.e. indicating that one or more solvent bottles 201 needing to be refilled or emptied), a vacuum pressure fault associated with one or more of the vacuum chambers, an instrument setup error, a communication error, a problem with a gas supply or a problem with an exhaust.

It will be understood that the display panel 202 may merely indicate the general status of the instrument and/or the general nature of a fault. In order to be able to resolve the fault or to understand the exact nature of an error or fault a user may need to refer to the display screen of an associated computer or other device. For example, as will be understood by those skilled in the art an associated computer or other device may be arranged to receive and process mass spectral and other data output from the instrument or mass spectrometer 100 and may display mass spectral data or images on a computer display screen for the benefit of a user.

According to various embodiments the status display may indicate whether the instrument is in one of the following states namely Running, Ready, Getting Ready, Ready Blocked or Error.

The status display may display health check indicators such as Service Required, Cone, Source, Set-up, Vacuum, Communications, Fluidics, Gas, Exhaust, Electronics, Lockmass, Calibrant and Wash.

A "Hold power button for OFF" LED tile is shown in FIG. 2C and may remain illuminated when the power button 203 is pressed and may remain illuminated until the power button 203 is released or until a period of time (e.g. 5 seconds) has elapsed whichever is sooner.

If the power button 203 is released before the set period of time (e.g. less than 5 seconds after it is pressed) then the "Hold power button for OFF" LED tile may fade out over a time period of e.g. 2 μs.

The initialising LED tile may be illuminated when the instrument is started via the power button 203 and may remain ON until software assumes control of the status panel or until a power-up sequence or routine times out.

According to various embodiments an instrument health check may be performed and printer style error correction instructions may be provided to a user via a display screen of a computer monitor (which may be separate to the front display panel 202) in order to help guide a user through any steps that the user may need to perform.

The instrument may attempt to self-diagnose any error messages or warning status alert(s) and may attempt to rectify any problem(s) either with or without notifying the user.

Depending upon the severity of any problem the instrument control system may either attempt to correct the problem(s) itself, request the user to carry out some form of intervention in order to attempt to correct the issue or problem(s) or may inform the user that the instrument requires a service engineer.

In the event where corrective action may be taken by a user then the instrument may display instructions for the user to follow and may provide details of methods or steps that should be performed which may allow the user to fix or otherwise resolve the problem or error.

A resolve button may be provided on a display screen which may be pressed by a user having followed the suggested resolution instructions. The instrument may then run a test again and/or may check if the issue has indeed been corrected. For example, if a user were to trigger an interlock then once the interlock is closed a pressure test routine may be initialised as detailed below.

FIG. 3 shows a high level schematic of the mass spectrometer 100 according to various embodiments wherein the instrument may comprise an ion source 300, such as an Electrospray Ionisation ("ESI") ion source. However, it should be understood that the use of an Electrospray Ionisation ion source 300 is not essential and that according to other embodiments a different type of ion source may be used. For example, according to various embodiments a Desorption Electrospray Ionisation ("DESI") ion source may be used. According to yet further embodiments a Rapid Evaporative Ionisation Mass Spectrometry ("REIMS") ion source may be used.

If an Electrospray ion source 300 is provided, then the ion source 300 may comprise an Electrospray probe and associated power supply.

Figure 6A:
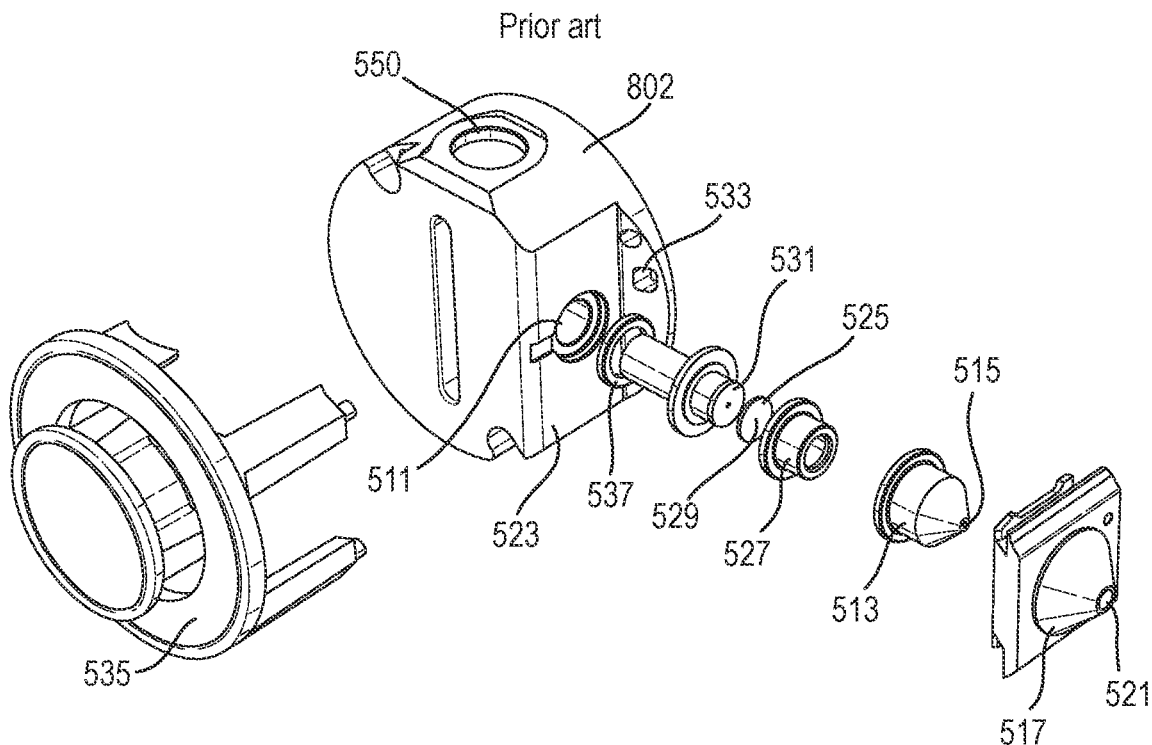
FIG. 6A shows an exploded view of the first known ion inlet assembly.
Figure 6B:
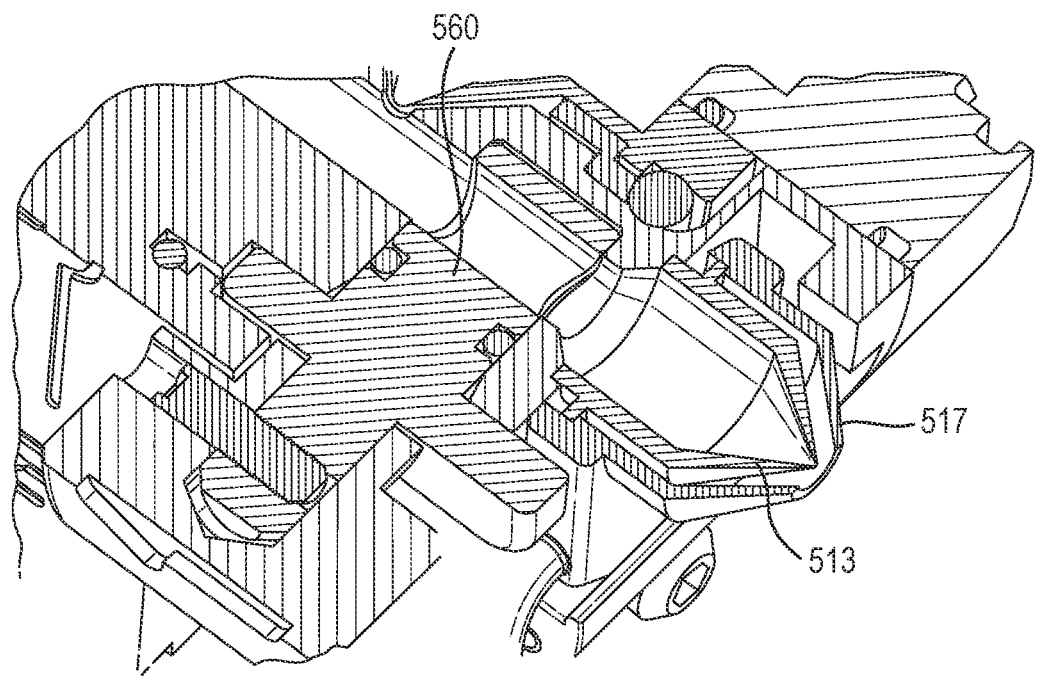
FIG. 6B shows a second different known ion inlet assembly having an isolation valve.
Figure 6C:
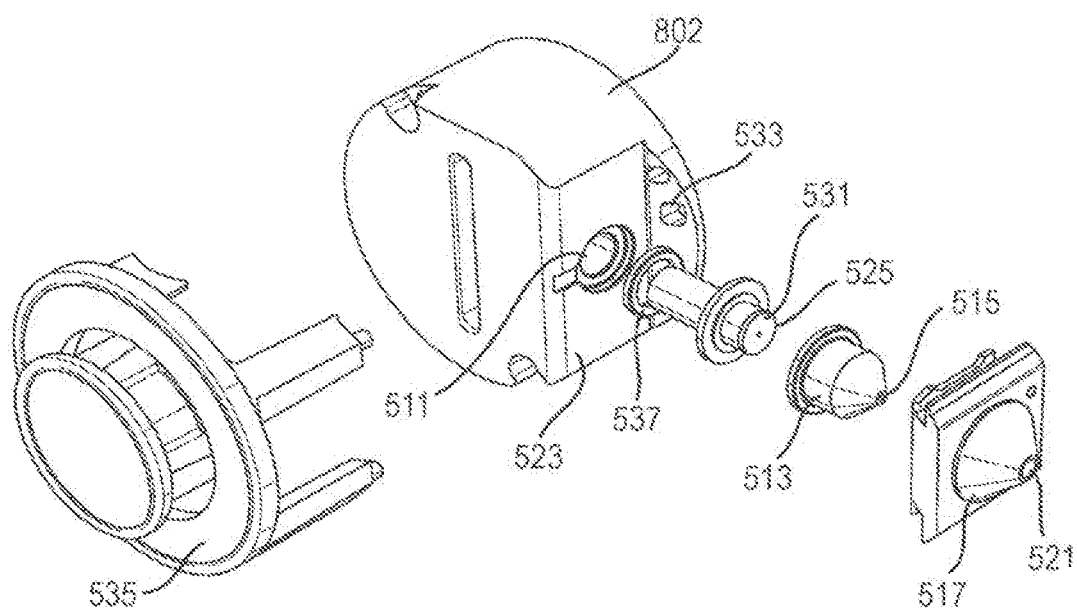
FIG. 6C shows an exploded view of an ion inlet assembly according to various embodiments.

The initial stage of the associated mass spectrometer 100 comprises an ion block 802 (as shown in FIG. 6C) and a source enclosure may be provided if an Electrospray Ionisation ion source 300 is provided.

If a Desorption Electrospray Ionisation ("DESI") ion source is provided then the ion source may comprise a DESI source, a DESI sprayer and an associated DESI power supply. The initial stage of the associated mass spectrometer may comprise an ion block 802 as shown in more detail in FIG. 6C. However, according to various embodiments if a DESI source is provided then the ion block 802 may not enclosed by a source enclosure.

It will be understood that a REIMS source involves the transfer of analyte, smoke, fumes, liquid, gas, surgical smoke, aerosol or vapour produced from a sample which may comprise a tissue sample. In some embodiments, the REIMS source may be arranged and adapted to aspirate the analyte, smoke, fumes, liquid, gas, surgical smoke, aerosol or vapour in a substantially pulsed manner. The REIMS source may be arranged and adapted to aspirate the analyte, smoke, fumes, liquid, gas, surgical smoke, aerosol or vapour substantially only when an electrosurgical cutting applied voltage or potential is supplied to one or more electrodes, one or more electrosurgical tips or one or more laser or other cutting devices.

The mass spectrometer 100 may be arranged so as to be capable of obtaining ion images of a sample. For example, according to various embodiments mass spectral and/or other physico-chemical data may be obtained as a function of position across a portion of a sample. Accordingly, a determination can be made as to how the nature of the sample may vary as a function of position along, across or within the sample.

The mass spectrometer 100 may comprise a first ion guide 301 such as a StepWave® ion guide 301 having a plurality of ring and conjoined ring electrodes. The mass spectrometer 100 may further comprise a segmented quadrupole rod set ion guide 302, one or more transfer lenses 303 and a Time of Flight mass analyser 304. The quadrupole rod set ion guide 302 may be operated in an ion guiding mode of operation and/or in a mass filtering mode of operation. The Time of Flight mass analyser 304 may comprise a linear acceleration Time of Flight region or an orthogonal acceleration Time of Flight mass analyser.

If the Time of Flight mass analyser comprises an orthogonal acceleration Time of Flight mass analyser 304 then the mass analyser 304 may comprise a pusher electrode 305, a reflectron 306 and an ion detector 307. The ion detector 307 may be arranged to detect ions which have been reflected by the reflectron 306. It should be understood, however, that the provision of a reflectron 306 though desirable is not essential.

According to various embodiments the first ion guide 301 may be provided downstream of an atmospheric pressure interface. The atmospheric pressure interface may comprise an ion inlet assembly.

The first ion guide 301 may be located in a first vacuum chamber or first differential pumping region.

The first ion guide 301 may comprise a part ring, part conjoined ring ion guide assembly wherein ions may be transferred in a generally radial direction from a first ion path formed within a first plurality of ring or conjoined ring electrodes into a second ion path formed by a second plurality of ring or conjoined ring electrodes. The first and second plurality of ring electrodes may be conjoined along at least a portion of their length. Ions may be radially confined within the first and second plurality of ring electrodes.

The second ion path may be aligned with a differential pumping aperture which may lead into a second vacuum chamber or second differential pumping region.

The first ion guide 301 may be utilised to separate charged analyte ions from unwanted neutral particles. The unwanted neutral particles may be arranged to flow towards an exhaust port whereas analyte ions are directed on to a different flow path and are arranged to be optimally transmitted through a differential pumping aperture into an adjacent downstream vacuum chamber.

It is also contemplated that according to various embodiments ions may in a mode of operation be fragmented within the first ion guide 301. In particular, the mass spectrometer 100 may be operated in a mode of operation wherein the gas pressure in the vacuum chamber housing the first ion guide 301 is maintained such that when a voltage supply causes ions to be accelerated into or along the first ion guide 301 then the ions may be arranged to collide with background gas in the vacuum chamber and to fragment to form fragment, daughter or product ions. According to various embodiments a static DC voltage gradient may be maintained along at least a portion of the first ion guide 301 in order to urge ions along and through the first ion guide 301 and optionally to cause ions in a mode of operation to fragment.

However, it should be understood that it is not essential that the mass spectrometer 100 is arranged so as to be capable of performing ion fragmentation in the first ion guide 301 in a mode of operation.

The mass spectrometer 100 may comprise a second ion guide 302 downstream of the first ion guide 302 and the second ion guide 302 may be located in the second vacuum chamber or second differential pumping region.

The second ion guide 302 may comprise a segmented quadrupole rod set ion guide or mass filter 302. However, other embodiments are contemplated wherein the second ion guide 302 may comprise a quadrupole ion guide, a hexapole ion guide, an octopole ion guide, a multipole ion guide, a segmented multipole ion guide, an ion funnel ion guide, an ion tunnel ion guide (e.g. comprising a plurality of ring electrodes each having an aperture through which ions may pass or otherwise forming an ion guiding region) or a conjoined ring ion guide.

The mass spectrometer 100 may comprise one or more transfer lenses 303 located downstream of the second ion guide 302. One of more of the transfer lenses 303 may be located in a third vacuum chamber or third differential pumping region. Ions may be passed through a further differential pumping aperture into a fourth vacuum chamber or fourth differential pumping region. One or more transfer lenses 303 may also be located in the fourth vacuum chamber or fourth differential pumping region.

The mass spectrometer 100 may comprise a mass analyser 304 located downstream of the one or more transfer lenses 303 and may be located, for example, in the fourth or further vacuum chamber or fourth or further differential pumping region. The mass analyser 304 may comprise a Time of Flight ("TOF") mass analyser. The Time of Flight mass analyser 304 may comprise a linear or an orthogonal acceleration Time of Flight mass analyser.

According to various embodiments an orthogonal acceleration Time of Flight mass analyser 304 may be provided comprising one or more orthogonal acceleration pusher electrode(s) 305 (or alternatively and/or additionally one or more puller electrode(s)) and an ion detector 307 separated by a field free drift region. The Time of Flight mass analyser 304 may optionally comprise one or more reflectrons 306 intermediate the pusher electrode 305 and the ion detector 307.

Although highly desirable, it should be recognised that the mass analyser does not have to comprise a Time of Flight mass analyser 304. More generally, the mass analyser 304 may comprise either: (i) a quadrupole mass analyser; (ii) a 2D or linear quadrupole mass analyser; (iii) a Paul or 3D quadrupole mass analyser; (iv) a Penning trap mass analyser; (v) an ion trap mass analyser; (vi) a magnetic sector mass analyser; (vii) Ion Cyclotron Resonance ("ICR") mass analyser; (viii) a Fourier Transform Ion Cyclotron Resonance ("FTICR") mass analyser; (ix) an electrostatic mass analyser arranged to generate an electrostatic field having a quadro-logarithmic potential distribution; (x) a Fourier Transform electrostatic mass analyser; (xi) a Fourier Transform mass analyser; (xii) a Time of Flight mass analyser; (xiii) an orthogonal acceleration Time of Flight mass analyser; or (xiv) a linear acceleration Time of Flight mass analyser.

Although not shown in FIG. 3, the mass spectrometer 100 may also comprise one or more optional further devices or stages. For example, according to various embodiments the mass spectrometer 100 may additionally comprise one or more ion mobility separation devices and/or one or more Field Asymmetric Ion Mobility Spectrometer ("FAIMS") devices and/or one or more devices for separating ions temporally and/or spatially according to one or more physico-chemical properties. For example, the mass spectrometer 100 according to various embodiments may comprise one or more separation stages for temporally or otherwise separating ions according to their mass, collision cross section, conformation, ion mobility, differential ion mobility or another physico-chemical parameter.

The mass spectrometer 100 may comprise one or more discrete ion traps or one or more ion trapping regions. However, as will be described in more detail below, an axial trapping voltage may be applied to one or more sections or one or more electrodes of either the first ion guide 301 and/or the second ion guide 302 in order to confine ions axially for a short period of time. For example, ions may be trapped or confined axially for a period of time and then released. The ions may be released in a synchronised manner with a downstream ion optical component. For example, in order to enhance the duty cycle of analyte ions of interest, an axial trapping voltage may be applied to the last electrode or stage of the second ion guide 302. The axial trapping voltage may then be removed and the application of a voltage pulse to the pusher electrode 305 of the Time of Flight mass analyser 304 may be synchronised with the pulsed release of ions so as to increase the duty cycle of analyte ions of interest which are then subsequently mass analysed by the mass analyser 304. This approach may be referred to as an Enhanced Duty Cycle ("EDC") mode of operation.

Furthermore, the mass spectrometer 100 may comprise one or more collision, fragmentation or reaction cells selected from the group consisting of: (i) a Collisional Induced Dissociation ("CID") fragmentation device; (ii) a Surface Induced Dissociation ("SID") fragmentation device; (iii) an Electron Transfer Dissociation ("ETD") fragmentation device; (iv) an Electron Capture Dissociation ("ECD") fragmentation device; (v) an Electron Collision or Impact Dissociation fragmentation device; (vi) a Photo Induced Dissociation ("PID") fragmentation device; (vii) a Laser Induced Dissociation fragmentation device; (viii) an infrared radiation induced dissociation device; (ix) an ultraviolet radiation induced dissociation device; (x) a nozzle-skimmer interface fragmentation device; (xi) an in-source fragmentation device; (xii) an in-source Collision Induced Dissociation fragmentation device; (xiii) a thermal or temperature source fragmentation device; (xiv) an electric field induced fragmentation device; (xv) a magnetic field induced fragmentation device; (xvi) an enzyme digestion or enzyme degradation fragmentation device; (xvii) an ion-ion reaction fragmentation device; (xviii) an ion-molecule reaction fragmentation device; (xix) an ion-atom reaction fragmentation device; (xx) an ion-metastable ion reaction fragmentation device; (xxi) an ion-metastable molecule reaction fragmentation device; (xxii) an ion-metastable atom reaction fragmentation device; (xxiii) an ion-ion reaction device for reacting ions to form adduct or product ions; (xxiv) an ion-molecule reaction device for reacting ions to form adduct or product ions; (xxv) an ion-atom reaction device for reacting ions to form adduct or product ions; (xxvi) an ion-metastable ion reaction device for reacting ions to form adduct or product ions; (xxvii) an ion-metastable molecule reaction device for reacting ions to form adduct or product ions; (xxviii) an ion-metastable atom reaction device for reacting ions to form adduct or product ions; and (xxix) an Electron Ionisation Dissociation ("EID") fragmentation device.

The mass spectrometer 100 may comprise one or more mass filters selected from the group consisting of: (i) a quadrupole mass filter; (ii) a 2D or linear quadrupole ion trap; (iii) a Paul or 3D quadrupole ion trap; (iv) a Penning ion trap; (v) an ion trap; (vi) a magnetic sector mass filter; (vii) a Time of Flight mass filter; and (viii) a Wien filter.

The fourth or further vacuum chamber or fourth or further differential pumping region may be maintained at a lower pressure than the third vacuum chamber or third differential pumping region. The third vacuum chamber or third differential pumping region may be maintained at a lower pressure than the second vacuum chamber or second differential pumping region and the second vacuum chamber or second differential pumping region may be maintained at a lower pressure than the first vacuum chamber or first differential pumping region. The first vacuum chamber or first differential pumping region may be maintained at lower pressure than ambient. Ambient pressure may be considered to be approx. 1013 mbar at sea level.

The mass spectrometer 100 may comprise an ion source configured to generate analyte ions. In various particular embodiments, the ion source may comprise an Atmospheric Pressure Ionisation ("API") ion source such as an Electrospray Ionisation ("ESI") ion source or an Atmospheric Pressure Chemical Ionisation ("APCI") ion source.

Figure 4:
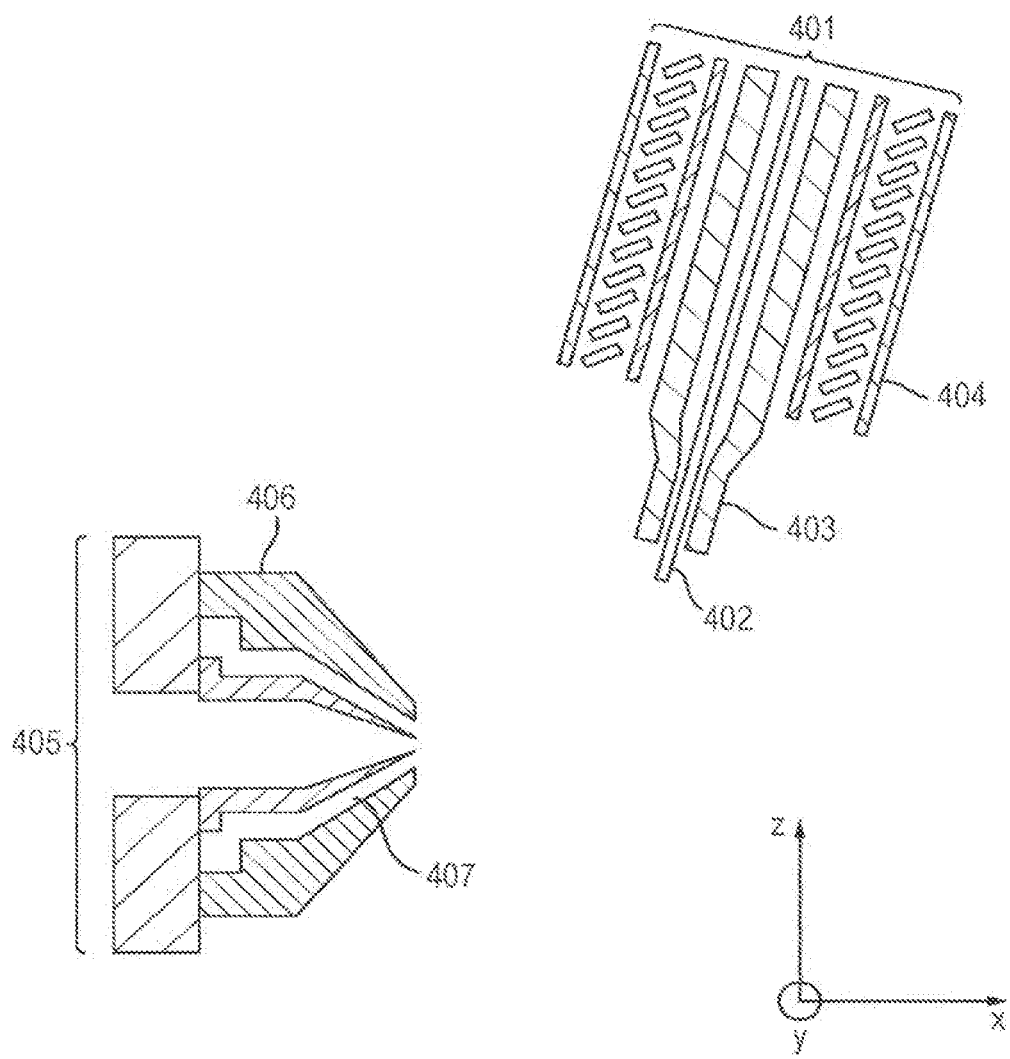
FIG. 4 shows a known Atmospheric Pressure Ionisation ("API") ion source which may be used with the mass spectrometer according to various embodiments.

FIG. 4 shows in general form a known Atmospheric Pressure Ionisation ("API") ion source such as an Electrospray Ionisation ("ESI") ion source or an Atmospheric Pressure Chemical Ionisation ("APCI") ion source. The ion source may comprise, for example, an Electrospray Ionisation probe 401 which may comprise an inner capillary tube 402 through which an analyte liquid may be supplied. The analyte liquid may comprise mobile phase from a LC column or an infusion pump. The analyte liquid enters via the inner capillary tube 402 or probe and is pneumatically converted to an electrostatically charged aerosol spray. Solvent is evaporated from the spray by means of heated desolvation gas. Desolvation gas may be provided through an annulus which surrounds both the inner capillary tube 402 and an intermediate surrounding nebuliser tube 403 through which a nebuliser gas emerges. The desolvation gas may be heated by an annular electrical desolvation heater 404. The resulting analyte and solvent ions are then directed towards a sample or sampling cone aperture mounted into an ion block 405 forming an initial stage of the mass spectrometer 100.

The inner capillary tube 402 is preferably surrounded by a nebuliser tube 403. The emitting end of the inner capillary tube 402 may protrude beyond the nebuliser tube 403. The inner capillary tube 402 and the nebuliser tube 403 may be surrounded by a desolvation heater arrangement 404 as shown in FIG. 4 wherein the desolvation heater 404 may be arranged to heat a desolvation gas. The desolvation heater 404 may be arranged to heat a desolvation gas from ambient temperature up to a temperature of around 600° C. According to various embodiments the desolvation heater 404 is always OFF when the API gas is OFF.

The desolvation gas and the nebuliser gas may comprise nitrogen, air or another gas or mixture of gases. The same gas (e.g. nitrogen, air or another gas or mixture of gases) may be used as both a desolvation gas, nebuliser gas and cone gas. The function of the cone gas will be described in more detail below.

The inner probe capillary 402 may be readily replaced by an unskilled user without needing to use any tools. The Electrospray probe 402 may support LC flow rates in the range of 0.3 to 1.0 mL/min.

According to various embodiments an optical detector may be used in series with the mass spectrometer 100. It will be understood that an optical detector may have a maximum pressure capability of approx. 1000 psi. Accordingly, the Electrospray Ionisation probe 401 may be arranged so as not to cause a back pressure of greater than around 500 psi, allowing for back pressure caused by other system components. The instrument may be arranged so that a flow of 50:50 methanol/water at 1.0 mL/min does not create a backpressure greater than 500 psi.

According to various embodiments a nebuliser flow rate of between 106 to 159 L/hour may be utilised.

The ESI probe 401 may be powered by a power supply which may have an operating range of 0.3 to 1.5 kV.

It should, however, be understood that various other different types of ion source may instead be coupled to the mass spectrometer 100. For example, according to various embodiments, the ion source may more generally comprise either: (i) an Electrospray ionisation ("ESI") ion source; (ii) an Atmospheric Pressure Photo Ionisation ("APPI") ion source; (iii) an Atmospheric Pressure Chemical Ionisation ("APCI") ion source; (iv) a Matrix Assisted Laser Desorption Ionisation ("MALDI") ion source; (v) a Laser Desorption Ionisation ("LDI") ion source; (vi) an Atmospheric Pressure Ionisation ("API") ion source; (vii) a Desorption Ionisation on Silicon ("DIOS") ion source; (viii) an Electron Impact ("EI") ion source; (ix) a Chemical Ionisation ("CI") ion source; (x) a Field Ionisation ("FI") ion source; (xi) a Field Desorption ("FD") ion source; (xii) an Inductively Coupled Plasma ("ICP") ion source; (xiii) a Fast Atom Bombardment ("FAB") ion source; (xiv) a Liquid Secondary Ion Mass Spectrometry ("LSIMS") ion source; (xv) a Desorption Electrospray Ionisation ("DESI") ion source; (xvi) a Nickel-63 radioactive ion source; (xvii) an Atmospheric Pressure Matrix Assisted Laser Desorption Ionisation ion source; (xviii) a Thermospray ion source; (xix) an Atmospheric Sampling Glow Discharge Ionisation ("ASGDI") ion source; (xx) a Glow Discharge ("GD") ion source; (xxi) an Impactor ion source; (xxii) a Direct Analysis in Real Time ("DART") ion source; (xxiii) a Laserspray Ionisation ("LSI") ion source; (xxiv) a Sonicspray Ionisation ("SSI") ion source; (xxv) a Matrix Assisted Inlet Ionisation ("MAII") ion source; (xxvi) a Solvent Assisted Inlet Ionisation ("SAII") ion source; (xxvii) a Desorption Electrospray Ionisation ("DESI") ion source; (xxviii) a Laser Ablation Electrospray Ionisation ("LAESI") ion source; (xxix) a Surface Assisted Laser Desorption Ionisation ("SALDI") ion source; or (xxx) a Low Temperature Plasma ("LTP") ion source.

A chromatography or other separation device may be provided upstream of the ion source 300 and may be coupled so as to provide an effluent to the ion source 300. The chromatography separation device may comprise a liquid chromatography or gas chromatography device. Alternatively, the separation device may comprise: (i) a Capillary Electrophoresis ("CE") separation device; (ii) a Capillary Electrochromatography ("CEC") separation device; (iii) a substantially rigid ceramic-based multilayer microfluidic substrate ("ceramic tile") separation device; or (iv) a supercritical fluid chromatography separation device.

The mass spectrometer 100 may comprise an atmospheric pressure interface or ion inlet assembly downstream of the ion source 300. According to various embodiments the atmospheric pressure interface may comprise a sample or sampling cone 406,407 which is located downstream of the ion source 401. Analyte ions generated by the ion source 401 may pass via the sample or sampling cone 406,407 into or onwards towards a first vacuum chamber or first differential pumping region of the mass spectrometer 100. However, according to other embodiments the atmospheric pressure interface may comprise a capillary interface.

As shown in FIG. 4, ions generated by the ion source 401 may be directed towards an atmospheric pressure interface which may comprise an outer gas cone 406 and an inner sample cone 407. A cone gas may be supplied to an annular region between the inner sample cone 407 and the outer gas cone 406. The cone gas may emerge from the annulus in a direction which is generally opposed to the direction of ion travel into the mass spectrometer 100. The cone gas may act as a declustering gas which effectively pushes away large contaminants thereby preventing large contaminants from impacting upon the outer cone 406 and/or inner cone 407 and also preventing the large contaminants from entering into the initial vacuum stage of the mass spectrometer 100.

Figure 5:
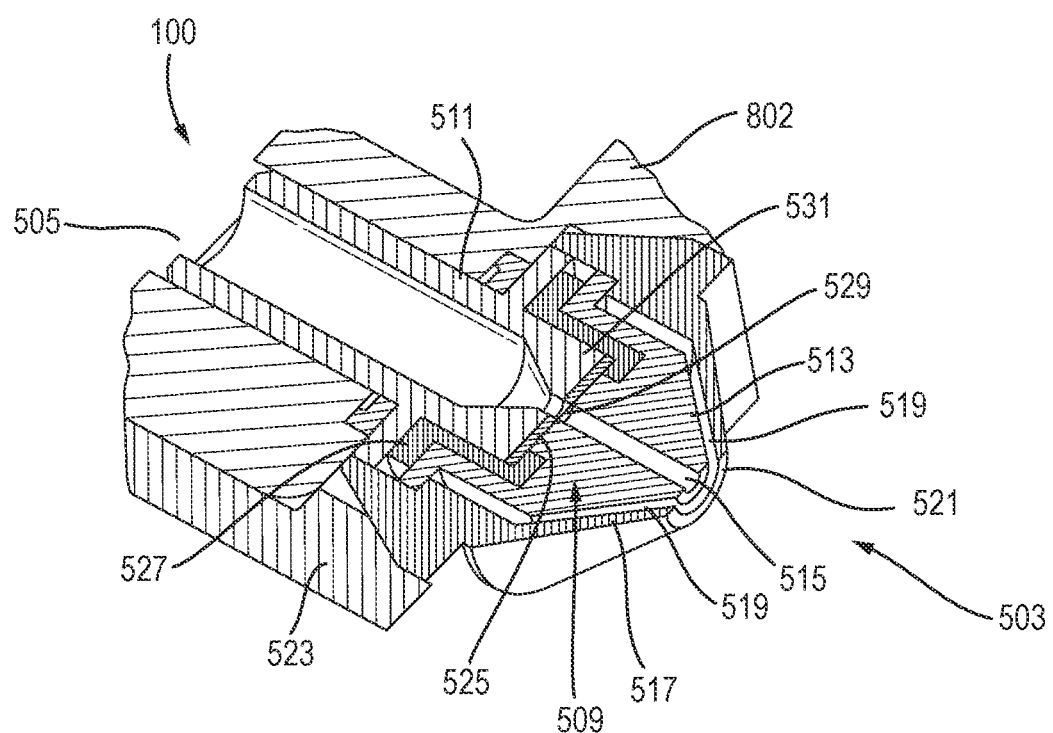
FIG. 5 shows a first known ion inlet assembly which shares features with an ion inlet assembly according to various embodiments.

FIG. 5 shows in more detail a first known ion inlet assembly which is similar to an ion inlet assembly according to various embodiments. The known ion inlet assembly as shown and described below with reference to FIGS. 5 and 6A is presented in order to highlight various aspects of an ion inlet assembly according to various embodiments and also so that differences between an ion inlet assembly according to various embodiments as shown and discussed below with reference to FIG. 6C can be fully appreciated.

With reference to FIG. 5, it will be understood that the ion source (not shown) generates analyte ions which are directed towards a vacuum chamber 505 of the mass spectrometer 100.

A gas cone assembly is provided comprising an inner gas cone or sampling cone 513 having an aperture 515 and an outer gas cone 517 having an aperture 521. A disposable disc 525 is arranged beneath or downstream of the inner gas cone or sampling 513 and is held in position by a mounting element 527. The disc 525 covers an aperture 511 of the vacuum chamber 505. The disc 525 is removably held in position by the inner gas cone 513 resting upon the mounting element 527.

As will be discussed in more detail below with reference to FIG. 6C, according to various embodiments the mounting element 527 is not provided in the preferred ion inlet assembly.

The disc 525 has an aperture or sampling orifice 529 through which ions can pass.

A carrier 531 is arranged underneath or below the disc 525. The carrier 531 is arranged to cover the aperture 511 of the vacuum chamber 505. Upon removal of the disc 525, the carrier 531 may remain in place due to suction pressure.

FIG. 6A shows an exploded view of the first known ion inlet assembly. The outer gas cone 517 has a cone aperture 521 and is slidably mounted within a clamp 535. The clamp 535 allows a user to remove the outer gas cone 517 without physically having to touch the outer gas cone 517 which will get hot during use.

An inner gas cone or sampling cone 513 is shown mounted behind or below the outer gas cone 517.

The known arrangement utilises a carrier 531 which has a 1 mm diameter aperture. The ion block 802 is also shown having a calibration port 550. However, the calibration port 550 is not provided in an ion inlet assembly according to various embodiments.

FIG. 6B shows a second different known ion inlet assembly as used on a different instrument which has an isolation valve 560 which is required to hold vacuum pressure when the outer cone gas nozzle 517 and the inner nozzle 513 are removed for servicing. The inner cone 513 has a gas limiting orifice into the subsequent stages of the mass spectrometer. The inner gas cone 513 comprises a high cost, high precision part which requires routine removal and cleaning. The inner gas cone 513 is not a disposable or consumable item. Prior to removing the inner sampling cone 513 the isolation valve 560 must be rotated into a closed position in order to isolate the downstream vacuum stages of the mass spectrometer from atmospheric pressure. The isolation valve 560 is therefore required in order to hold vacuum pressure whilst the inner gas sampling cone 513 is removed for cleaning.

FIG. 6C shows an exploded view of an ion inlet assembly according to various embodiments. The ion inlet assembly according to various embodiments is generally similar to the first known ion inlet assembly as shown and described above with reference to FIGS. 5 and 6A except for a few differences. One difference is that a calibration port 550 is not provided in the ion block 802 and a mounting member or mounting element 527 is not provided.

Accordingly, the ion block 802 and ion inlet assembly have been simplified. Furthermore, importantly the disc 525 may comprise a 0.25 or 0.30 mm diameter aperture disc 525 which is substantially smaller diameter than conventional arrangements.

According to various embodiments both the disc 525 and the vacuum holding member or carrier 531 may have a substantially smaller diameter aperture than conventional arrangements such as the first known arrangement as shown and described above with reference to FIGS. 5 and 6A.

For example, the first known instrument utilises a vacuum holding member or carrier 531 which has a 1 mm diameter aperture. In contrast, according to various embodiments the vacuum holding member or carrier 531 according to various embodiments may have a much smaller diameter aperture e.g. a 0.3 mm or 0.40 mm diameter aperture.

Figure 6D:
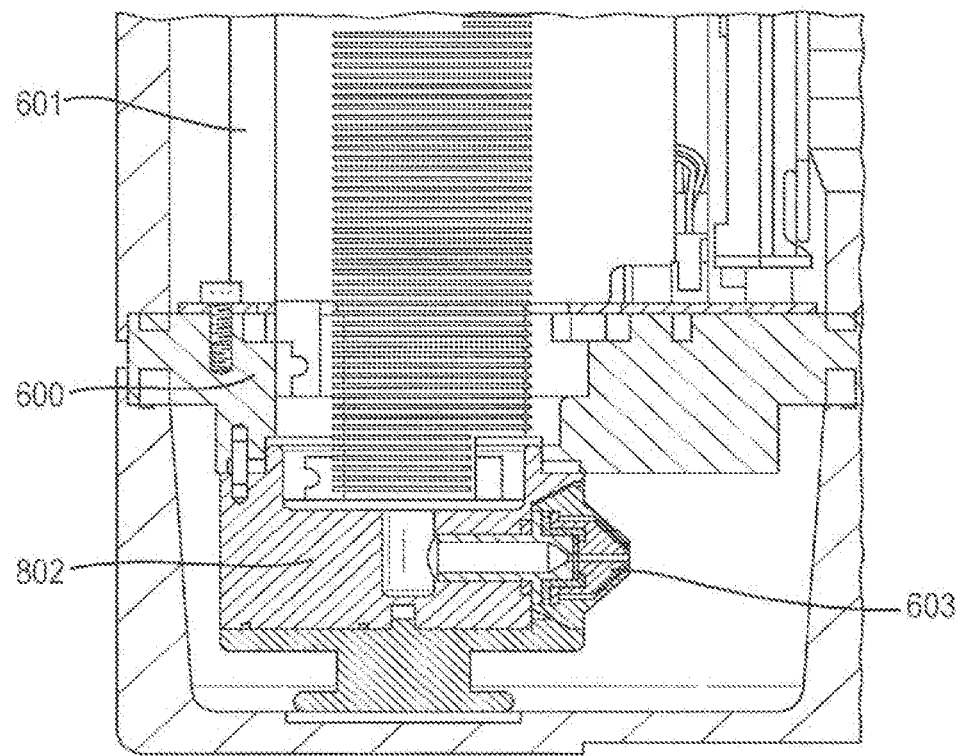
FIG. 6D shows the arrangement of an ion block attached to a pumping block upstream of a vacuum chamber housing a first ion guide according to various embodiments.

FIG. 6D shows in more detail how the ion block assembly 802 according to various embodiments may be enclosed in an atmospheric pressure source or housing. The ion block assembly 802 may be mounted to a pumping block or thermal interface 600. Ions pass through the ion block assembly 802 and then through the pumping block or thermal interface 600 into a first vacuum chamber 601 of the mass spectrometer 100. The first vacuum chamber 601 preferably houses the first ion guide 301 which as shown in FIG. 6D and which may comprise a conjoined ring ion guide 301. FIG. 6D also indicates how ion entry 603 into the mass spectrometer 100 also represents a potential leak path. A correct pressure balance is required between the diameters of the various gas flow restriction apertures in the ion inlet assembly with the configuration of the vacuum pumping system.

Figure 6E:
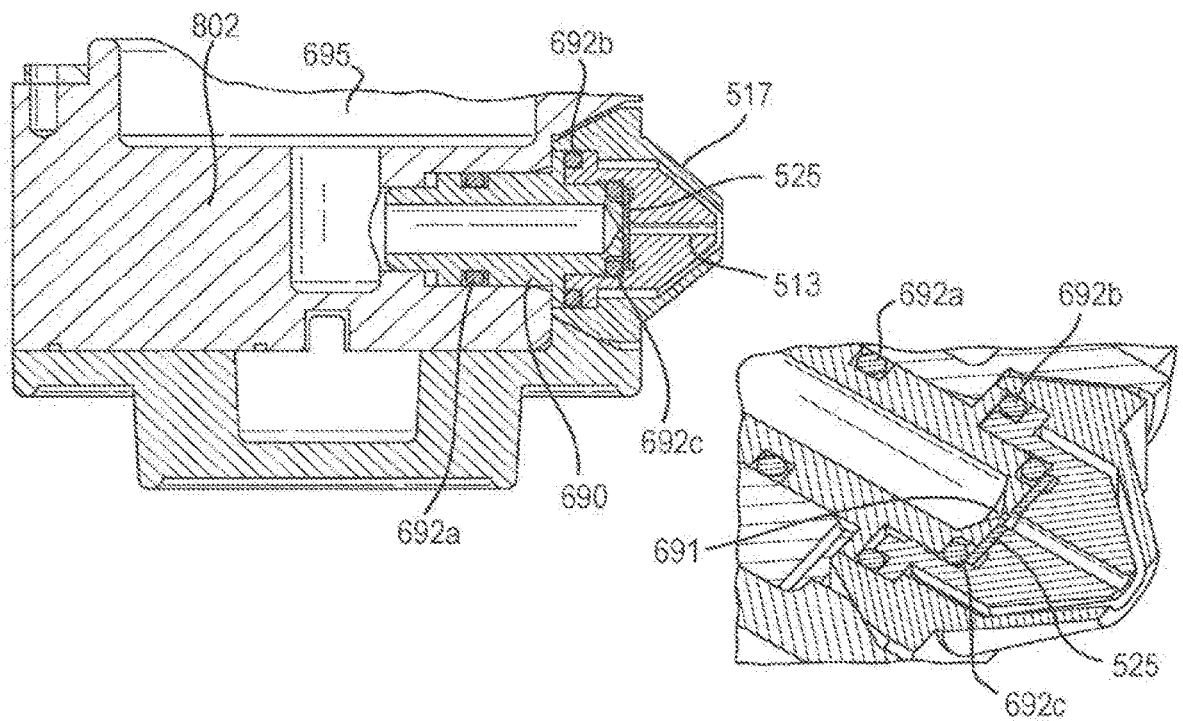
FIG. 6E shows in more detail a fixed valve assembly which is retained within an ion block according to various embodiments.

FIG. 6E shows the ion inlet assembly according to various embodiments and illustrates how ions pass through an outer gas cone 517 and an inner gas cone or sampling cone 513 before passing through an apertured disc 525. No mounting member or mounting element is provided unlike the first known ion inlet assembly as described above.

The ions then pass through an aperture in a fixed valve 690. The fixed valve 690 is held in place by suction pressure and is not removable by a user in normal operation. Three O-ring vacuum seals 692a,692b,692c are shown. The fixed valve 690 may be formed from stainless steel. A vacuum region 695 of the mass spectrometer 100 is generally indicated.

Figure 6F:
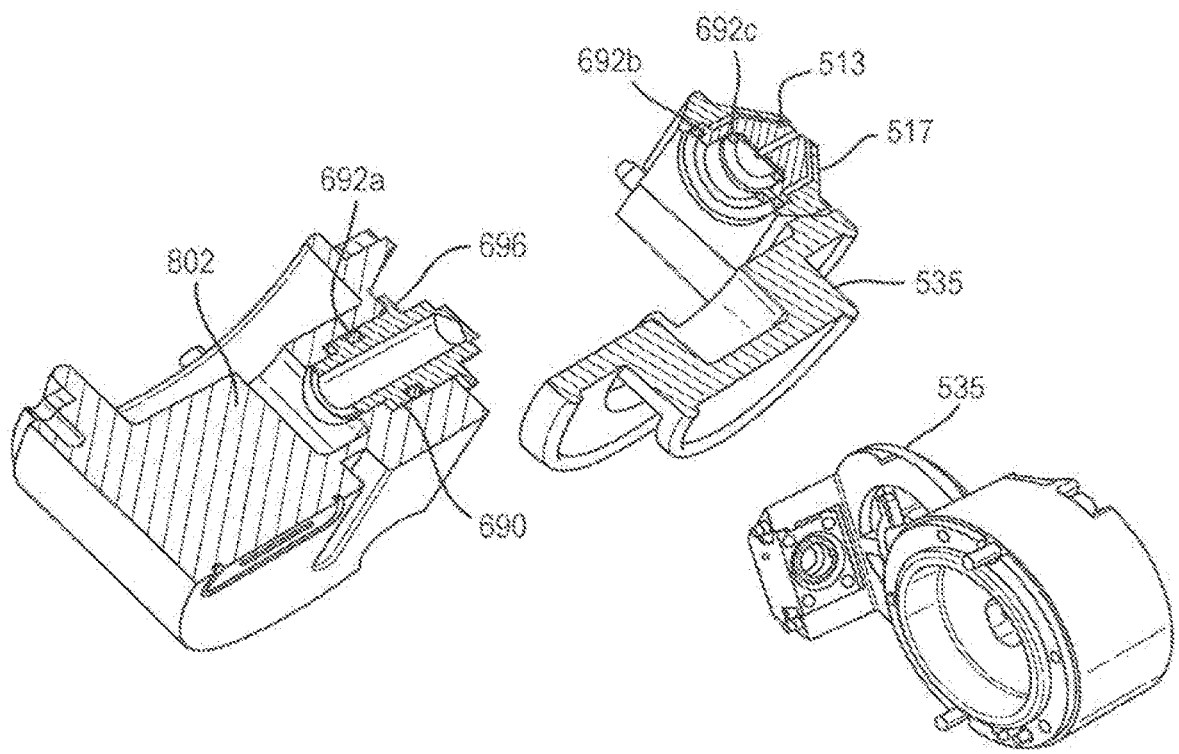
FIG. 6F shows the removal by a user of a cone assembly attached to a clamp to expose a fixed valve having a gas flow restriction aperture which is sufficient to maintain the low pressure within a downstream vacuum chamber when the cone is removed and FIG. 6G illustrates how the fixed valve may be retained in position by suction pressure according to various embodiments.

FIG. 6F shows the outer cone 517, inner sampling cone 513 and apertured disc 525 having been removed by a user by withdrawing or removing a clamp 535 to which at least the outer cone 517 is slidably inserted. According to various embodiments the inner sampling cone 513 may also be attached or secured to the outer cone 517 so that both are removed at the same time.

Instead of utilising a conventional rotatable isolation valve, a fixed non-rotatable valve 690 is provided or otherwise retained in the ion block 802. An O-ring seal 692a is shown which ensures that a vacuum seal is provided between the exterior body of the fixed valve 690 and the ion block 802. An ion block voltage contact 696 is also shown. O-rings seals 692b,692c for the inner and outer cones 513,517 are also shown.

Figure 6G:
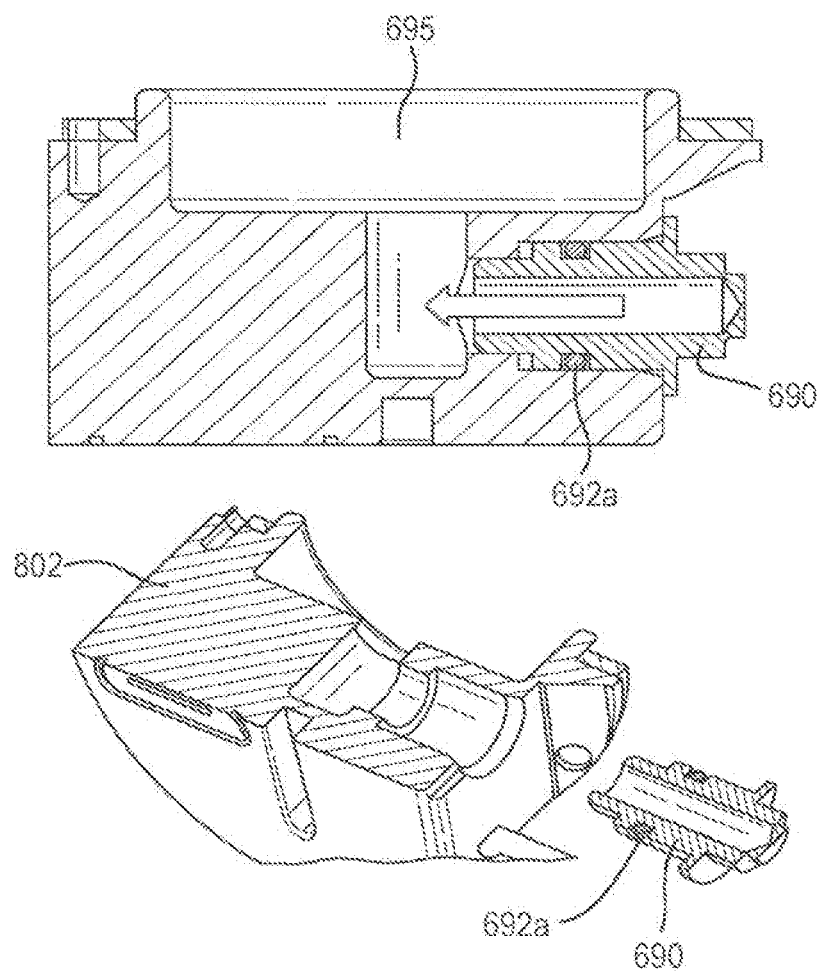

FIG. 6G illustrates how according to various embodiments a fixed valve 690 may be retained within an ion block 802 and may form a gas tight sealing therewith by virtue of an O-ring seal 692a. A user is unable to remove the fixed valve 690 from the ion block 802 when the instrument is operated due to the vacuum pressure within the vacuum chamber 695 of the instrument. The direction of suction force which holds the fixed valve 690 in a fixed position against the ion block 802 during normal operation is shown.

The size of the entrance aperture into the fixed valve 690 is designed for optimum operation conditions and component reliability. Various embodiments are contemplated wherein the shape of the entrance aperture may be cylindrical. However, other embodiments are contemplated wherein there may be more than one entrance aperture and/or wherein the one or more entrance apertures to the fixed valve 690 may have a non-circular aperture. Embodiments are also contemplated wherein the one or more entrance apertures may be angled at a non-zero angle to the longitudinal axis of the fixed valve 690.

It will be understood that total removal of the fixed valve 690 from the ion block 802 will rapidly result in total loss of vacuum pressure within the mass spectrometer 100.

According to various embodiments the ion inlet assembly may be temporarily sealed in order to allow a vacuum housing within the mass spectrometer 100 to be filled with dry nitrogen for shipping. It will be appreciated that filling a vacuum chamber with dry nitrogen allows faster initial pump-down during user initial instrument installation.

It will be appreciated that since according to various embodiments the internal aperture in the vacuum holding member or carrier 531 is substantially smaller in diameter than conventional arrangements, then the vacuum within the first and subsequent vacuum chambers of the instrument can be maintained for substantially longer periods of time than is possible conventionally when the disc 525 is removed and/or replaced.

Accordingly, the mass spectrometer 100 according to various embodiments does not require an isolation valve in contrast with other known mass spectrometers in order to maintain the vacuum within the instrument when a component such as the outer gas cone 517, the inner gas cone 513 or the disc 525 are removed.

A mass spectrometer 100 according to various embodiments therefore enables a reduced cost instrument to be provided which is also simpler for a user to operate since no isolation valve is needed. Furthermore, a user does not need to be understand or learn how to operate such an isolation valve.

The ion block assembly 802 may comprise a heater in order to keep the ion block 802 above ambient temperature in order to prevent droplets of analyte, solvent, neutral particles or condensation from forming within the ion block 802.

According to an embodiment when a user wishes to replace and/or remove either the outer cone 517 and/or the inner sampling cone 513 and/or the disc 525 then both the source or ion block heater and the desolvation heater 404 may be turned OFF. The temperature of the ion block 802 may be monitored by a thermocouple which may be provided within the ion block heater or which may be otherwise provided in or adjacent to the ion block 802.

When the temperature of the ion block is determined to have dropped below a certain temperature such as e.g. 550C then the user may be informed that the clamp 535, outer gas cone 517, inner gas sampling cone 513 and disc 525 are sufficiently cooled down such that a user can touch them without serious risk of injury.

According to various embodiment a user can simply remove and/or replace the outer gas cone 517 and/or inner gas sampling cone 513 and/or disc 525 in less than two minutes without needing to vent the instrument. In particular, the low pressure within the instrument is maintained for a sufficient period of time by the aperture in the fixed valve 690.

According to various embodiments the instrument may be arranged so that the maximum leak rate into the source or ion block 802 during sample cone maintenance is approx. 7 mbar L/s. For example, assuming a backing pump speed of 9 m3/hour (2.5 L/s) and a maximum acceptable pressure of 3 mbar, then the maximum leak rate during sampling cone maintenance may be approx. 2.5 L/s×3 mbar=7.5 mbar L/s.

The ion block 802 may comprise an ion block heater having a K-type thermistor. As will be described in more detail below, according to various embodiments the source (ion block) heater may be disabled to allow forced cooling of the source or ion block 802. For example, desolvation heater 404 and/or ion block heater may be switched OFF whilst API gas is supplied to the ion block 802 in order to cool it down. According to various embodiments either a desolvation gas flow and/or a nebuliser gas flow from the probe 401 may be directed towards the cone region 517,513 of the ion block 802. Additionally and/or alternatively, the cone gas supply may be used to cool the ion block 802 and the inner and outer cones 513,517. In particular, by turning the desolvation heater 404 OFF but maintaining a supply of nebuliser and/or desolvation gas from the probe 401 so as to fill the enclosure housing the ion block with ambient temperature nitrogen or other gas will have a rapid cooling effect upon the metal and plastic components forming the ion inlet assembly which may be touched by a user during servicing. Ambient temperature (e.g. in the range 18-25° C.) cone gas may also be supplied in order to assist with cooling the ion inlet assembly in a rapid manner. Conventional instruments do not have the functionality to induce rapid cooling of the ion block 802 and gas cones 521,513.

Liquid and gaseous exhaust from the source enclosure may be fed into a trap bottle. The drain tubing may be routed so as to avoid electronic components and wiring. The instrument may be arranged so that liquid in the source enclosure always drains out even when the instrument is switched OFF. For example, it will be understood that an LC flow into the source enclosure could be present at any time.

An exhaust check valve may be provided so that when the API gas is turned OFF the exhaust check valve prevents a vacuum from forming in the source enclosure and trap bottle. The exhaust trap bottle may have a capacity ≥5 L.

The fluidics system may comprise a piston pump which allows the automated introduction of a set-up solution into the ion source. The piston pump may have a flow rate range of 0.4 to 50 mL/min. A divert/select valve may be provided which allows rapid automated changeover between LC flow and the flow of one or two internal set-up solutions into the source.

According to various embodiments three solvent bottles 201 may be provided. Solvent A bottle may have a capacity within the range 250-300 mL, solvent B bottle may have a capacity within the range 50-60 mL and solvent C bottle may have a capacity within the range 100-125 mL. The solvent bottles 201 may be readily observable by a user who may easily refill the solvent bottles.

According to an embodiment solvent A may comprise a lock-mass, solvent B may comprise a calibrant and solvent C may comprise a wash. Solvent C (wash) may be connected to a rinse port.

A driver PCB may be provided in order to control the piston pump and the divert/select valve. On power-up the piston pump may be homed and various purge parameters may be set.

Fluidics may be controlled by software and may be enabled as a function of the instrument state and the API gas valve state in a manner as detailed below:

| Instrument state | API gas valve | Software control of fluidics |
|---|---|---|
| Operate | Open | Enabled |
| Operate | Closed | Disabled |
| Over-pressure | Open | Enabled |
| Over-pressure | Closed | Disabled |

| Instrument state | API gas valve | Software control of fluidics |
| --- | --- | --- |
| Power Save | Open | Disabled |
| Power Save | Closed | Disabled |

When software control of the fluidics is disabled then the valve is set to a divert position and the pump is stopped.

Figure 7A:
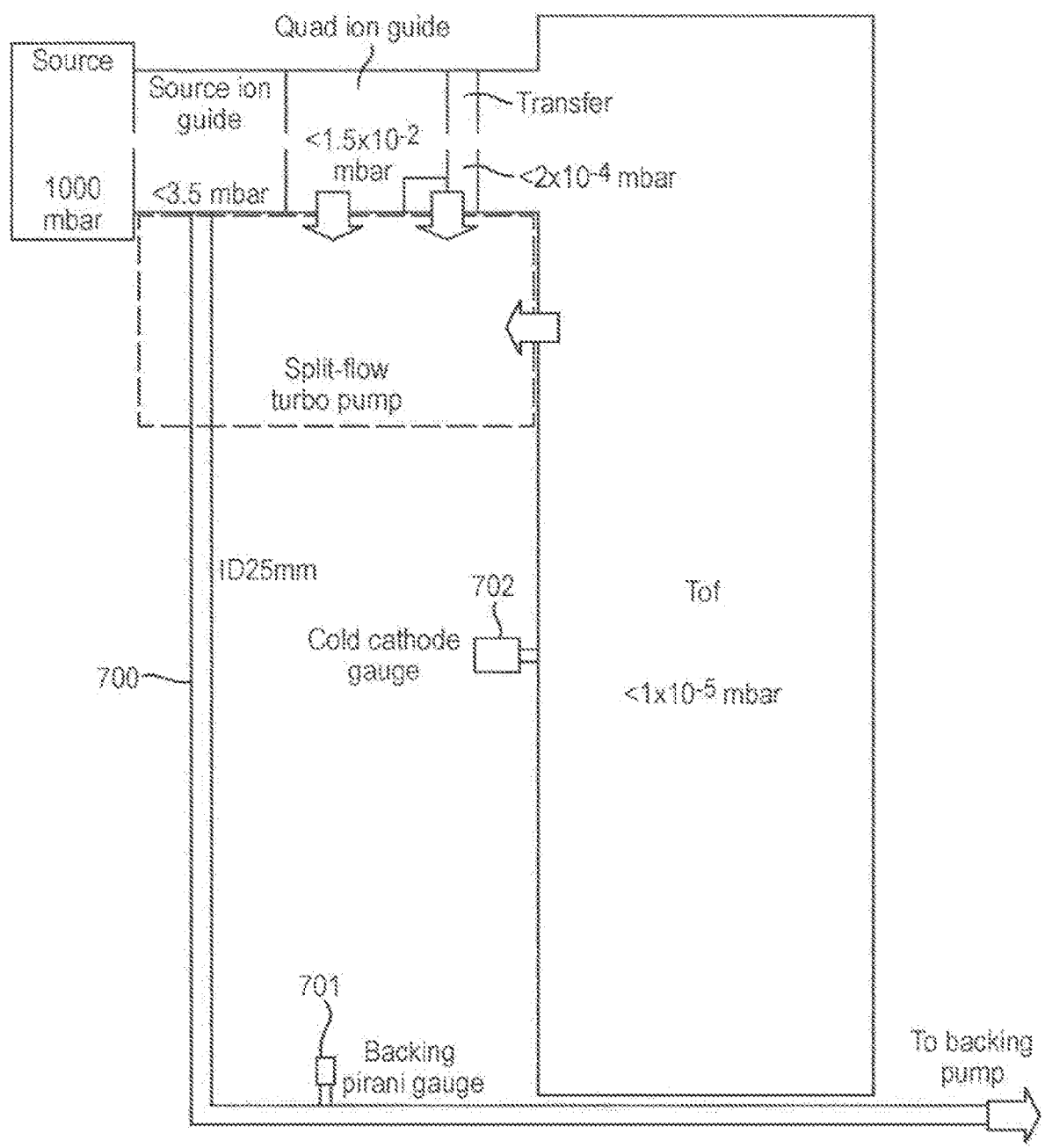
FIG. 7A shows a pumping arrangement according to various embodiments.

FIG. 7A illustrates a vacuum pumping arrangement according to various embodiments.

A split-flow turbo molecular vacuum pump (commonly referred to as a "turbo" pump) may be used to pump the fourth or further vacuum chamber or fourth or further differential pumping region, the third vacuum chamber or third differential pumping region, and the second vacuum chamber or second differential pumping region. According to an embodiment the turbo pump may comprise either a Pfeiffer® Splitflow 310 fitted with a TC110 controller or an Edwards® nEXT300/100/100D turbo pump. The turbo pump may be air cooled by a cooling fan.

The turbo molecular vacuum pump may be backed by a rough, roughing or backing pump such as a rotary vane vacuum pump or a diaphragm vacuum pump. The rough, roughing or backing pump may also be used to pump the first vacuum chamber housing the first ion guide 301. The rough, roughing or backing pump may comprise an Edwards® nRV14i backing pump. The backing pump may be provided external to the instrument and may be connected to the first vacuum chamber which houses the first ion guide 301 via a backing line 700 as shown in FIG. 7A.

A first pressure gauge such as a cold cathode gauge 702 may be arranged and adapted to monitor the pressure of the fourth or further vacuum chamber or fourth or further differential pumping region. According to an embodiment the Time of Flight housing pressure may be monitored by an Inficon® MAG500 cold cathode gauge 702.

A second pressure gauge such as a Pirani gauge 701 may be arranged and adapted to monitor the pressure of the backing pump line 700 and hence the first vacuum chamber which is in fluid communication with the upstream pumping block 600 and ion block 802. According to an embodiment the instrument backing pressure may be monitored by an Inficon® PSG500 Pirani gauge 701.

According to various embodiments the observed leak plus outgassing rate of the Time of Flight chamber may be arranged to be less than $4 \times 10-5$ mbar L/s. Assuming a 200 L/s effective turbo pumping speed then the allowable leak plus outgassing rate is $5 \times 10-7$ mbar$\times$200 L/s=$1 \times 10-4$ mbar L/s.

A turbo pump such as an Edwards® nEXT300/100/100D turbo pump may be used which has a main port pumping speed of 400 L/s. As will be detailed in more detail below, EMC shielding measures may reduce the pumping speed by approx. 20% so that the effective pumping speed is 320 L/s. Accordingly, the ultimate vacuum according to various embodiments may be $4 \times 10-5$ mbar L/s/320 L/s=$1.25 \times 10-7$ mbar.

Figure 7B:
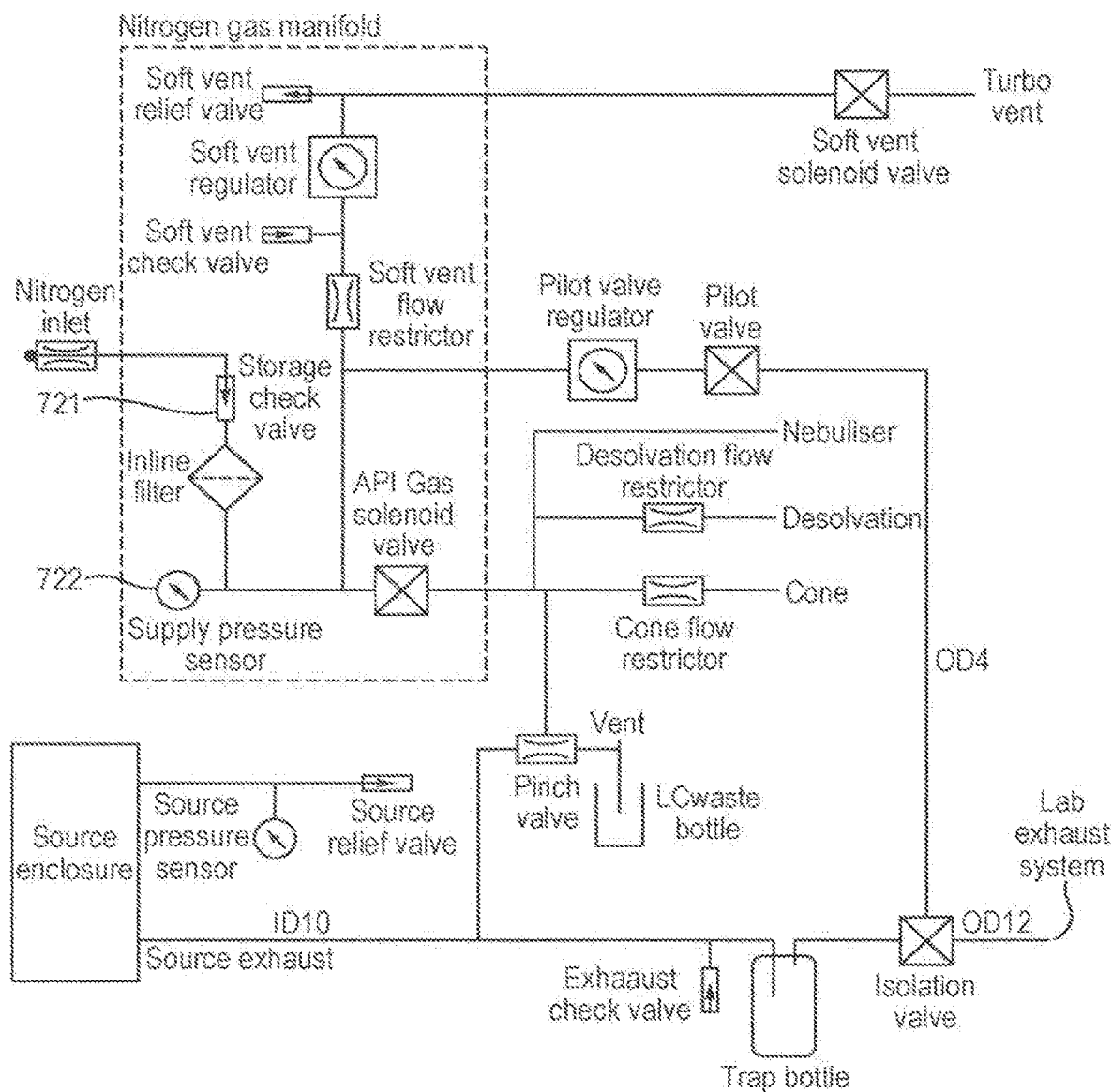
FIG. 7B shows further details of a gas handling system which may be implemented.

According to an embodiment a pump-down sequence may comprise closing a soft vent solenoid as shown in FIG. 7B, starting the backing pump and waiting until the backing pressure drops to 32 mbar. If 32 mbar is not reached within 3 minutes of starting the backing pump, then a vent sequence may be performed. Assuming that a pressure of 32 mbar is reached within 3 minutes then the turbo pump is then started. When the turbo speed exceeds 80% of maximum speed then the Time of Flight vacuum gauge 702 may then be switched ON. It will be understood that the vacuum gauge 702 is a sensitive detector and hence is only switched ON when the vacuum pressure is such that the vacuum gauge 702 which not be damaged.

If the turbo speed does not reach 80% of maximum speed within 8 minutes, then a vent sequence may be performed.

A pump-down sequence may be deemed completed once the Time of Flight vacuum chamber pressure is determined to be $<1 \times 10-5$ mbar.

If a vent sequence is to be performed, then the instrument may be switched to a Standby mode of operation. The Time of Flight vacuum gauge 702 may be switched OFF and the turbo pump may also be switched OFF. When the turbo pump speed falls to less than 80% of maximum then a soft vent solenoid valve as shown in FIG. 7B may be opened. The system may then wait for 10 seconds before then switching OFF the backing pump.

It will be understood by those skilled in the art that the purpose of the turbo soft vent solenoid valve as shown in FIG. 7B and the soft vent line is to enable the turbo pump to be vented at a controlled rate. It will be understood that if the turbo pump is vented at too fast a rate then the turbo pump may be damaged.

The instrument may switch into a maintenance mode of operation which allows an engineer to perform service work on all instrument sub-systems except for the vacuum system or a subsystem incorporating the vacuum system without having to vent the instrument. The instrument may be pumped down in maintenance mode and conversely the instrument may also be vented in maintenance mode.

A vacuum system protection mechanism may be provided wherein if the turbo speed falls to less than 80% of maximum speed then a vent sequence is initiated. Similarly, if the backing pressure increases to greater than 10 mbar then a vent sequence may also be initiated. According to an embodiment if the turbo power exceeds 120 W for more than 15 minutes then a vent sequence may also be initiated. If on instrument power-up the turbo pump speed is >80% of maximum then the instrument may be set to a pumped state, otherwise the instrument may be set to a venting state.

FIG. 7B shows a schematic of a gas handling system which may be utilised according to various embodiments. A storage check valve 721 may be provided which allows the instrument to be filled with nitrogen for storage and transport. The storage check valve 721 is in fluid communication with an inline filter.

A soft vent flow restrictor may be provided which may limit the maximum gas flow to less than the capacity of a soft vent relief valve in order to prevent the analyser pressure from exceeding 0.5 bar in a single fault condition. The soft vent flow restrictor may comprise an orifice having a diameter in the range 0.70 to 0.75 mm.

A supply pressure sensor 722 may be provided which may indicate if the nitrogen pressure has fallen below 4 bar.

An API gas solenoid valve may be provided which is normally closed and which has an aperture diameter of not less than 1.4 mm.

An API gas inlet is shown which preferably comprises a Nitrogen gas inlet. According to various embodiments the nebuliser gas, desolvation gas and cone gas are all supplied from a common source of nitrogen gas.

A soft vent regulator may be provided which may function to prevent the analyser pressure exceeding 0.5 bar in normal condition.

A soft vent check valve may be provided which may allow the instrument to vent to atmosphere in the event that the nitrogen supply is OFF.

A soft vent relief valve may be provided which may have a cracking pressure of 345 mbar. The soft vent relief valve may function to prevent the pressure in the analyser from exceeding 0.5 bar in a single fault condition. The gas flow rate through the soft vent relief valve may be arranged so as not to be less than 2000 L/h at a differential pressure of 0.5 bar.

The soft vent solenoid valve may normally be in an open position. The soft vent solenoid valve may be arranged to restrict the gas flow rate in order to allow venting of the turbo pump at 100% rotational speed without causing damage to the pump. The maximum orifice diameter may be 1.0 mm.

The maximum nitrogen flow may be restricted such that in the event of a catastrophic failure of the gas handling the maximum leak rate of nitrogen into the lab should be less than 20% of the maximum safe flow rate. According to various embodiments an orifice having a diameter of 1.4 to 1.45 mm may be used.

A source pressure sensor may be provided.

A source relief valve having a cracking pressure of 345 mbar may be provided. The source relief valve may be arranged to prevent the pressure in the source from exceeding 0.5 bar in a single fault condition. The gas flow rate through the source relief valve may be arranged so as not to be less than 2000 L/h at a differential pumping pressure of 0.5 bar. A suitable valve is a Ham-Let® H-480-S-G-1/4-5 psi valve.

A cone restrictor may be provided to restrict the cone flow rate to 36 L/hour for an input pressure of 7 bar. The cone restrictor may comprise a 0.114 mm orifice.

The desolvation flow may be restricted by a desolvation flow restrictor to a flow rate of 940 L/hour for an input pressure of 7 bar. The desolvation flow restrictor may comprise a 0.58 mm orifice.

A pinch valve may be provided which has a pilot operating pressure range of at least 4 to 7 bar gauge. The pinch valve may normally be open and may have a maximum inlet operating pressure of at least 0.5 bar gauge.

When the instrument is requested to turn the API gas OFF, then control software may close the API gas valve, wait 2 seconds and then close the source exhaust valve.

In the event of an API gas failure wherein the pressure switch opens (pressure <4 bar) then software control of the API gas may be disabled and the API gas valve may be closed. The system may then wait 2 seconds before closing the exhaust valve.

In order to turn the API gas ON a source pressure monitor may be turned ON except while a source pressure test is performed. An API gas ON or OFF request from software may be stored as an API Gas Request state which can either be ON or OFF. Further details are presented below:

| API Gas Request state | API Gas Control state | API gas valve |
|---|---|---|
| ON | Enabled | Open |
| ON | Disabled | Closed |
| OFF | Enabled | Closed |
| OFF | Disabled | Closed |

Figure 7C:
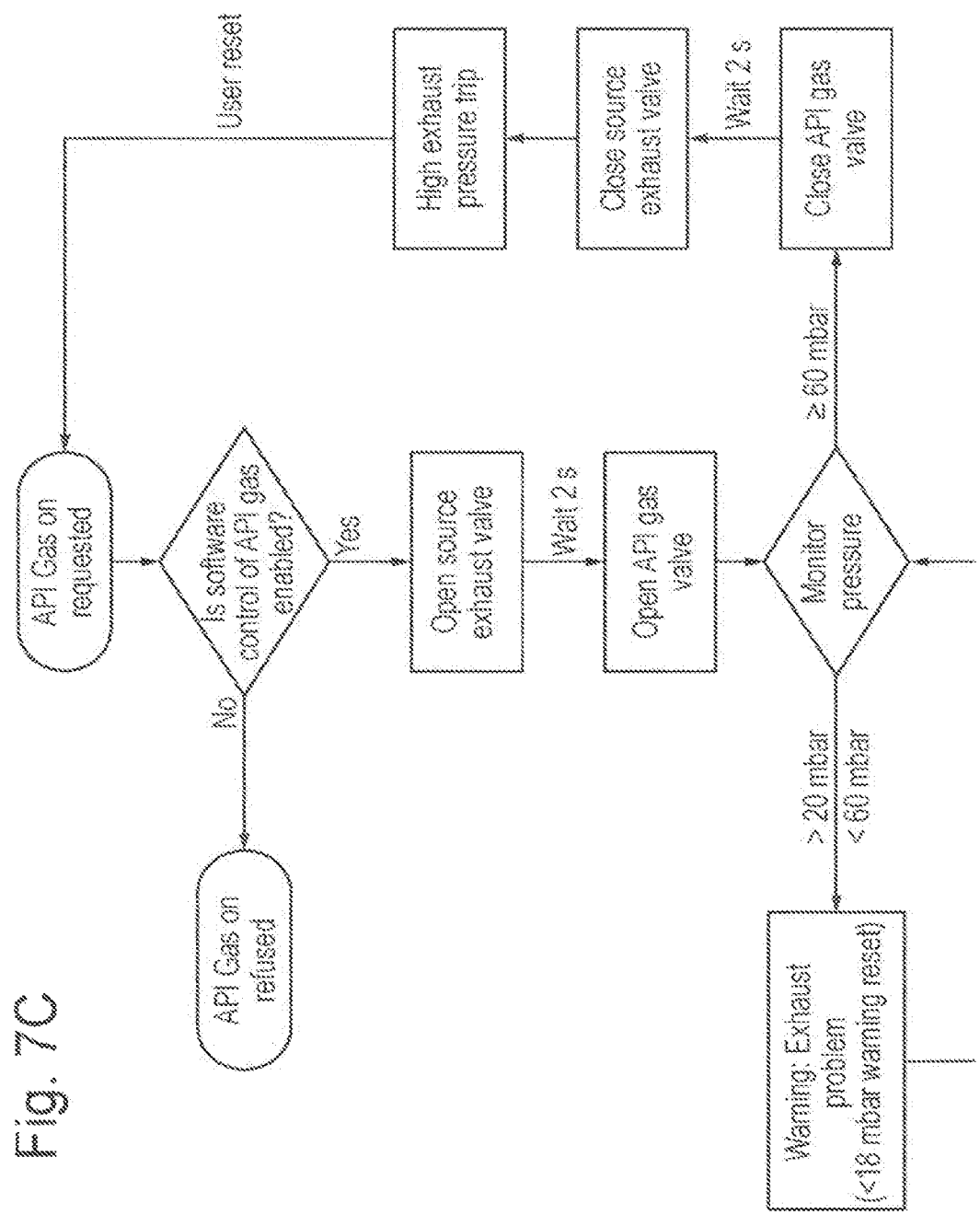
FIG. 7C shows a flow diagram illustrating the steps which may be performed following a user request to the turn the Atmospheric Pressure Ionisation ("API") gas ON and FIG. 7D shows a flow chart illustrating a source pressure test which may be performed according to various embodiments.

FIG. 7C shows a flow diagram showing an instrument response to a user request to turn the API gas ON. A determination may be made as to whether or not software control of API gas is enabled. If software control is not enabled, then the request may be refused. If software control of API gas is enabled, then the open source exhaust valve may be opened. Then after a delay of 2 seconds the API gas valve may be opened. The pressure is then monitored. If the pressure is determined to be between 20-60 mbar, then a warning message may be communicated or issued. If the pressure is greater than 60 mbar, then then the API gas valve may be closed. Then after a delay of 2 seconds the source exhaust valve may be closed and a high exhaust pressure trip may occur.

A high exhaust pressure trip may be reset by running a source pressure test.

According to various embodiments the API gas valve may be closed within 100 ms of an excess pressure being sensed by the source pressure sensor.

Figure 7D:
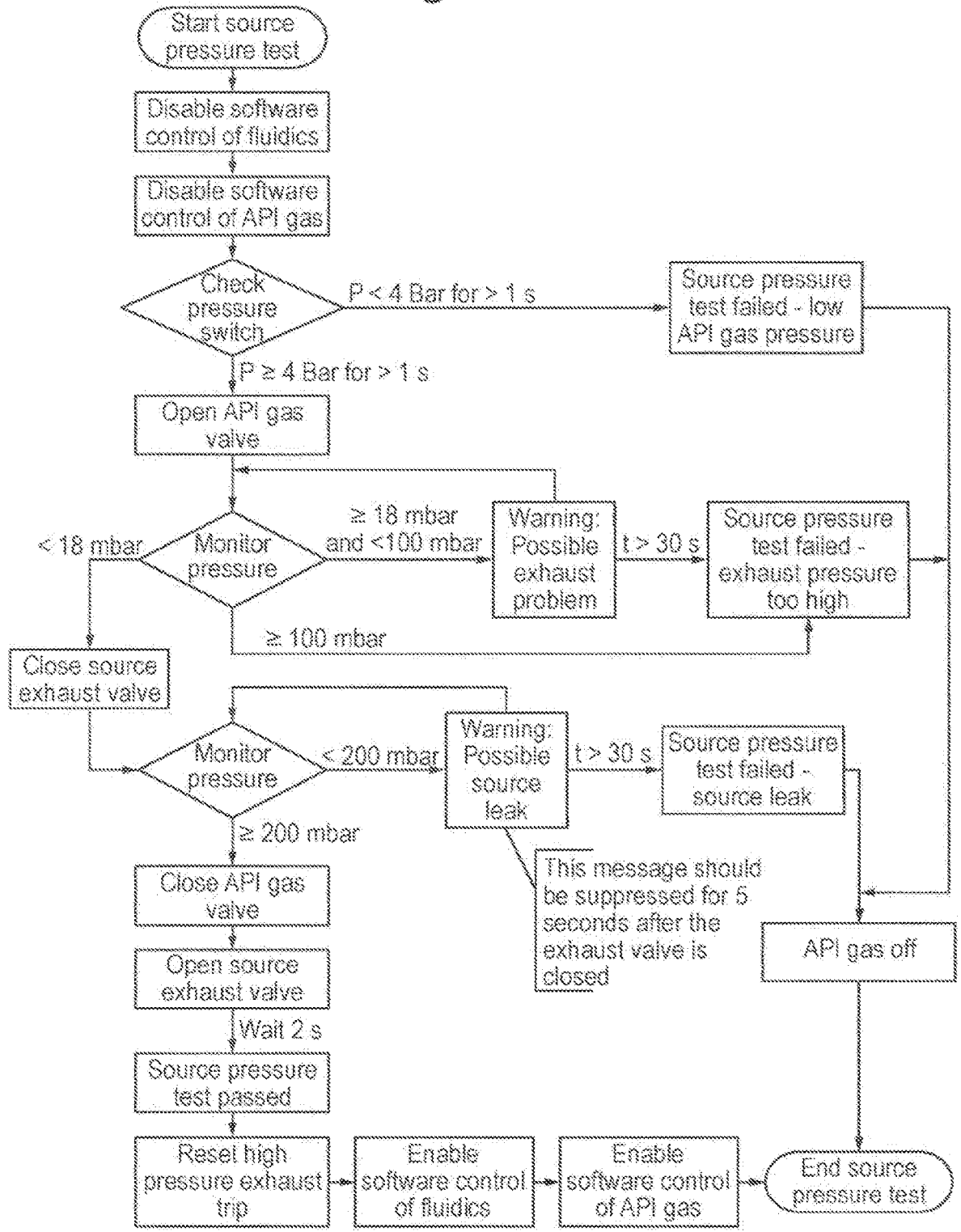

FIG. 7D shows a flow diagram illustrating a source pressure test which may be performed according to various embodiments. The source pressure test may be commenced and software control of fluidics may be disabled so that no fluid flows into the Electrospray probe 401.

Software control of the API gas may also be disabled i.e. the API is turned OFF. The pressure switch may then be checked. If the pressure is above 4 bar for more than 1 second, then the API gas valve may be opened. However, if the pressure is less than 4 bar for more than 1 second then the source pressure test may move to a failed state due to low API gas pressure.

Assuming that the API gas valve is opened then the pressure may then be monitored. If the pressure is in the range 18-100 mbar, then a warning message may be output indicating a possible exhaust problem. If the warning status continues for more than 30 seconds, then the system may conclude that the source pressure test has failed due to the exhaust pressure being too high.

If the monitored pressure is determined to be less than 18 mbar, then the source exhaust valve is closed.

The pressure may then again be monitored. If the pressure is less than 200 mbar, then a warning message indicating a possible source leak may be issued.

If the pressure is determined to be greater than 200 mbar, then the API gas valve may be closed and the source exhaust valve may be opened i.e. the system looks to build pressure and to test for leaks. The system may then wait 2 seconds before determining that the source pressure test is passed.

If the source pressure test has been determined to have been passed, then the high pressure exhaust trip may be reset and software control of fluidics may be enabled. Software control of the API gas may then be enabled and the source pressure test may then be concluded.

According to various embodiments the API gas valve may be closed within 100 ms of an excess pressure being sensed by the source pressure sensor.

In the event of a source pressure test failure, the divert valve position may be set to divert and the valve may be kept in this position until the source pressure test is either passed or the test is over-ridden.

It is contemplated that the source pressure test may be over-ridden in certain circumstances. Accordingly, a user may be permitted to continue to use an instrument where they have assessed any potential risk as being acceptable. If the user is permitted to continue using the instrument, then the source pressure test status message may still be displayed in order to show the original failure. As a result, a user may be reminded of the continuing failed status so that the user may continually re-evaluate any potential risk.

In the event that a user requests a source pressure test over-ride then the system may reset a high pressure exhaust trip and then enable software control of the divert valve. The system may then enable software control of the API gas before determining that the source pressure test over-ride is complete.

The pressure reading used in the source pressure test and source pressure monitoring may include a zero offset correction.

The gas and fluidics control responsibility may be summarised as detailed below:

| Mode of operation | Software | Electronics |
|---|---|---|
| Operate | Gas and fluidics | None |
| Power save | Gas | Fluidics |
| Standby | Gas | Fluidics |
| SPT/Failure | None | Gas and fluidics |
| Vacuum loss | None | Gas and fluidics |
| Gas fail state | None | Gas and fluidics |
| Operate gas OFF | Gas | Fluidics |

A pressure test may be initiated if a user triggers an interlock.

The instrument may operate in various different modes of operation. If the turbo pump speed falls to less than 80% of maximum speed whilst in Operate, Over-pressure or Power save mode then the instrument may enter a Standby state or mode of operation.

If the pressure in the Time of Flight vacuum chamber is greater than $1 \times 10^{-5}$ mbar and/or the turbo speed is less than 80% of maximum speed, then the instrument may be prevented from operating in an Operate mode of operation.

According to various embodiments the instrument may be operated in a Power save mode. In a Power save mode of operation the piston pump may be stopped. If the instrument is switched into a Power save mode while the divert valve is in the LC position, then the divert valve may change to a divert position. A Power save mode of operation may be considered as being a default mode of operation wherein all back voltages are kept ON, front voltages are turned OFF and gas is OFF.

If the instrument switches from a Power save mode of operation to an Operate mode of operation, then the piston pump divert valves may be returned to their previous states i.e. their states immediately before a Power save mode of operation was entered.

If the Time of Flight region pressure rises above $1.5 \times 10^{-5}$ mbar while the instrument is in an Operate mode of operation, then the instrument may enter an Over-pressure mode of operation or state.

If the Time of Flight pressure enters the range $1 \times 10^{-8}$ to $1 \times 10^{-5}$ mbar while the instrument is in an Over-pressure mode of operation, then the instrument may enter an Operate mode of operation.

If the API gas pressure falls below its trip level while the instrument is in an Operate mode of operation, then the instrument may enter a Gas Fail state or mode of operation. The instrument may remain in a Gas Fail state until both: (i) the API gas pressure is above its trip level; and (ii) the instrument is operated in either Standby or Power save mode.

According to an embodiment the instrument may transition from an Operate mode of operation to an Operate with Source Interlock Open mode of operation when the source cover is opened. Similarly, the instrument may transition from an Operate with Source Interlock Open mode of operation to an Operate mode of operation when the source cover is closed.

According to an embodiment the instrument may transition from an Over-pressure mode of operation to an Over-pressure with Source Interlock Open mode of operation when the source cover is opened. Similarly, the instrument may transition from an Over-pressure with Source Interlock Open mode of operation to an Over-pressure mode of operation when the source cover is closed.

The instrument may operate in a number of different modes of operation which may be summarised as follows:

| Mode of operation | Analyser voltages | Front end voltages | Desolvation heater | Source heater | API gas control state |
|---|---|---|---|---|---|
| Standby | OFF | OFF | OFF | ON | Enabled |
| Operate | ON | ON | ON | ON | Enabled |
| Power Save | ON | OFF | OFF | ON | Enabled |
| Over-pressure | OFF | ON | ON | ON | Enabled |
| Gas Fail | ON | OFF | OFF | ON | Disabled |
| Operate with Source Interlock | ON | OFF | OFF | OFF | Disabled |
| Over-pressure with Source interlock | OFF | OFF | OFF | OFF | Disabled |
| Not Pumped | OFF | OFF | OFF | OFF | Enabled |

Reference to front end voltages relates to voltages which are applied to the Electrospray capillary electrode 402, the source offset, the source or first ion guide 301, aperture #1 (see FIG. 15A) and the quadrupole ion guide 302.

Reference to analyser voltages relates to all high voltages except the front end voltages.

Reference to API gas refers to desolvation, cone and nebuliser gases.

Reference to Not Pumped refers to all vacuum states except pumped.

If any high voltage power supply loses communication with the overall system or a global circuitry control module, then the high voltage power supply may be arranged to switch OFF its high voltages. The global circuitry control module may be arranged to detect the loss of communication of any subsystem such as a power supply unit ("PSU"), a pump or gauge etc.

According to various embodiments the system will not indicate its state or mode of operation as being Standby if the system is unable to verify that all subsystems are in a Standby state.

As is apparent from the above table, when the instrument is operated in an Operate mode of operation then all voltages are switched ON. When the instrument transitions to operate in an Operate mode of operation then the following voltages are ON namely transfer lens voltages, ion guide voltages, voltages applied to the first ion guide 301 and the capillary electrode 402. In addition, the desolvation gas and desolvation heater are all ON.

If a serious fault were to develop then the instrument may switch to a Standby mode of operation wherein all voltages apart from the source heater provided in the ion block 802 are turned OFF and only a service engineer can resolve the fault. It will be understood that the instrument may only be put into a Standby mode of operation wherein voltages apart from the source heater in the ion block 802 are turned OFF only if a serious fault occurs or if a service engineer specifies that the instrument should be put into a Standby mode operation. A user or customer may (or may not) be able to place an instrument into a Standby mode of operation.

Accordingly, in a Standby mode of operation all voltages are OFF and the desolvation gas flow and desolvation heater 404 are all OFF. Only the source heater in the ion block 802 may be left ON.

The instrument may be kept in a Power Save mode by default and may be switched so as to operate in an Operate mode of operation wherein all the relevant voltages and gas flows are turned ON. This approach significantly reduces the time taken for the instrument to be put into a useable state. When the instrument transitions to a Power Save mode of operation then the following voltages are ON—pusher electrode 305, reflectron 306, ion detector 307 and more generally the various Time of Flight mass analyser 304 voltages.

The stability of the power supplies for the Time of Flight mass analyser 304, ion detector 307 and reflectron 306 can affect the mass accuracy of the instrument. The settling time when turning ON or switching polarity on a known conventional instrument is around 20 minutes.

It has been established that if the power supplies are cold or have been left OFF for a prolonged period of time then they may require up to 10 hours to warm up and stabilise. For this reason customers may be prevented from going into a Standby mode of operation which would switch OFF the voltages to the Time of Flight analyser 304 including the reflectron 306 and ion detector 307 power supplies.

On start-up the instrument may move to a Power save mode of operation as quickly as possible as this allows the power supplies the time they need to warm up whilst the instrument is pumping down. As a result, by the time the instrument has reached the required pressure to carry out instrument setup the power supplies will have stabilised thus reducing any concerns relating to mass accuracy.

According to various embodiments in the event of a vacuum failure in the vacuum chamber housing the Time of Flight mass analyser 304 then power may be shut down or turned OFF to all the peripherals or sub-modules e.g. the ion source 300, first ion guide 301, the segmented quadrupole rod set ion guide 302, the transfer optics 303, the pusher electrode 305 high voltage supply, the reflectron 306 high voltage supply and the ion detector 307 high voltage supply. The voltages are primarily all turned OFF for reasons of instrument protection and in particular protecting sensitive components of the Time of Flight mass analyser 307 from high voltage discharge damage.

It will be understood that high voltages may be applied to closely spaced electrodes in the Time of Flight mass analyser 304 on the assumption that the operating pressure will be very low and hence there will be no risk of sparking or electrical discharge effects. Accordingly, in the event of a serious vacuum failure in the vacuum chamber housing the Time of Flight mass analyser 304 then the instrument may remove power or switch power OFF to the following modules or sub-modules: (i) the ion source high voltage supply module; (ii) the first ion guide 301 voltage supply module; (iii) the quadrupole ion guide 302 voltage supply module; (iv) the high voltage pusher electrode 305 supply module; (v) the high voltage reflectron 306 voltage supply module; and (vi) the high voltage detector 307 module. The instrument protection mode of operation is different to a Standby mode of operation wherein electrical power is still supplied to various power supplies or modules or sub-modules. In contrast, in an instrument protection mode of operation power is removed to the various power supply modules by the action of a global circuitry control module. Accordingly, if one of the power supply modules were faulty it would still be unable in a fault condition to turn voltages ON because the module would be denied power by the global circuitry control module.

Figure 8:
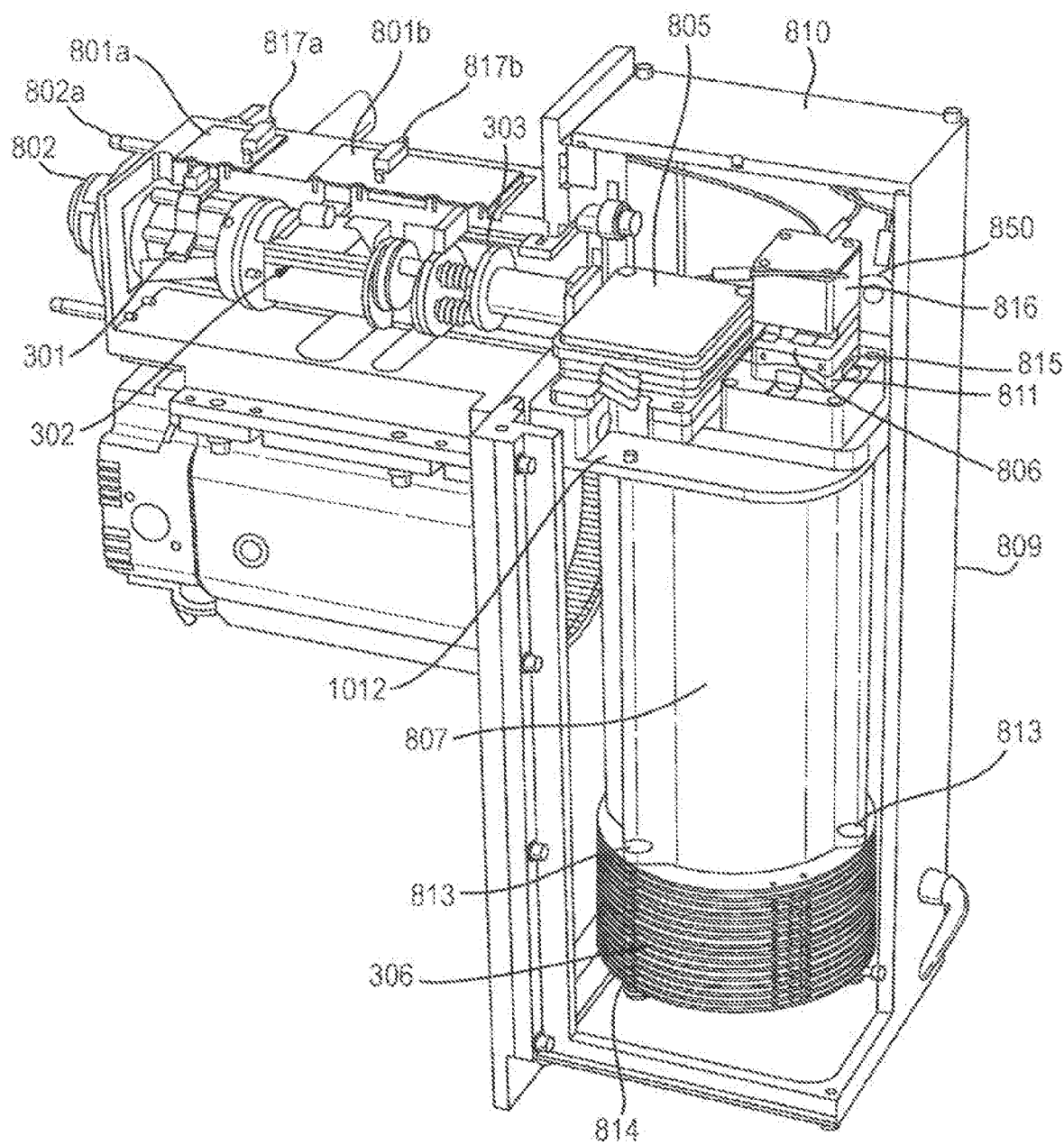
FIG. 8 shows in more detail a mass spectrometer according to various embodiments.

FIG. 8 shows a view of a mass spectrometer 100 according to various embodiments in more detail. The mass spectrometer 100 may comprise a first vacuum PCB interface 801a having a first connector 817a for directly connecting the first vacuum interface PCB 801a to a first local control circuitry module (not shown) and a second vacuum PCB interface 801b having a second connector 817b for directly connecting the second vacuum interface PCB 801b to a second local control circuitry module (not shown).

The mass spectrometer 100 may further comprise a pumping or ion block 802 which is mounted to a pumping block or thermal isolation stage (not viewable in FIG. 8). According to various embodiments one or more dowels or projections 802a may be provided which enable a source enclosure (not shown) to connect to and secure over and house the ion block 802. The source enclosure may serve the purpose of preventing a user from inadvertently coming into contact with any high voltages associated with the Electrospray probe 402. A micro-switch or other form of interlock may be used to detect opening of the source enclosure by a user in order to gain source access whereupon high voltages to the ion source 402 may then be turned OFF for user safety reasons.

Ions are transmitted via an initial or first ion guide 301, which may comprise a conjoined ring ion guide, and then via a segmented quadrupole rod set ion guide 302 to a transfer lens or transfer optics arrangement 303. The transfer optics 303 may be designed in order to provide a highly efficient ion guide and interface into the Time of Flight mass analyser 304 whilst also reducing manufacturing costs.

Ions may be transmitted via the transfer optics 303 so that the ions arrive in a pusher electrode assembly 305. The pusher electrode assembly 305 may also be designed so as to provide high performance whilst at the same time reducing manufacturing costs.

According to various embodiments a cantilevered Time of Flight stack 807 may be provided. The cantilevered arrangement may be used to mount a Time of Flight stack or flight tube 807 and has the advantage of both thermally and electrically isolating the Time of Flight stack or flight tube 807. The cantilevered arrangement represents a significant design departure from conventional instruments and results in substantial improvements in instrument performance.

According to an embodiment an alumina ceramic spacer and a plastic (PEEK) dowel may be used.

According to an embodiment when a lock mass is introduced and the instrument is calibrated then the Time of Flight stack or flight tube 807 will not be subjected to thermal expansion. The cantilevered arrangement according to various embodiments is in contrast to known arrangements wherein both the reflectron 306 and the pusher assembly 305 were mounted to both ends of a side flange. As a result conventional arrangements were subjected to thermal impact.

Ions may be arranged to pass into a flight tube 807 and may be reflected by a reflectron 306 towards an ion detector 811. The output from the ion detector 811 is passed to a pre-amplifier (not shown) and then to an Analogue to Digital Converter ("ADC") (also not shown).

The reflectron 306 is preferably designed so as to provide high performance whilst also reducing manufacturing cost and improving reliability.

As shown in FIG. 8 the various electrode rings and spacers which collectively form the reflectron subassembly may be mounted to a plurality of PEEK support rods 814. The reflectron subassembly may then be clamped to the flight tube 807 using one or more cotter pins 813. As a result, the components of the reflectron subassembly are held under compression which enables the individual electrodes forming the reflectron to be maintained parallel to each other with a high level of precision. According to various embodiments the components may be held under spring loaded compression.

The pusher electrode assembly 305 and the detector electronics or a discrete detector module may be mounted to a common pusher plate assembly 1012. This is described in more detail below with reference to FIGS. 10A-10C.

The Time of Flight mass analyser 304 may have a full length cover 809 which may be readily removed enabling extensive service access. The full length cover 809 may be held in place by a plurality of screws e.g. 5 screws. A service engineer may undo the five screws in order to expose the full length of the time of flight tube 807 and the reflectron 306.

The mass analyser 304 may further comprise a removable lid 810 for quick service access. In particular, the removable lid 810 may provide access to a service engineer so that the service engineer can replace an entrance plate 1000 as shown in FIG. 10C. In particular, the entrance plate 1000 may become contaminated due to ions impacting upon the surface of the entrance plate 1000 resulting in surface charging effects and potentially reducing the efficiency of ion transfer from the transfer optics 303 into a pusher region adjacent the pusher electrode 305.

A SMA (SubMiniature version A) connector or housing 850 is shown but an AC coupler 851 is obscured from view.

Figure 9:
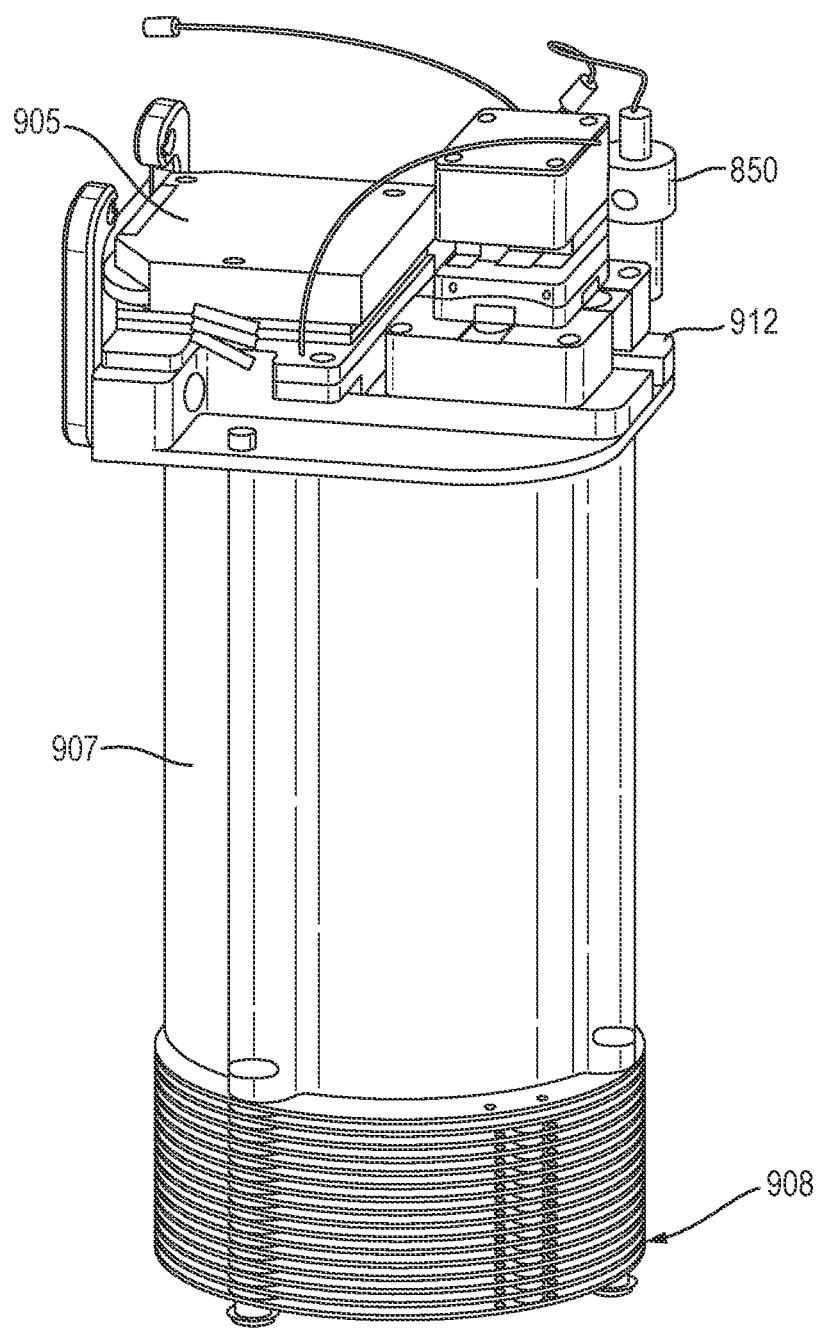
FIG. 9 shows a Time of Flight mass analyser assembly comprising a pusher plate assembly having mounted thereto a pusher electronics module and an ion detector module and wherein a reflectron assembly is suspended from an extruded flight tube which in turn is suspended from the pusher plate assembly.

FIG. 9 shows a pusher plate assembly 912, flight tube 907 and reflectron stack 908. A pusher assembly 905 having a pusher shielding cover is also shown. The flight tube 907 may comprise an extruded or plastic flight tube. The reflectron 306 may utilise fewer ceramic components than conventional reflectron assemblies thereby reducing manufacturing cost. According to various embodiments the reflectron 306 may make greater use of PEEK compared with conventional reflectron arrangements.

A SMA (SubMiniature version A) connector or housing 850 is shown but an AC coupler 851 is obscured from view.

According to other embodiments the reflectron 306 may comprise a bonded reflectron. According to another embodiment the reflectron 306 may comprise a metalised ceramic arrangement. According to another embodiment the reflectron 306 may comprise a jigged then bonded arrangement.

According to alternative embodiments instead of stacking, mounting and fixing multiple electrodes or rings, a single bulk piece of an insulating material such as a ceramic may be provided. Conductive metalised regions on the surface may then be provided with electrical connections to these regions so as to define desired electric fields. For example, the inner surface of a single piece of cylindrical shaped ceramic may have multiple parallel metalised conductive rings deposited as an alternative method of providing potential surfaces as a result of stacking multiple individual rings as is known conventionally. The bulk ceramic material provides insulation between the different potentials applied to different surface regions. The alternative arrangement reduces the number of components thereby simplifying the overall design, improving tolerance build up and reducing manufacturing cost. Furthermore, it is contemplated that multiple devices may be constructed this way and may be combined with or without grids or lenses placed in between. For example, according to one embodiment a first grid electrode may be provided, followed by a first ceramic cylindrical element, followed by a second grid electrode followed by a second ceramic cylindrical element.

Figure 10A:
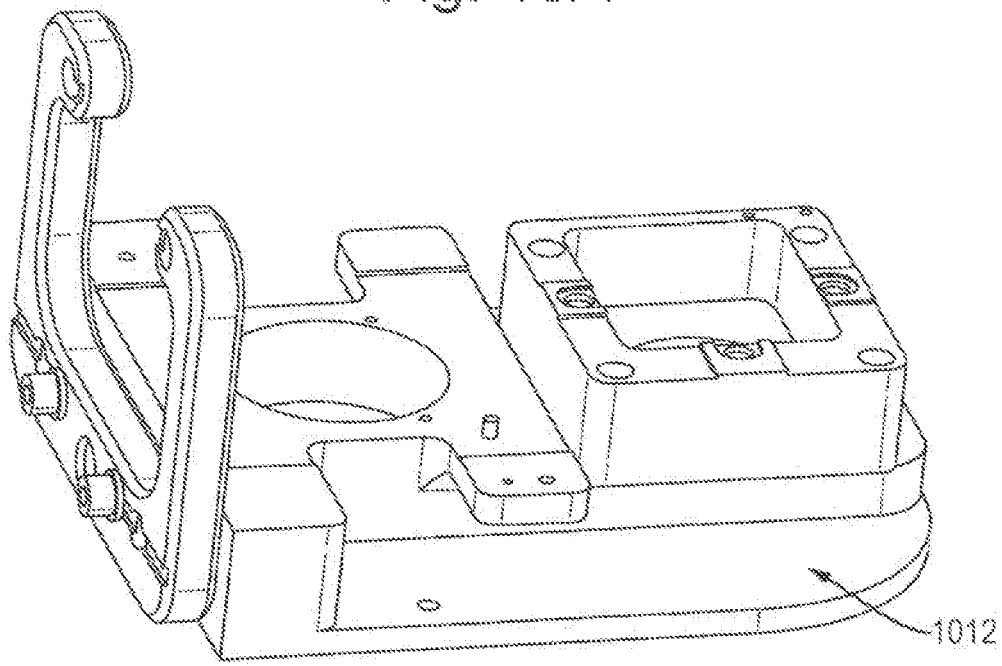
FIG. 10A shows in more detail a pusher plate assembly.
Figure 10B:
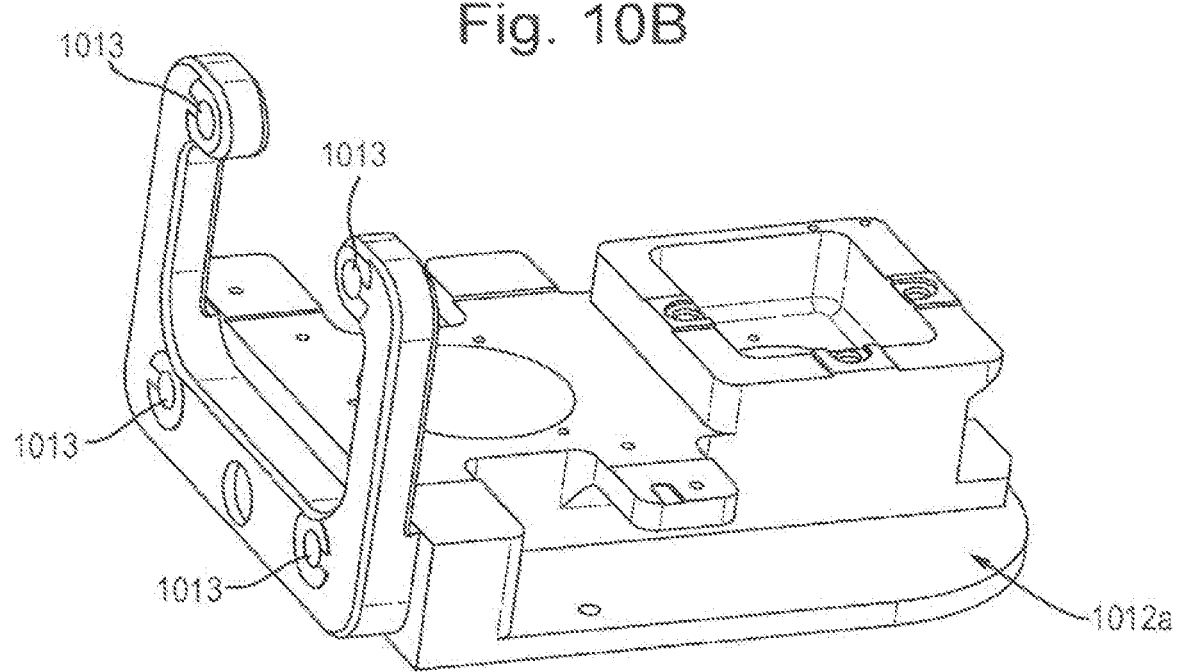
FIG. 10B shows a monolithic pusher plate assembly according to various embodiments and FIG. 10C shows a pusher plate assembly with a pusher electrode assembly or module and an ion detector assembly or module mounted thereto.
Figure 10C:
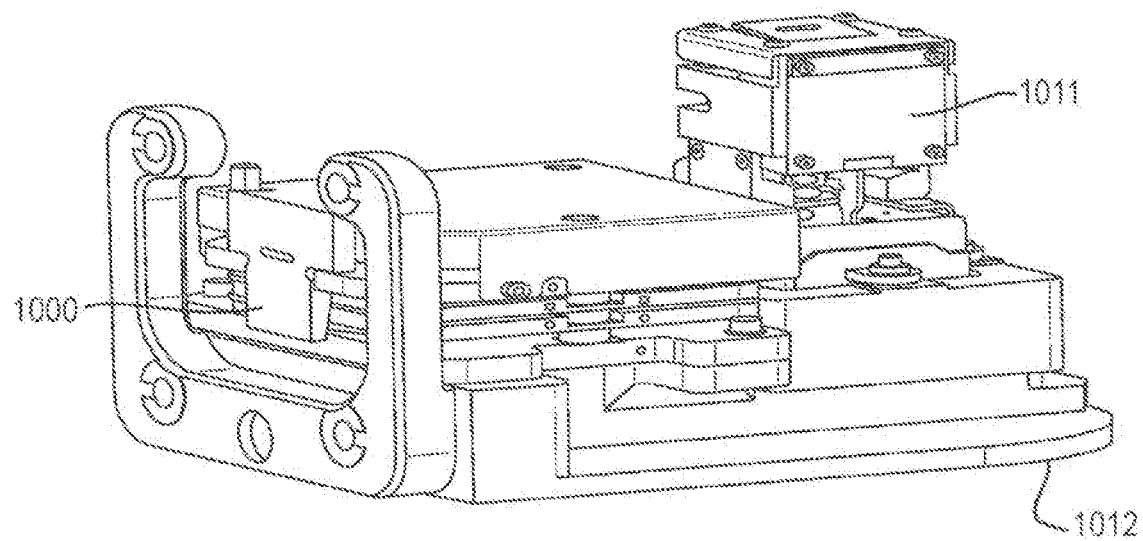

FIG. 10A shows a pusher plate assembly 1012 comprising three parts according to various embodiments. According to an alternative embodiment a monolithic support plate 1012*a* may be provided as shown in FIG. 10B. The monolithic support plate 1012*a* may be made by extrusion. The support plate 1012*a* may comprise a horse shoe shaped bracket having a plurality (e.g. four) fixing points 1013. According to an embodiment four screws may be used to connect the horse shoe shaped bracket to the housing of the mass spectrometer and enable a cantilevered arrangement to be provided. The bracket may be maintained at a voltage which may be the same as the Time of Flight voltage i.e. 4.5 kV. By way of contrast, the mass spectrometer housing may be maintained at ground voltage i.e. 0V.

FIG. 10C shows a pusher plate assembly 1012 having mounted thereon a pusher electrode assembly and an ion detector assembly 1011. An entrance plate 1000 having an ion entrance slit or aperture is shown.

Figure 16A:
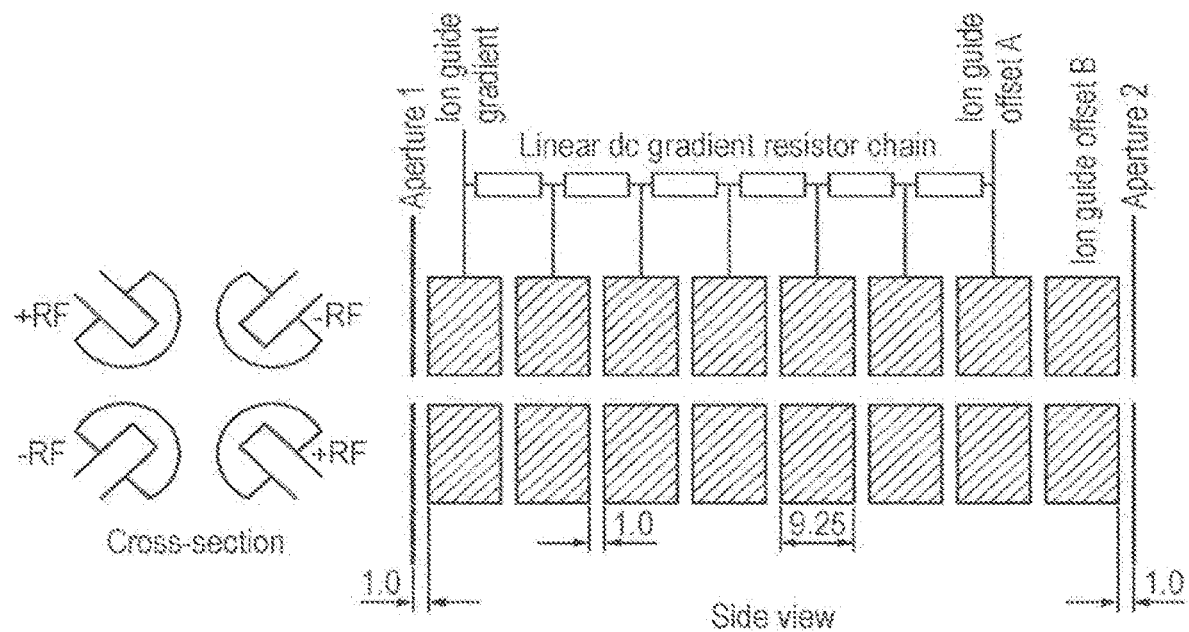
FIG. 16A shows in more detail a segmented quadrupole rod set ion guide according to various embodiments which may be provided downstream of the first ion guide and which comprises a plurality of rod electrodes.
Figure 16B:
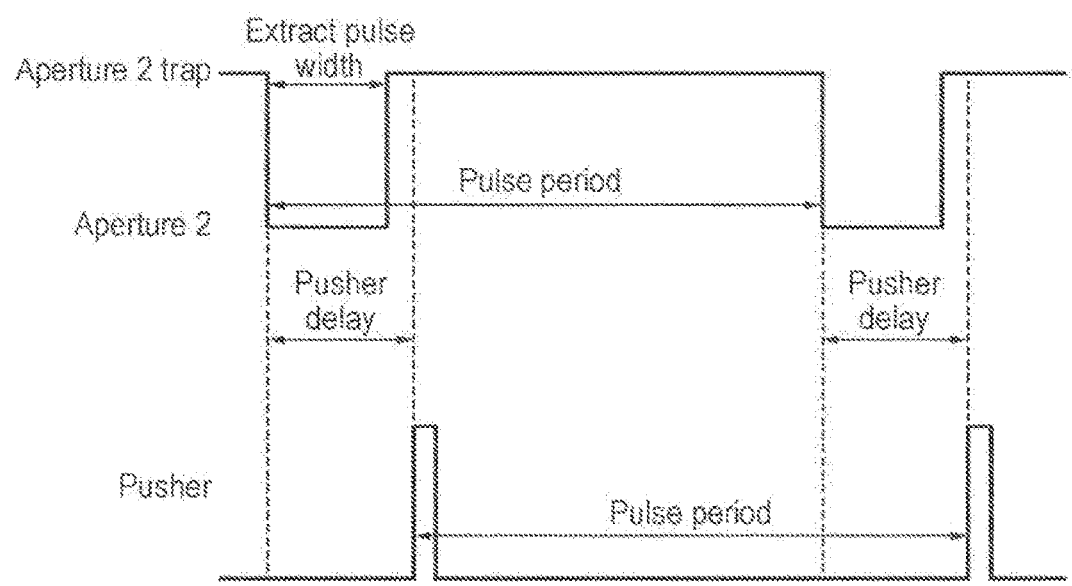
FIG. 16B illustrates how a voltage pulse applied to a pusher electrode of a Time of Flight mass analyser may be synchronised with trapping and releasing ions from the end region of the segmented quadrupole rod set ion guide.
Figure 16C:
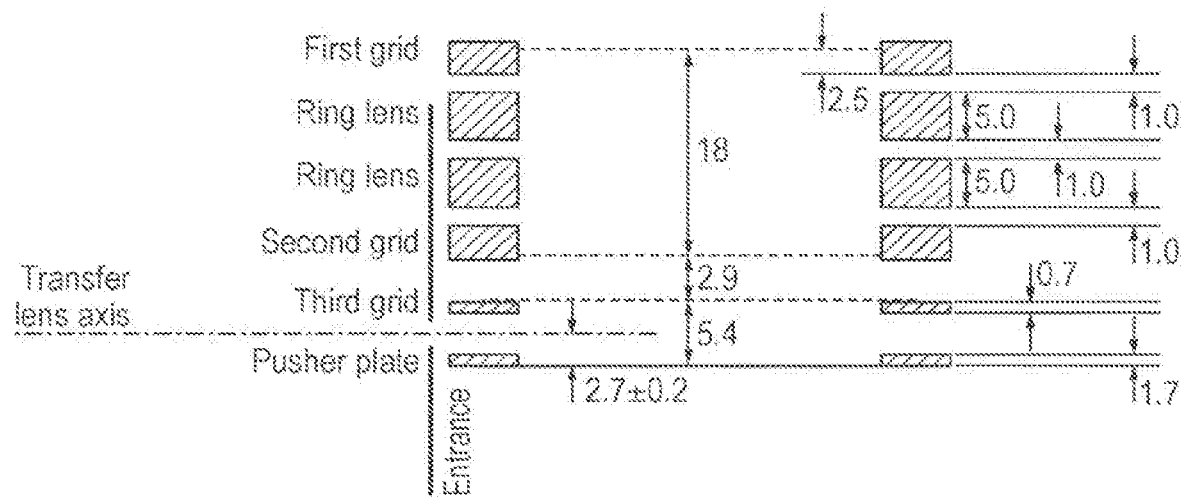
FIG. 16C illustrates in more detail the pusher electrode geometry and shows the arrangement of grid and ring lenses or electrodes and their relative spacing.

The pusher electrode may comprise a double grid electrode arrangement having a 2.9 mm field free region between a second and third grid electrode as shown in more detail in FIG. 16C.

Figure 11:
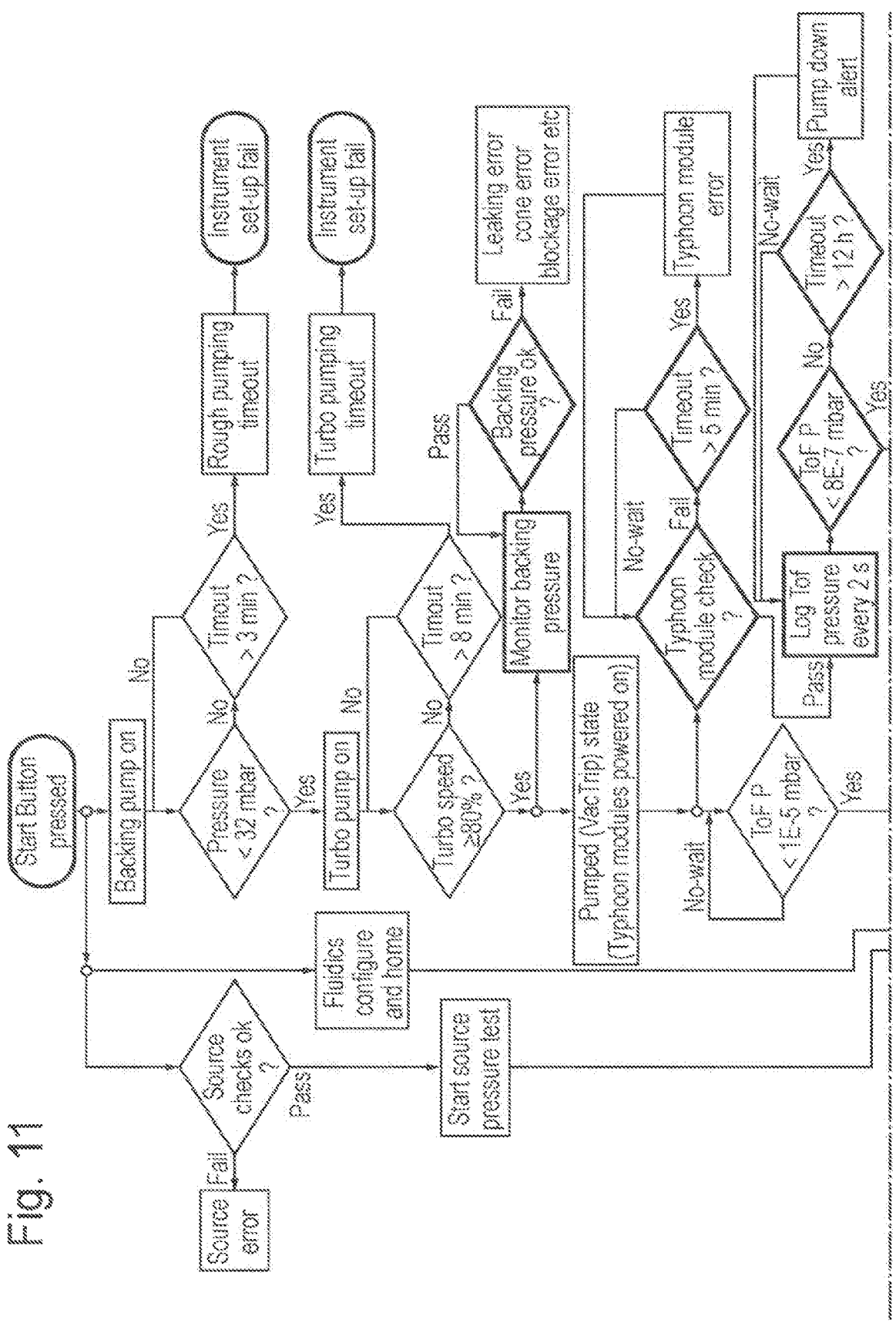
FIG. 11 shows a flow diagram illustrating various processes which occur upon a user pressing a start button on the front panel of the instrument according to various embodiments.
Figure 11:
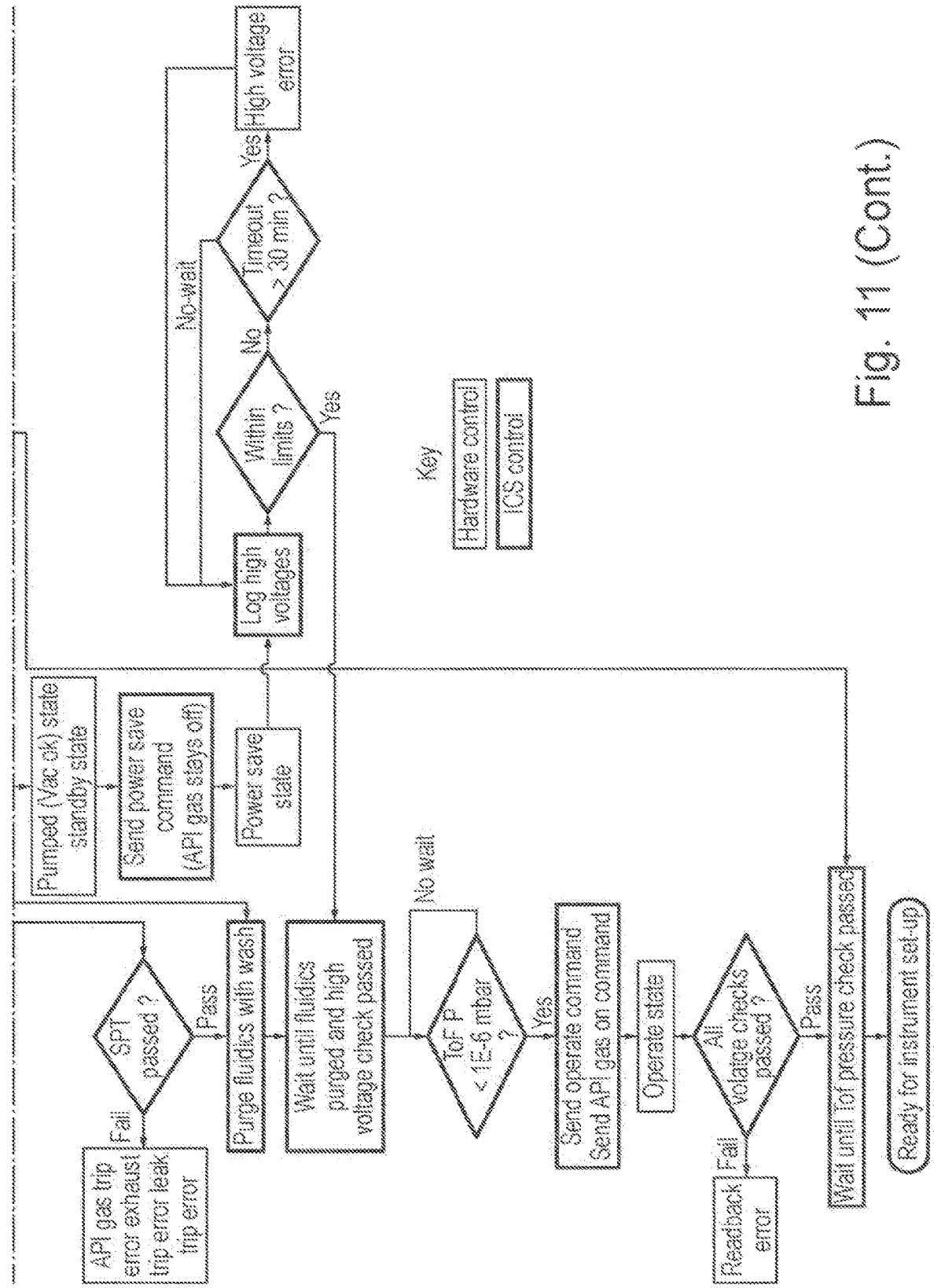

FIG. 11 shows a flow diagram illustrating various processes which may occur once a start button has been pressed.

According to an embodiment when the backing pump is turned ON a check may be made that the pressure is <32 mbar within three minutes of operation. If a pressure of <32 mbar is not achieved or established within three minutes of operation, then a rough pumping timeout (amber) warning may be issued.

Figure 12A:
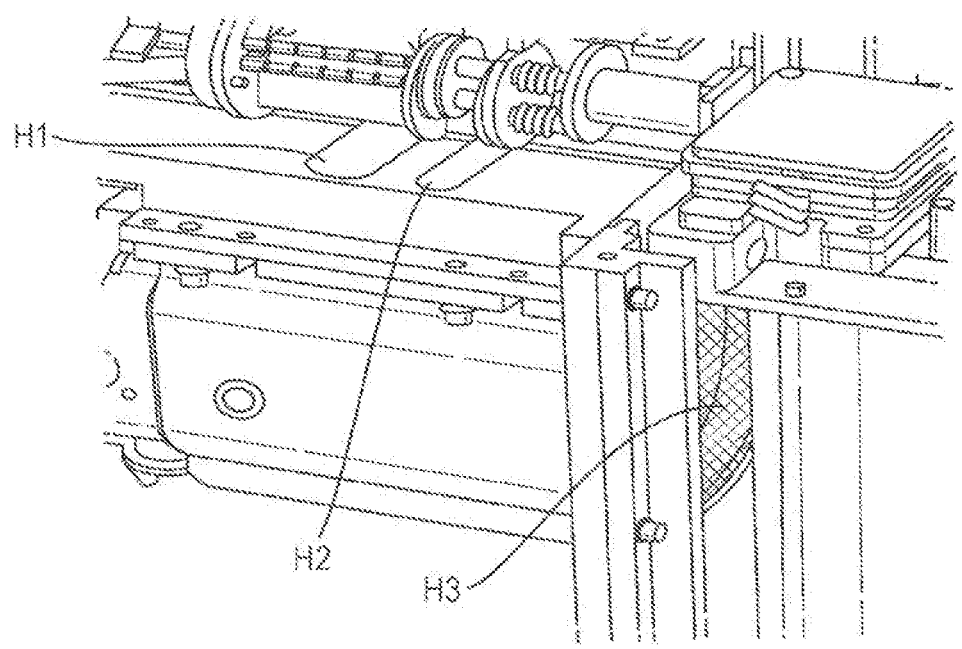

FIG. 12A shows the three different pumping ports of the turbo molecular pump according to various embodiments. The first pumping port H1 may be arranged adjacent the segmented quadrupole rod set 302. The second pumping port H2 may be arranged adjacent a first lens set of the transfer lens arrangement 303. The third pumping port (which may be referred to either as the H port or the H3 port) may be directly connected to Time of Flight mass analyser 304 vacuum chamber.

FIG. 12B shows from a different perspective the first pumping port H1 and the second pumping port H2. The user clamp 535 which is mounted in use to the ion block 802 is shown. The first ion guide 301 and the quadrupole rod set ion guide 302 are also indicated. A nebuliser or cone gas input 1201 is also shown. An access port 1251 is provided for measuring pressure in the source. A direct pressure sensor is provided (not fully shown) for measuring the pressure in the vacuum chamber housing the initial ion guide 301 and which is in fluid communication with the internal volume of the ion block 802. An elbow fitting 1250 and an over pressure relief valve 1202 are also shown.

One or more part-rigid and part-flexible printed circuit boards ("PCBs") may be provided. According to an embodiment a printed circuit board may be provided which comprises a rigid portion 1203*a* which is located at the exit of the quadrupole rod set region 302 and which is optionally at least partly arranged perpendicular to the optic axis or direction of ion travel through the quadrupole rod set 302. An upper or other portion of the printed circuit board may comprise a flexible portion 1203*b* so that the flexible portion 1203*b* of the printed circuit board has a stepped shape in side profile as shown in FIG. 12B.

According to various embodiments the H1 and H2 pumping ports may comprise EMC splinter shields.

It is also contemplated that the turbo pump may comprise dynamic EMC sealing of the H or H3 port. In particular, an EMC mesh may be provided on the H or H3 port.

Figure 13:
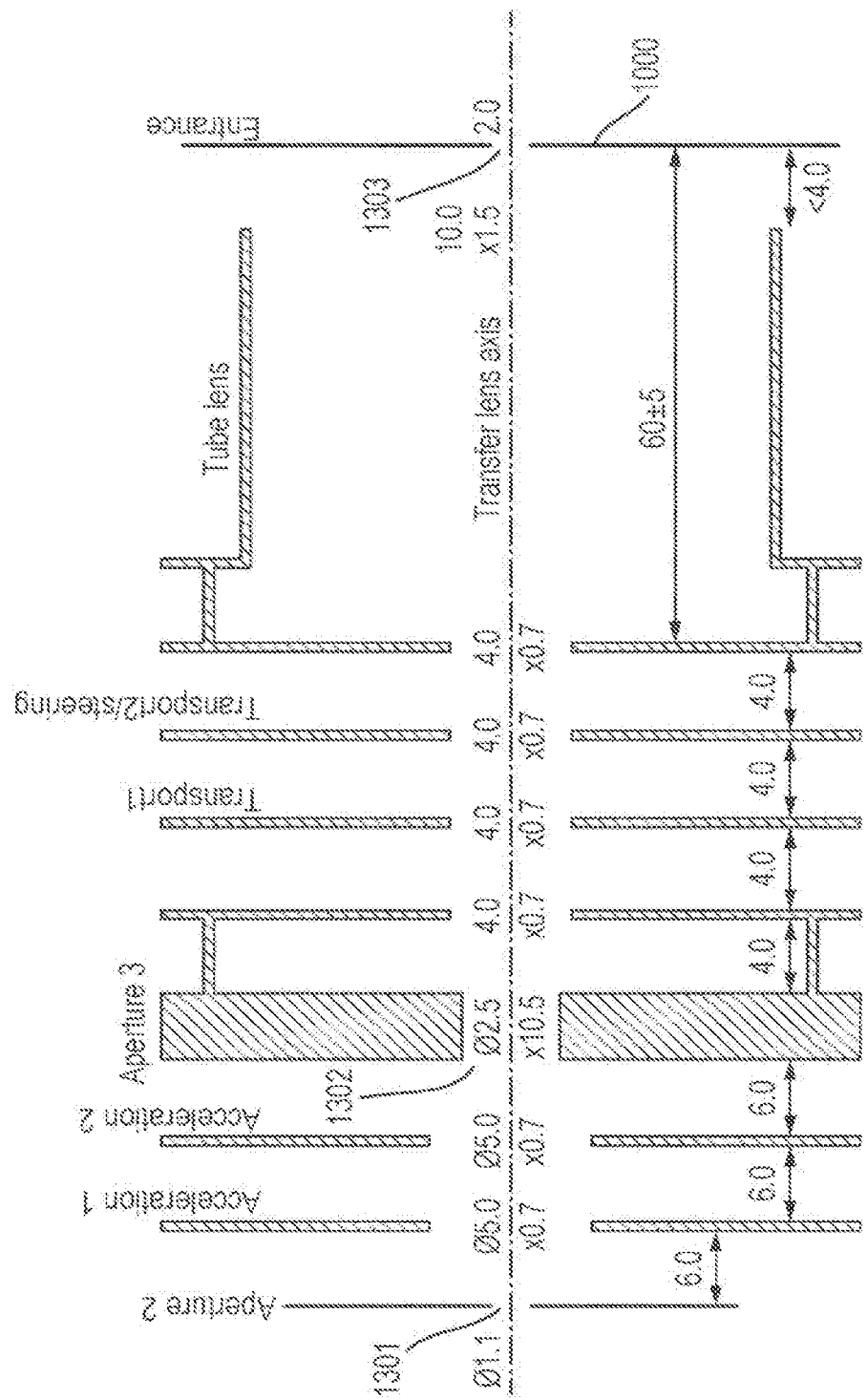
FIG. 13 shows in more detail a transfer lens arrangement.

FIG. 13 shows in more detail the transfer lens arrangement 303 and shows a second differential pumping aperture (Aperture #2) 1301 which separates the vacuum chamber housing the segmented quadrupole rod set 302 from first transfer optics which may comprise two acceleration electrodes. The relative spacing of the lens elements, their internal diameters and thicknesses according to an embodiment are shown. However, it should be understood that the relative spacing, size of apertures and thicknesses of the electrodes or lens elements may be varied from the specific values indicated in FIG. 13.

The region upstream of the second aperture (Aperture #2) 1301 may be in fluid communication with the first pumping port H1 of the turbo pump. A third differential pumping aperture (Aperture #3) 1302 may be provided between the first transfer optics and second transfer optics.

The region between the second aperture (Aperture #2) 1301 and the third aperture (Aperture #3) 1302 may be in fluid communication with the second pumping port H2 of the turbo pump.

The second transfer optics which is arranged downstream of the third aperture 1302 may comprises a lens arrangement comprising a first electrode which is electrical connection with the third aperture (Aperture #3) 1302. The lens arrangement may further comprise a second (transport) lens and a third (transport/steering) lens. Ions passing through the second transfer optics then pass through a tube lens before passing through an entrance aperture 1303. Ions passing through the entrance aperture 1303 pass through a slit or entrance plate 1000 into a pusher electrode assembly module.

The lens apertures after Aperture #3 1302 may comprise horizontal slots or plates. Transport 2/steering lens may comprise a pair of half plates.

The entrance plate 1000 may be arranged to be relatively easily removable by a service engineer for cleaning purposes.

One or more of the lens plates or electrodes which form a part of the overall transfer optics 303 may be manufactured by introducing an overcompensation etch of 5%. An additional post etch may also be performed. Conventional lens plates or electrodes may have a relatively sharp edge as a result of the manufacturing process. The sharp edges can cause electrical breakdown with conventional arrangements. Lens plates or electrodes which may be fabricated according to various embodiments using an overcompensation etching approach and/or additional post etch may have significantly reduced sharp edges which reduces the potential for electrical breakdown as well as reducing manufacturing cost.

Figure 14A:
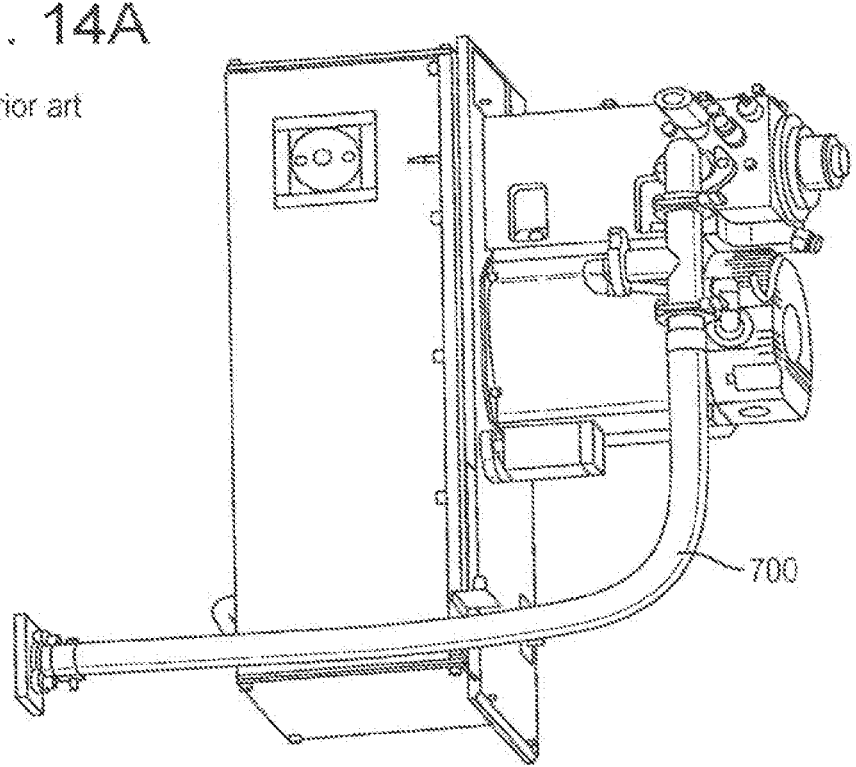
FIG. 14A shows details of a known internal vacuum configuration and FIG. 14B shows details of a new internal vacuum configuration according to various embodiments.
Figure 14B:
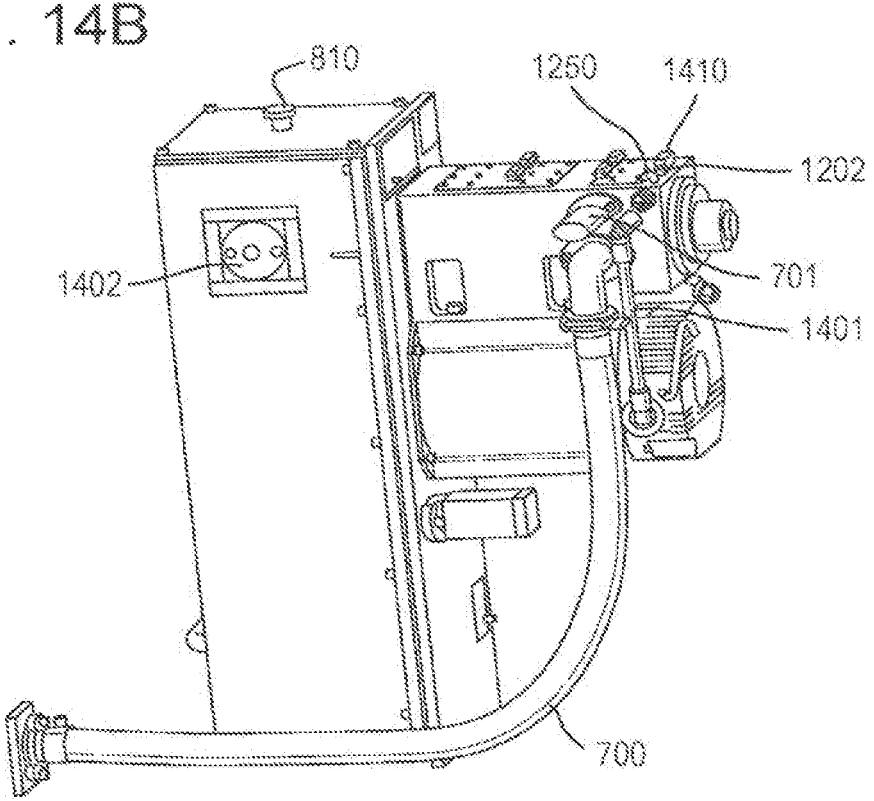

FIG. 14A shows details of a known internal vacuum configuration and FIG. 14B shows details of a new internal vacuum configuration according to various embodiments.

A conventional arrangement is shown in FIG. 14A wherein the connection 700 from the backing pump to the first vacuum chamber of a mass spectrometer makes a T-connection into the turbo pump when backing pressure is reached. However, this requires multiple components so that multiple separate potential leak points are established. Furthermore, the T-connection adds additional manufacturing and maintenance costs.

FIG. 14B shows an embodiment wherein the backing pump 700 is only directly connected to the first vacuum chamber i.e. the T-connection is removed. A separate connection 1401 is provided between the first vacuum chamber and the turbo pump.

A high voltage supply feed through 1402 is shown which provides a high voltage (e.g. 1.1 kV) to the pusher electrode module 305. An upper access panel 810 is also shown. A Pirani pressure gauge 701 is arranged to measure the vacuum pressure in the vacuum chamber housing the first ion guide 301. An elbow gas fitting 1250 is shown through which desolvation/cone gas may be supplied. With reference to FIG. 14B, behind the elbow gas fitting 1250 is shown the over pressure relief valve 1202 and behind the over pressure relief valve 1202 is shown a further elbow fitting which enables gas pressure from the source to be directly measured.

Figure 15A:
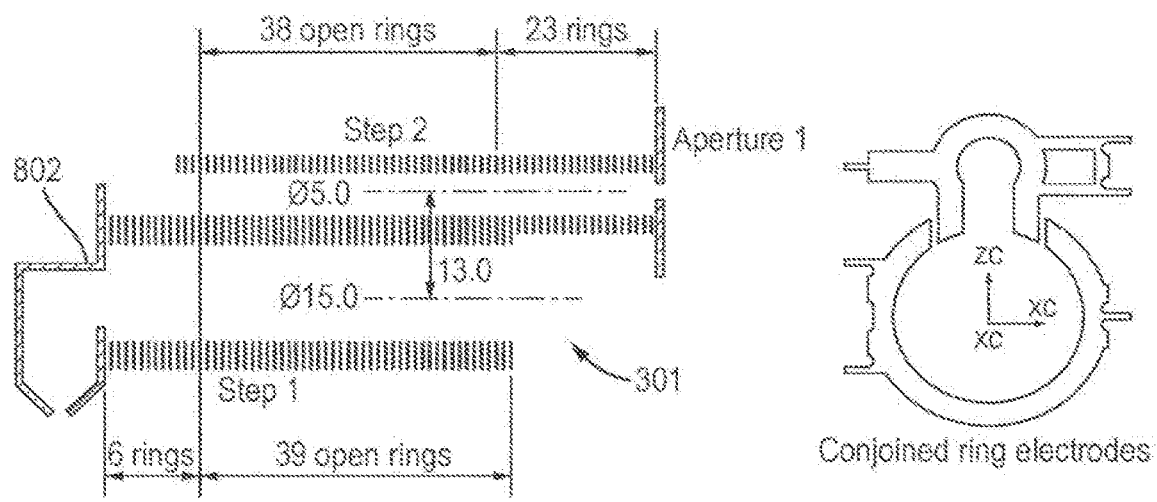
FIG. 15A shows a schematic of an arrangement of ring electrodes and conjoined ring electrodes forming a first ion guide which is arranged to separate charged ions from undesired neutral particles.

FIG. 15A shows a schematic of the ion block 802 and source or first ion guide 301. According to an embodiment the source or first ion guide 301 may comprise six initial ring electrodes followed by 38-39 open ring or conjoined electrodes. The source or first ion guide 301 may conclude with a further 23 rings. It will be appreciated, however, that the particular ion guide arrangement 301 shown in FIG. 15A may be varied in a number of different ways. In particular, the number of initial ring electrodes (e.g. 6) and/or the number of final stage (e.g. 23) ring electrodes may be varied. Similarly, the number of intermediate open ring or conjoined ring electrodes (e.g. 38-39) may also be varied.

It should be understood that the various dimensions illustrated on FIG. 15A are for illustrative purposes only and are not intended to be limiting. In particular, embodiments are contemplated wherein the sizing of ring and/or conjoined ring electrodes may be different from that shown in FIG. 15A.

A single conjoined ring electrode is also shown in FIG. 15A.

According to various embodiment the initial stage may comprise 0-5, 5-10, 10-15, 15-20, 20-25, 25-30, 30-35, 35-40, 40-45, 45-50 or >50 ring or other shaped electrodes. The intermediate stage may comprise 0-5, 5-10, 10-15, 15-20, 20-25, 25-30, 30-35, 35-40, 40-45, 45-50 or >50 open ring, conjoined ring or other shaped electrodes. The final stage may comprise 0-5, 5-10, 10-15, 15-20, 20-25, 25-30, 30-35, 35-40, 40-45, 45-50 or >50 ring or other shaped electrodes.

The ring electrodes and/or conjoined ring electrodes may have a thickness of 0.5 mm and a spacing of 1.0 mm. However, the electrodes may have other thicknesses and/or different spacings.

Aperture #1 plate may comprise a differential pumping aperture and may have a thickness of 0.5 mm and an orifice diameter of 1.50 mm. Again, these dimensions are illustrative and are not intended to be limiting.

A source or first ion guide RF voltage may be applied to all Step 1 and Step 2 electrodes in a manner as shown in FIG. 15A. The source or first ion guide RF voltage may comprise 200 V peak-to-peak at 1.0 MHz.

Embodiments are contemplated wherein a linear voltage ramp may be applied to Step 2 Offset (cone).

The Step 2 Offset (cone) voltage ramp duration may be made equal to the scan time and the ramp may start at the beginning of a scan. Initial and final values for the Step 2 Offset (cone) ramp may be specified over the complete range of Step 2 Offset (cone).

Figure 15B:
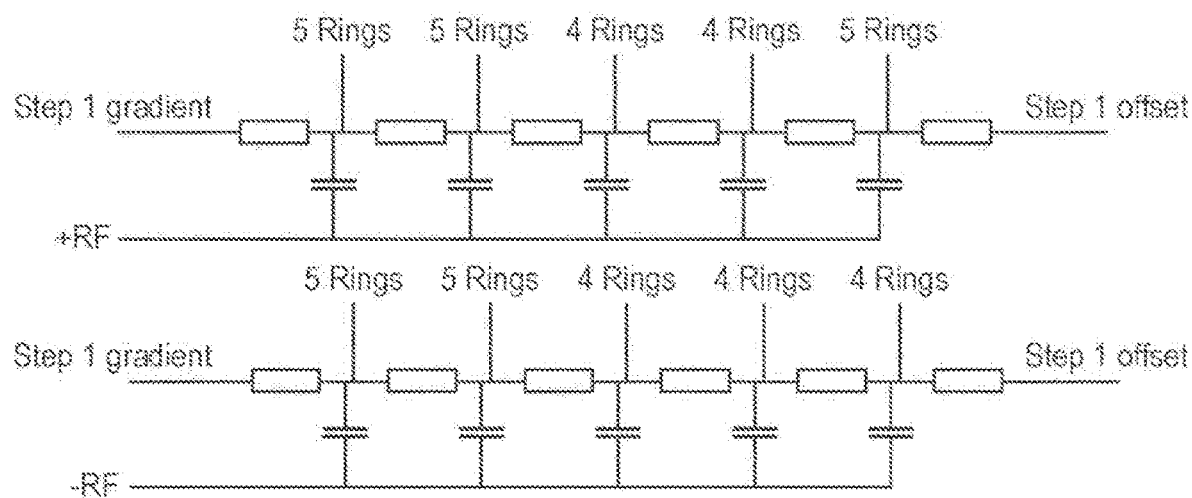
FIG. 15B shows a resistor chain which may be used to produce a linear axial DC electric field along the length of a first portion of the first ion guide and FIG. 15C shows a resistor chain which may be used to produce a linear axial DC electric field along the length of a second portion of the first ion guide.

According to various embodiments a resistor chain as shown in FIG. 15B may be used to produce a linear axial field along the length of Step 1. Adjacent ring electrodes may have opposite phases of RF voltage applied to them.

Figure 15C:
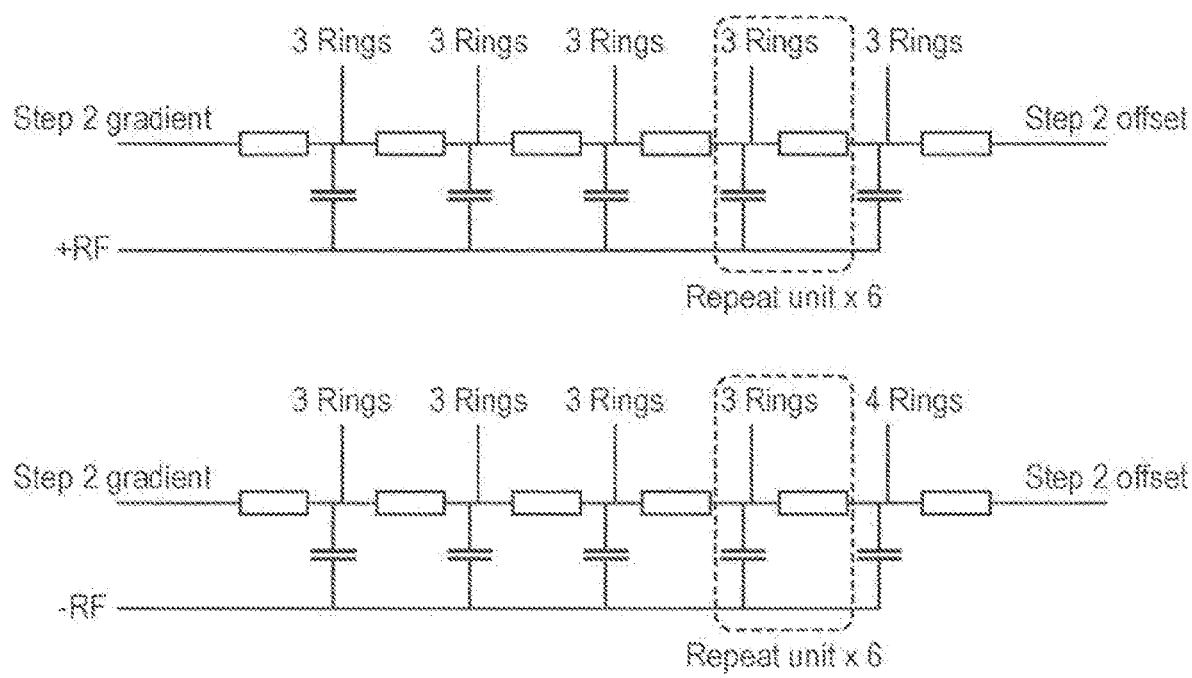

A resistor chain may also be used to produce a linear axial field along the length of Step 2 as shown in FIG. 15C. Adjacent ring electrodes may have opposite phases of RF voltage applied to them.

Embodiments are contemplated wherein the RF voltage applied to some or substantially all the ring and conjoined ring electrodes forming the first ion guide 301 may be reduced or varied in order to perform a non-mass to charge ratio specific attenuation of the ion beam. For example, as will be appreciated, with a Time of Flight mass analyser 304 the ion detector 307 may suffer from saturation effects if an intense ion beam is received at the pusher electrode 305. Accordingly, the intensity of the ion beam arriving adjacent the pusher electrode 305 can be controlled by varying the RF voltage applied to the electrodes forming the first ion guide 301. Other embodiments are also contemplated wherein the RF voltage applied to the electrodes forming the second ion guide 302 may additionally and/or alternatively be reduced or varied in order to attenuate the ion beam or otherwise control the intensity of the ion beam. In particular, it is desired to control the intensity of the ion beam as received in the pusher electrode 305 region.

FIG. 16A shows in more detail the quadrupole ion guide 302 according to various embodiments. The quadrupole rods may have a diameter of 6.0 mm and may be arranged with an inscribed radius of 2.55 mm. Aperture #2 plate which may comprise a differential pumping aperture may have a thickness of 0.5 mm and an orifice diameter of 1.50 mm. The various dimensions shown in FIG. 16A are intended to be illustrative and non-limiting.

The ion guide RF amplitude applied to the rod electrodes may be controllable over a range from 0 to 800 V peak-to-peak.

The ion guide RF voltage may have a frequency of 1.4 MHz. The RF voltage may be ramped linearly from one value to another and then held at the second value until the end of a scan.

As shown in FIG. 16B, the voltage on the Aperture #2 plate may be pulsed in an Enhanced Duty Cycle mode operation from an Aperture 2 voltage to an Aperture 2 Trap voltage. The extract pulse width may be controllable over the range 1-25 μs. The pulse period may be controllable over the range 22-85 μs. The pusher delay may be controllable over the range 0-85 μs.

FIG. 16C shows in more detail the pusher electrode arrangement. The grid electrodes may comprise Ø 60 parallel wire with 92% transmission (Ø 0.018 mm parallel wires at 0.25 mm pitch). The dimensions shown are intended to be illustrative and non-limiting.

Figure 16D:
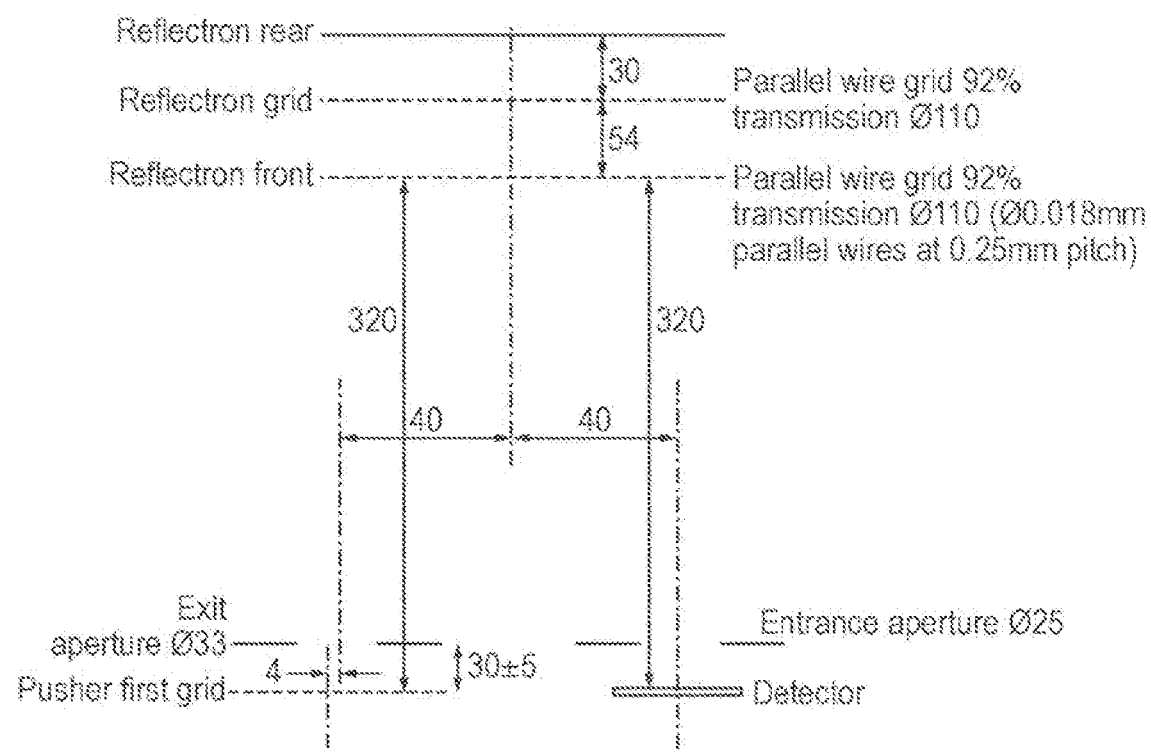
FIG. 16D illustrates in more detail the overall geometry of the Time of Flight mass analyser including the relative spacings of elements of the pusher electrode and associated electrodes, the reflectron grid electrodes and the ion detector.

FIG. 16D shows in more detail the Time of Flight geometry. The region between the pusher first grid, reflectron first grid and the detector grid preferably comprises a field free region. The position of the ion detector 307 may be defined by the ion impact surface in the case of a MagneTOF® ion detector or the surface of the front MCP in the case of a MCP detector.

The reflectron ring lenses may be 5 mm high with 1 mm spaces between them. The various dimensions shown in FIG. 16D are intended to be illustrative and non-limiting.

According to various embodiments the parallel wire grids may be aligned with their wires parallel to the instrument axis. It will be understood that the instrument axis runs through the source or first ion guide 301 through to the pusher electrode assembly 305.

A flight tube power supply may be provided which may have an operating output voltage of either +4.5 kV or −4.5 kV depending on the polarity requested.

A reflectron power supply may be provided which may have an operating output voltage ranging from 1625±100 V or −1625±100 V depending on the polarity requested.

Figure 16E:
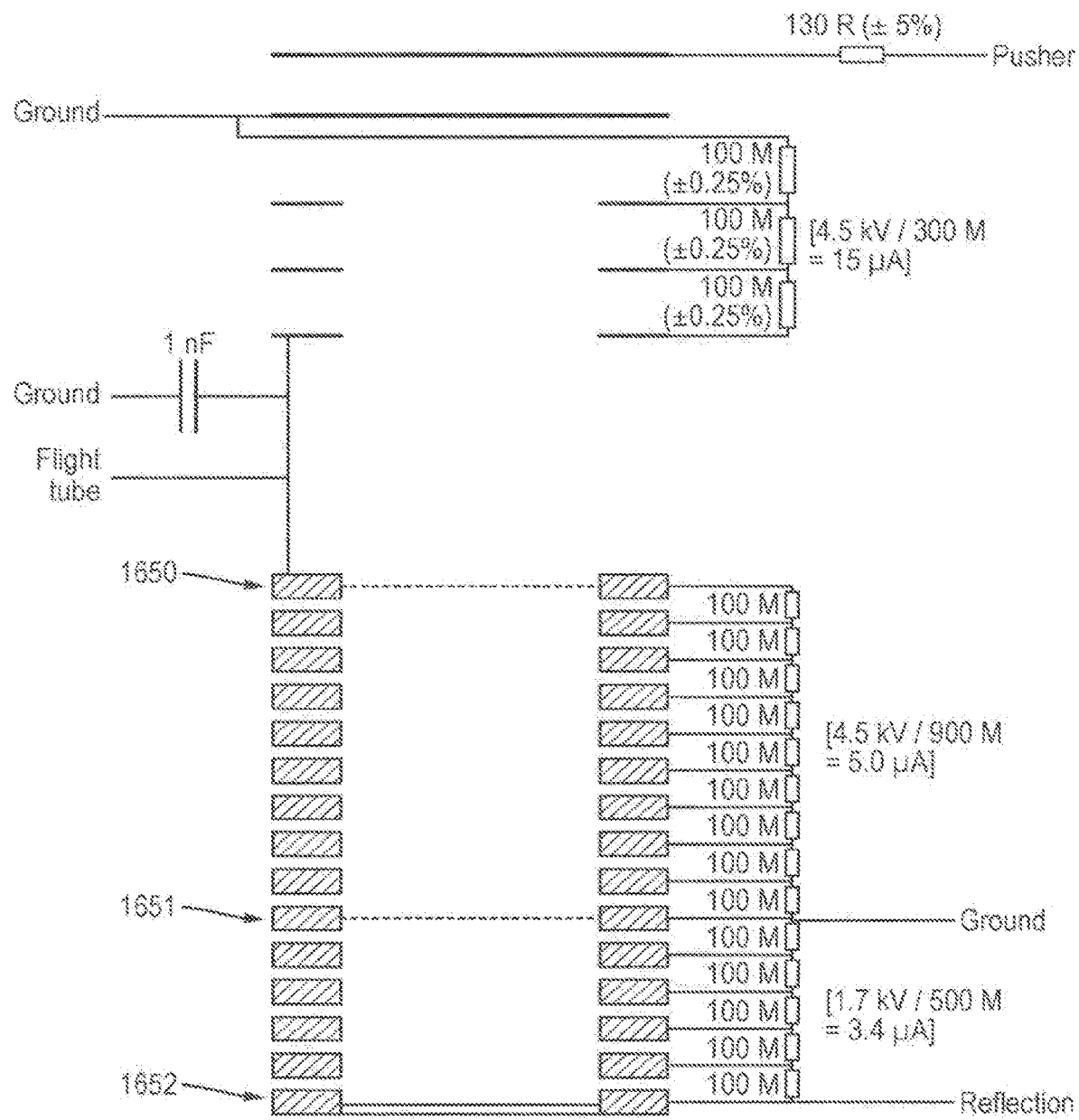
FIG. 16E is a schematic illustrating the wiring arrangement according to various embodiments of the pusher electrode and associated grid and ring electrodes and the grid and ring electrodes forming the reflectron.

FIG. 16E is a schematic of the Time of Flight wiring according to an embodiment. The various resistor values, voltages, currents and capacitances are intended to be illustrative and non-limiting.

According to various embodiments a linear voltage gradient may be maintained along the length of the reflectron 306. In a particular embodiment a reflectron clamp plate may be maintained at the reflectron voltage.

An initial electrode and associated grid 1650 of the reflectron 306 may be maintained at the same voltage or potential as the flight tube 807 and the last electrode of the pusher electrode assembly 305. According to an embodiment the initial electrode and associated grid 1650 of the reflectron 306, the flight tube 807 and the last electrode and associated grid of the pusher electrode assembly 305 may be maintained at a voltage or potential of e.g. 4.5 kV of opposite polarity to the instrument or mode of operation. For example, in positive ion mode the initial electrode and associated grid 1650 of the reflectron 306, the flight tube 807 and the last electrode and associated grid of the pusher electrode assembly 305 may be maintained at a voltage or potential of −4.5 kV.

The second grid electrode 1651 of the reflectron 306 may be maintained at ground or 0V.

The final electrode 1652 of the reflectron 306 may be maintained at a voltage or potential of 1.725 kV of the same polarity as the instrument. For example, in positive ion mode the final electrode 1652 of the reflectron 306 may be maintained at a voltage or potential of +1.725 kV.

It will be understood by those skilled in the art that the reflectron 306 acts to decelerate ions arriving from the time of flight region and to redirect the ions back out of the reflectron 306 in the direction of the ion detector 307.

The voltages and potentials applied to the reflectron 306 according to various embodiments and maintaining the second grid electrode 1651 of the reflectron at ground or 0V is different from the approach adopted in conventional reflectron arrangements.

The ion detector 307 may always be maintained at a positive voltage relative to the flight tube voltage or potential. According to an embodiment the ion detector 307 may be maintained at a +4 kV voltage relative to the flight tube.

Accordingly, in a positive ion mode of operation if the flight tube is maintained at an absolute potential or voltage of −4.5 kV then the detector may be maintained at an absolute potential or voltage of −0.5 kV.

FIG. 16F shows the DC lens supplies according to an embodiment. It will be understood that Same polarity means the same as instrument polarity and that Opposite polarity means opposite to instrument polarity. Positive means becomes more positive as the control value is increased and Negative means becomes more negative as the control value is increased. The particular values shown in FIG. 16F are intended to be illustrative and non-limiting.

Figure 16G:
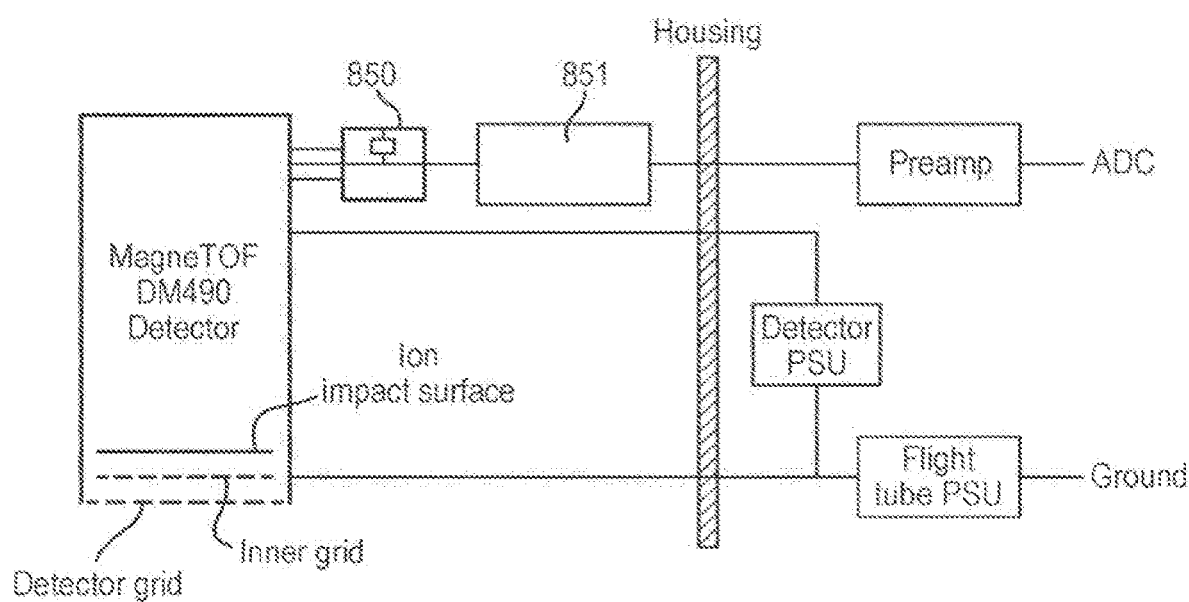
FIG. 16G is a schematic of an ion detector arrangement according to various embodiments and which shows various connections to the ion detector which are located both within and external to the Time of Flight housing and FIG. 16H shows an illustrative potential energy diagram.

FIG. 16G shows a schematic of an ion detector arrangement according to various embodiments. The detector grid may form part of the ion detector 307. The ion detector 307 may, for example, comprise a MagneTOF® DM490 ion detector. The inner grid electrode may be held at a voltage of +1320 V with respect to the detector grid and flight tube via a series of zener diodes and resistors. The ion detector 307 may be connected to a SMA 850 and an AC coupler 851 which may both be provided within or internal to the mass analyser housing or within the mass analyser vacuum chamber. The AC coupler 851 may be connected to an externally located preamp which in turn may be connected to an Analogue to Digital Converter ("ADC") module.

Figure 16H:
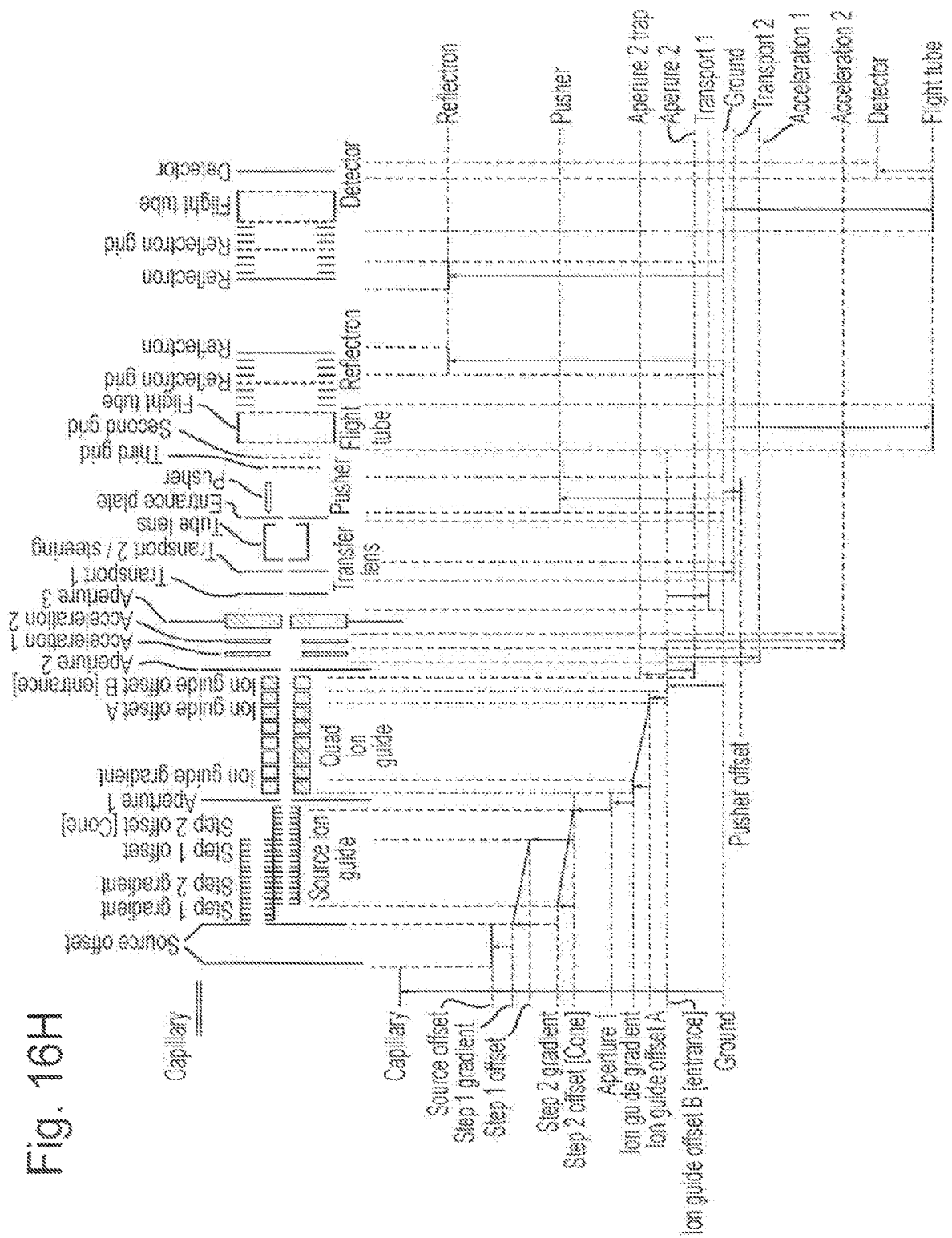

FIG. 16H shows a potential energy diagram for an instrument according to various embodiments. The potential energy diagram represents an instrument in positive ion mode. In negative ion mode all the polarities are reversed except for the detector polarity. The particular voltages/potentials shown in FIG. 16H are intended to be illustrative and non-limiting.

The instrument may include an Analogue to Digital Converter ("ADC") which may be operated in peak detecting ADC mode with fixed peak detecting filter coefficients. The ADC may also be run in a Time to Digital Converter ("TDC") mode of operation wherein all detected ions are assigned unit intensity. The acquisition system may support a scan rate of up to 20 spectra per second. A scan period may range from 40 ms to 1 µs. The acquisition system may support a maximum input event rate of 7×106 events per second.

According to various embodiments the instrument may have a mass accuracy of 2-5 ppm may have a chromatographic dynamic range of 104. The instrument may have a high mass resolution with a resolution in the range 10000-15000 for peptide mapping. The mass spectrometer 100 is preferably able to mass analyse intact proteins, glycoforms and lysine variants. The instrument may have a mass to charge ratio range of approx. 8000.

Instrument testing was performed with the instrument fitted with an ESI source 401. Sample was infused at a flow rate of 400 mL/min. Mass range was set to m/z 1000. The instrument was operated in positive ion mode and high resolution mass spectral data was obtained.

According to various embodiments the instrument may have a single analyser tune mode i.e. no sensitivity and resolution modes.

According to various embodiments the resolution of the instrument may be in the range 10000-15000 for high mass or mass to charge ratio ions such as peptide mapping applications.

The resolution may be determined by measuring on any singly charged ion having a mass to charge ratio in the range 550-650.

The resolution of the instrument may be around 5500 for low mass ions. The resolution of instrument for low mass ions may be determined by measuring on any singly charged ion having a mass to charge ratio in the range 120-150.

According to various embodiments the instrument may have a sensitivity in MS positive ion mode of approx. 11,000 counts/second. The mass spectrometer 100 may have a mass accuracy of approx. 2-5 ppm Mass spectral data obtained according to various embodiments was observed as having reduced in-source fragmentation compared with conventional instruments. Adducts are reduced compared with conventional instruments. The mass spectral data also has cleaner valleys (<20%) for mAb glycoforms.

As disclosed in US 2015/0076338 (Micromass), the contents of which are incorporated herein by reference, the instrument according to various embodiment may comprise a plurality of discrete functional modules. The functional modules may comprise, for example, electrical, mechanical, electromechanical or software components. The modules may be individually addressable and may be connected in a network. A scheduler may be arranged to introduce discrete packets of instructions to the network at predetermined times in order to instruct one or more modules to perform various operations. A clock may be associated with the scheduler.

The functional modules may be networked together in a hierarchy such that the highest tier comprises the most time-critical functional modules and the lowest tier comprises functional modules which are the least time time-critical. The scheduler may be connected to the network at the highest tier.

For example, the highest tier may comprise functional modules such as a vacuum control system, a lens control system, a quadrupole control system, an electrospray module, a Time of Flight module and an ion guide module. The lowest tier may comprise functional modules such as power supplies, vacuum pumps and user displays.

The mass spectrometer 100 according to various embodiments may comprise multiple electronics modules for controlling the various elements of the spectrometer. As such, the mass spectrometer may comprise a plurality of discrete functional modules, each operable to perform a predetermined function of the mass spectrometer 100, wherein the functional modules are individually addressable and connected in a network and further comprising a scheduler operable to introduce discrete packets of instructions to the network at predetermined times in order to instruct at least one functional module to perform a predetermined operation.

The mass spectrometer 100 may comprise an electronics module for controlling (and for supplying appropriate voltage to) one or more or each of: (i) the source; (ii) the first ion guide; (iii) the quadrupole ion guide; (iv) the transfer optics; (v) the pusher electrode; (vi) the reflectron; and (vii) the ion detector.

This modular arrangement may allow the mass spectrometer to be reconfigured straightforwardly. For example, one or more different functional elements of the spectrometer may be removed, introduced or changed, and the spectrometer may be configured to automatically recognised which elements are present and to configure itself appropriately.

The instrument may allow for a schedule of packets to be sent onto the network at specific times and intervals during an acquisition. This reduces or alleviates the need for a host computer system with a real time operating system to control aspects of the data acquisition. The use of packets of information sent to individual functional modules also reduces the processing requirements of a host computer.

The modular nature conveniently allows flexibility in the design and/or reconfiguring of a mass spectrometer. According to various embodiments at least some of the functional modules may be common across a range of mass spectrometers and may be integrated into a design with minimal reconfiguration of other modules. Accordingly, when designing a new mass spectrometer, wholesale redesign of all the components and a bespoke control system are not necessary. A mass spectrometer may be assembled by connecting together a plurality of discrete functional modules in a network with a scheduler.

Furthermore, the modular nature of the mass spectrometer 100 according to various embodiments allows for a defective functional module to be replaced easily. A new functional module may simply be connected to the interface. Alternatively, if the control module is physically connected to or integral with the functional module, both can be replaced.

Various embodiments are directed to a drive unit for driving an acceleration electrode of a mass spectrometer, the drive unit comprising a power converter comprising a switching element, and pulsing circuitry operable to form electrical output pulses from an output of the power converter so as to form output pulses suitable for driving an acceleration electrode of a mass spectrometer. The drive unit is configured such that (e.g. comprises control circuitry configured such that) the switching element is operated in synchronism with the pulsing circuitry.

Various embodiments are directed to a mass spectrometer comprising a power converter that is controlled (based on a feedforward signal) based on (a change to) the input voltage to the power converter and/or based on a change to a desired voltage pulse parameter.

Various embodiments are directed to a drive unit for driving an acceleration electrode of a mass spectrometer, the drive unit comprising a power converter configured to convert an input voltage to an output voltage and pulsing circuitry operable to form electrical output pulses from an output of the power converter so as to form output pulses suitable for driving an acceleration electrode of a mass spectrometer. The drive unit further comprises control circuitry configured such that the power converter is controlled based on the input voltage and/or based on a prediction of the effect on the output voltage of a change to an operational parameter.

Various embodiments are directed to a mass spectrometer comprising the drive unit, and a Time of Flight (ToF) mass analyser comprising an acceleration electrode, wherein electrical output pulses produced by the drive unit are supplied to the acceleration electrode. In particular embodiments, the "ToF" mass analyser may be an orthogonal acceleration "ToF" mass analyser.

According to various embodiments, the drive unit is operable to generate output pulses suitable for causing ions to be accelerated away from the acceleration electrode when the output pulses are supplied to the acceleration electrode. It will be appreciated that in such embodiments, the drive unit operates as a "pusher drive unit", and the acceleration electrode comprises a "pusher electrode". However, the drive unit may also or instead be operable to generate output pulses suitable for causing ions to be accelerated towards the acceleration electrode when the output pulses are supplied to the acceleration electrode. It will be appreciated that in such embodiments, the drive unit operates as a "puller drive unit", and the acceleration electrode comprises a "puller electrode".

Thus, according to various embodiments, the drive unit is a pusher and/or puller drive unit, and the acceleration electrode is a pusher and/or puller electrode. Various embodiments herein are described with reference to a pusher drive unit and a pusher electrode. However, it will be appreciated that such embodiments are, where appropriate, equally applicable to a puller drive unit and a puller electrode, mutatis mutandis.

Figure 17A:
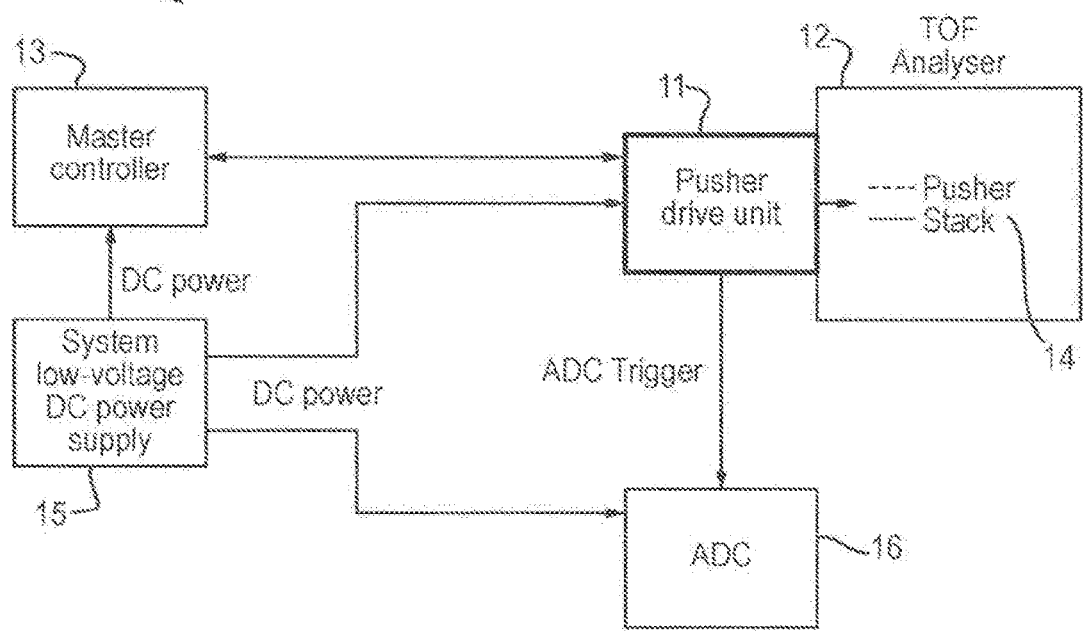
FIG. 17A shows schematically various elements of a Time of Flight ("ToF") mass spectrometer in accordance with various embodiments.
Figure 17B:
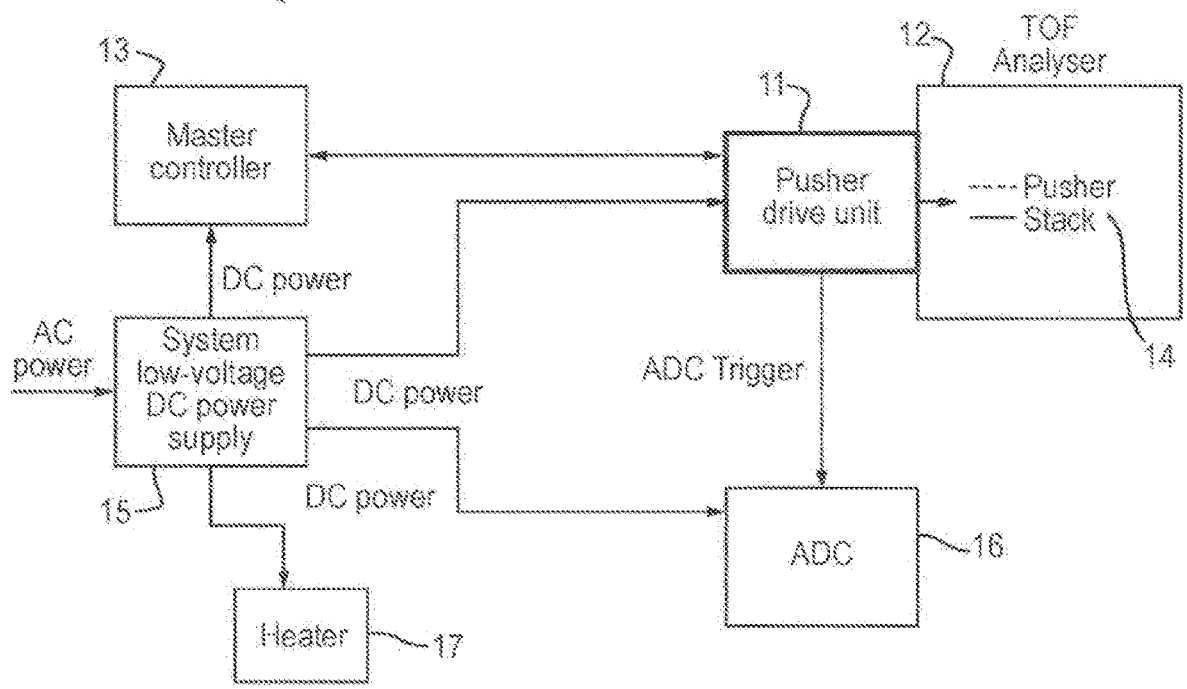
FIG. 17B shows schematically various elements of a Time of Flight ("ToF") mass spectrometer in accordance with various embodiments.

FIGS. 17A and 17B show schematically various elements of a "ToF" mass spectrometer 10 according to various embodiments comprising a drive unit 11 (pusher drive unit) and a "ToF" mass analyser 12 comprising an acceleration electrode 14 (pusher stack). According to various embodiments, the mass spectrometer 10 is controlled by master controller 13. Various elements (operational units) of the mass spectrometer 10 may be powered by master power supply 15 (system low-voltage DC power supply).

The mass spectrometer 10 may comprise an analogue to digital converter (ADC) unit 16, which may be configured to digitise and record signals received from a detector of the "ToF" mass analyser 12. As illustrated in FIGS. 17A and 17B, the (pusher) drive unit 11 may generate and send trigger signals to the ADC unit 16 to synchronise a start time of the ADC unit 16 recording a detector signal with each output pulse generated by the (pusher) drive unit 11.

The master power supply 15 can be any suitable power supply. In particular embodiments, the master power supply 15 supplies DC power to various components (operational units) of the mass spectrometer 10, such as the (pusher) drive unit 11 and/or the master controller 13 and/or the ADC unit 16 and/or one or more heaters 17 (as shown, for example, in FIG. 17B). The master power supply 15 may be a mains AC-DC power supply unit (PSU). As illustrated in FIGS. 17A and 17B, the master power supply 15 may be configured to supply low-voltage (e.g. 24V±5%) DC electrical power to the various components (operational units) of the spectrometer 10.

The one or more heaters 17 may be an ion source heater and/or a desolvation heater 404, e.g. as described above.

The master controller 13 may be configured to control the operation of the spectrometer 10, e.g. in the manner of the various embodiments described herein. Thus, the master controller 13 may cause the (pusher) drive unit 11 to generate the output pulses for supplying to the acceleration (pusher) electrode 14, in the manner of the various embodiments described herein.

The master controller may comprise a suitable processor such as a field-programmable gate array (FPGA).

According to various embodiments, the (pusher) drive unit 11 comprises, and is enclosed by, a housing. The housing may include a suitable (conductive) chassis. The housing may be constructed of a metallic material, such as aluminium. The (pusher) drive unit 11 housing may be mountable on a housing of the "ToF" mass analyser 12, e.g. using a suitable bracket.

The (pusher) drive unit 11 may comprise an output conductive pin. The conductive pin may be suitable for supplying output pulses produced by the drive unit 11 to the acceleration (pusher) electrode 14 of the "ToF" mass analyser 12, e.g. when the (pusher) drive unit 11 is mounted on the housing of the "ToF" analyser 12. The conductive pin may be spring loaded.

The drive unit 11 may further comprise suitable warning indicators, such as one or more LEDs, to indicate when power is being supplied to the (pusher) drive unit 11 (by the master power supply 15), such that high voltages may be present.

Figure 18:
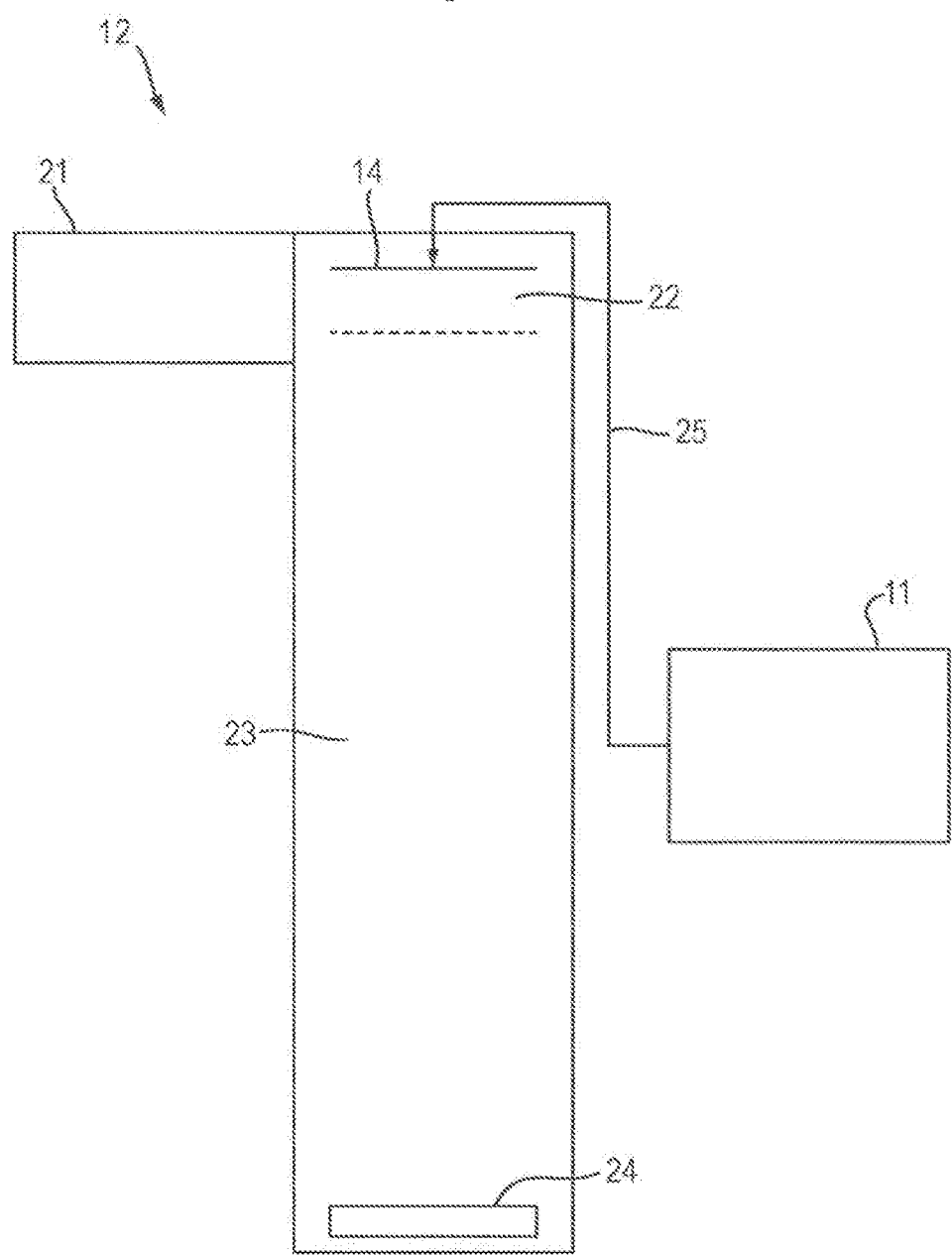
FIG. 18 shows schematically a Time of Flight ("ToF") mass analyser in accordance with various embodiments.

FIG. 18 shows in more detail the Time of Flight ("ToF") mass analyser 12 according to various embodiments. The analyser 12 may be connected to one or more upstream stages 21 of the mass spectrometer 10. Ions may be supplied to the mass analyser 12 via the one or more upstream stages 21.

The one or more upstream stages 21 may include any one or more components of a mass spectrometer. For example, the one or more upstream stages 21 may include any one or more of: (i) an ion source; (ii) one or more ion guides; (iii) a mass or mass to charge ratio separator or filter; (iv) one or more ion mobility separation devices; (v) one or more Field Asymmetric Ion Mobility Spectrometer devices; (vi) one or more ion traps or one or more ion trapping regions; (vii) one or more collision, fragmentation or reaction cells; (viii) a device or ion gate for pulsing ions; (ix) a device for converting a substantially continuous ion beam into a pulsed ion beam; and (x) a chromatography or other separation device.

The ion source may comprise any suitable ion source. For example, the ion source may be selected from the group consisting of: (i) an Electrospray ionisation ("ESI") ion source; (ii) an Atmospheric Pressure Photo Ionisation ("APPI") ion source; (iii) an Atmospheric Pressure Chemical Ionisation ("APCI") ion source; (iv) a Matrix Assisted Laser Desorption Ionisation ("MALDI") ion source; (v) a Laser Desorption Ionisation ("LDI") ion source; (vi) an Atmospheric Pressure Ionisation ("API") ion source; (vii) a Desorption Ionisation on Silicon ("DIOS") ion source; (viii) an Electron Impact ("EI") ion source; (ix) a Chemical Ionisation ("CI") ion source; (x) a Field Ionisation ("FI") ion source; (xi) a Field Desorption ("FD") ion source; (xii) an Inductively Coupled Plasma ("ICP") ion source; (xiii) a Fast Atom Bombardment ("FAB") ion source; (xiv) a Liquid Secondary Ion Mass Spectrometry ("LSIMS") ion source; (xv) a Desorption Electrospray Ionisation ("DESI") ion source; (xvi) a Nickel-63 radioactive ion source; (xvii) an Atmospheric Pressure Matrix Assisted Laser Desorption Ionisation ion source; (xviii) a Thermospray ion source; (xix) an Atmospheric Sampling Glow Discharge Ionisation ("ASGDI") ion source; (xx) a Glow Discharge ("GD") ion source; (xxi) an Impactor ion source; (xxii) a Direct Analysis in Real Time ("DART") ion source; (xxiii) a Laserspray Ionisation ("LSI") ion source; (xxiv) a Sonicspray Ionisation ("SSI") ion source; (xxv) a Matrix Assisted Inlet Ionisation ("MAII") ion source; (xxvi) a Solvent Assisted Inlet Ionisation ("SAII") ion source; (xxvii) a Desorption Electrospray Ionisation ("DESI") ion source; (xxviii) a Laser Ablation Electrospray Ionisation ("LAESI") ion source; and (xxix) Surface Assisted Laser Desorption Ionisation ("SALDI").

The mass filter may comprise any suitable mass filter. For example, the mass filter may be selected from the group consisting of: (i) a quadrupole mass filter; (ii) a 2D or linear quadrupole ion trap; (iii) a Paul or 3D quadrupole ion trap; (iv) a Penning ion trap; (v) an ion trap; (vi) a magnetic sector mass filter; (vii) a Time of Flight mass filter; and (viii) a Wien filter.

The ion source may comprise a chromatography or other separation device upstream of the ion source. The chromatography or other separation device may comprise any suitable chromatography or other separation device. For example, the chromatography or other separation device may comprise a liquid chromatography or gas chromatography device.

Alternatively, the separation device may comprise: (i) a Capillary Electrophoresis ("CE") separation device; (ii) a Capillary Electrochromatography ("CEC") separation device; (iii) a substantially rigid ceramic-based multilayer microfluidic substrate ("ceramic tile") separation device; or (iv) a supercritical fluid chromatography separation device.

The spectrometer 10 may be operated in various modes of operation including, for example, a mass spectrometry ("MS") mode of operation; a tandem mass spectrometry ("MS/MS") mode of operation; a mode of operation in which parent or precursor ions are alternatively fragmented or reacted so as to produce fragment or product ions, and not fragmented or reacted or fragmented or reacted to a lesser degree; a Multiple Reaction Monitoring ("MRM") mode of operation; a Data Dependent Analysis ("DDA") mode of operation; a Data Independent Analysis ("DIA") mode of operation; a Quantification mode of operation; and/or an Ion Mobility Spectrometry ("IMS") mode of operation.

As illustrated in FIG. 18, the mass analyser 12 may comprise an acceleration (pusher) electrode 14, an acceleration region 22, a field free or drift region 23, and an ion detector 24 arranged at the exit region of the field free or drift region 23. FIG. 18 also shows the (pusher) drive unit 11 and the circuitry 25 configured to supply the output pulses of the drive unit 11 to the acceleration (pusher) electrode 14 of the mass analyser 12, according to various embodiments.

It should be noted here that FIG. 18 is merely schematic, and that other Time of Flight ("ToF") mass analyser arrangements, such as a reflectron arrangement, may be used. Thus, although not shown in FIG. 18, in various embodiments the mass analyser 12 may also comprise a reflectron, in which case the detector 24 may be located adjacent the acceleration electrode 14.

Ions formed in the one or more upstream stages 21 of the mass analyser 12 may be arranged to enter the acceleration region 22 where they may be driven into the field free or drift region 23 by application of an output pulse generated by (pusher) drive unit 11 to the acceleration (pusher) electrode 14.

The ions may be accelerated to a velocity determined by the energy imparted by the output pulse and the mass to charge ratio of the ions. Ions having a relatively low mass to charge ratio achieve a relatively high velocity and reach the ion detector 24 prior to ions having a relatively high mass to charge ratio.

Ions may arrive at the ion detector 24 after a time determined by their velocity and the distance travelled, which enables the mass to charge ratio of the ions to be determined. Each ion or groups of ions arriving at the detector 24 is sampled by the detector 24, and the signal from the detector 24 may be digitised using the ADC 16. A processor may then determine a value indicative of the time of flight and/or mass-to-charge ratio ("m/z") of the ion or group of ions. Data for multiple ions may be collected and combined to generate a Time of Flight ("ToF") spectrum and/or a mass spectrum.

According to various embodiments, for each ion or group of ions arriving at the detector 24, the detector 24 will produce one or more signals, which may then be digitised, e.g. by the ADC 16, and converted into time-intensity pairs, i.e. data values comprising a time-of-flight value together with an intensity value. In these embodiments, multiple such time-intensity pairs may be collected and combined to generate a Time of Flight ("ToF") spectrum and/or a mass spectrum.

Thus, according to various embodiments the Time of Flight ("ToF") mass analyser 12 is configured to cause ions to be accelerated into the field free or drift region 23 as a result of an output pulse being supplied to the acceleration electrode 14.

Figure 19:
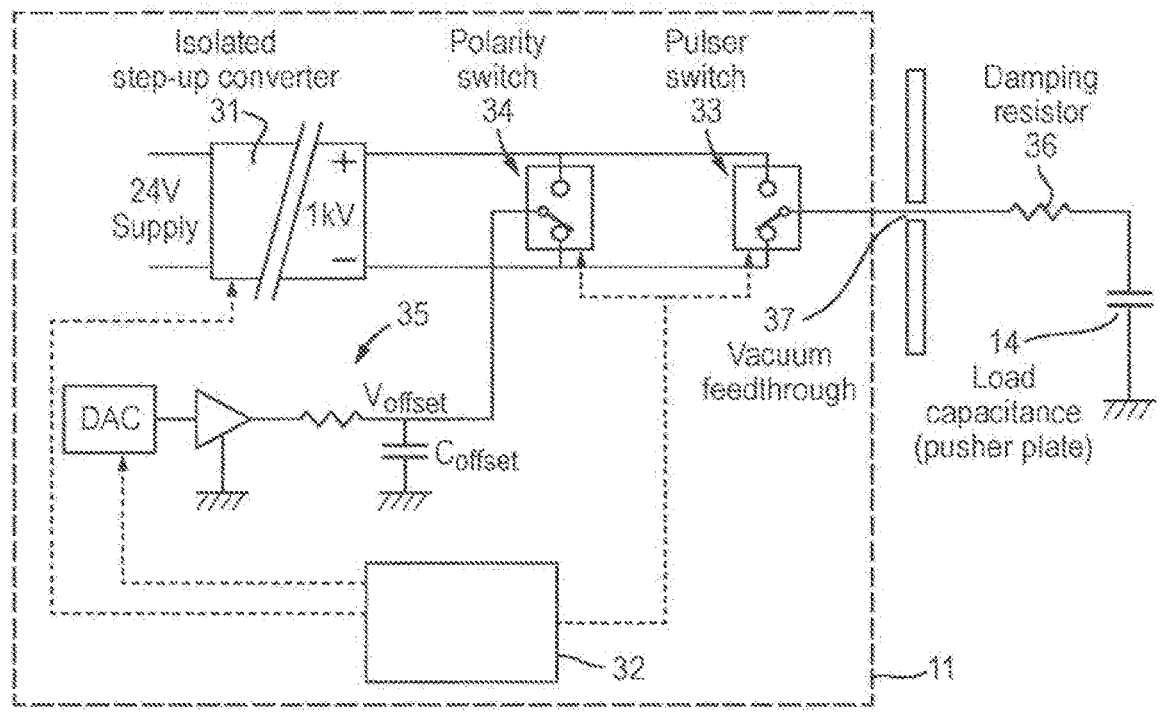
FIG. 19 shows schematically an acceleration electrode drive unit in accordance with various embodiments.

FIG. 19 is a schematic diagram of the (pusher) drive unit 11 according to various embodiments. The drive unit 11 comprises a power converter 31 (isolated step-up converter), pulsing circuitry (comprising a pulser switch 33), and control circuitry 32. FIG. 19 also shows the acceleration (pusher) electrode 14 (pusher plate) and circuitry 25 configured to supply the output pulses to the acceleration (pusher) electrode 14, which may comprise one or more damping resistors 36.

According to various embodiments, high voltage pulses of an output supplied by the power converter 31 are formed by switching a pulser switch 33 of the pulsing circuitry, and the so-formed output pulses are supplied to acceleration (pusher) electrode 14 inside a vacuum region of the "ToF" analyser 12, e.g. via a vacuum feedthrough 37. Each output pulse may generate an electric field at the acceleration (pusher) electrode 14 for accelerating (pushing) a bunch of ions into the drift region 23 of the "ToF" analyser 12, e.g. as described above. The power converter 31 may comprise any suitable power converter such as a switched mode power supply (converter) that can supply electrical power suitable for driving the acceleration (pusher) electrode 14 of the mass spectrometer 10. The power converter 31 should transfer electrical power from an input (AC or DC) source to an output load (comprising the acceleration (pusher) electrode 14).

In particular embodiments, the power converter 31 is supplied (with a DC input) by the master power supply 15 (PSU) of the mass spectrometer 10. In the embodiment illustrated in FIG. 19, the power converter 31 is supplied with a 24V DC input (from the master power supply 15 (PSU)), however other input voltages could be used.

The power converter 31 may comprise any suitable power converter topology, and should include a switching element (regulator) for (repeatedly) switching between switching states of the power converter (e.g. switched mode power supply) 31, and one or more energy storage elements, such as one or more inductors and/or capacitors, and/or one or more transformers.

Thus according to various embodiments, the switching element of the power converter 31 is repeatedly switched between switching states (ON and OFF). Thus according to various embodiments, the switching of the power converter 31 comprises repeatedly switching the switching element of the power converter 31 between switching states (ON and OFF). Such switching should enable the power converter 31 to convert input voltage and current characteristics to (different) output voltage and current characteristics.

In various particular embodiments, the power converter 31 comprises a DC-DC step-up (boost) converter that steps-up (boosts) the voltage of the DC input to a higher voltage DC output suitable for driving the acceleration (pusher) electrode 14. Thus, the power converter 31 may step-up (boost) the voltage of DC electrical power supplied by the master power supply 15 (PSU) to a higher voltage suitable for driving the acceleration (pusher) electrode 14.

In various embodiments, the power converter 31 comprises an isolated step-up (boost) DC-DC converter. In various embodiments, the power converter 31 comprises a forward converter. The forward converter may comprise any suitable forward converter topology, such as a single switch forward converter or a two-switch forward converter. The forward converter should comprise one or more (step-up) transformers and a switching element (comprising one or more switches). One or more of the one or more transformers of the forward converter may be a planar transformer.

The power converter 31 (forward converter) may also comprise suitable input and/or output (filtering) circuitry. In particular embodiments, the power converter 31 (forward converter) comprises output circuitry comprising a voltage multiplier.

In various particular such embodiments, the power converter 31 comprises a forward converter comprising a planar transformer, and output circuitry comprising a voltage multiplier. The Applicants have found that by using a voltage multiplier after the forward converter, the number of turns required in the transformer of the forward converter can be reduced, thereby enabling the use of planar magnetics in the transformer. Thus, this power supply topology provides a particularly compact and efficient power supply, that is particularly simple and inexpensive.

The output voltage supplied by the power converter 31 (forward converter) should depend on the input voltage (supplied by the master power supply 15 (PSU)) and the switching element duty cycle D. Thus, according to various embodiments, the switching element of the power converter 31 (forward converter) is repeatedly switched between switching states (ON and OFF), and the switching element duty cycle D (the fraction of time that the switching element is in the ON state) is related to the voltage step-up (boost) provided by the power converter 31 (forward converter).

Where the power converter 31 comprises a forward converter comprising a transformer, the transformer turns ratio should also be related to the voltage step-up (boost) provided by the power converter 31 (forward converter). Similarly, where the power converter 31 (forward converter) comprises an output voltage multiplier, the configuration of the voltage multiplier should also be related to the voltage step-up (boost).

The precise relationship between the above factors and voltage step-up will depend on the particular power supply topology employed. For instance, where the power converter 31 comprises a forward converter comprising a transformer, then the voltage step-up ratio will typically be directly proportional to the switching element duty cycle D and the transformer turns ratio.

Thus, according to various embodiments, the (hardware) configuration of the power converter 31 (forward converter) is chosen so as to provide a suitable voltage step-up. In various embodiments, the switching element duty cycle D is then controlled by the controller circuitry 32 for controlling the output voltage in use. In various embodiments, the switching element duty cycle D may then be controlled using suitable feedback and/or feedforward circuitry (e.g. in the controller circuitry 32) for controlling the output voltage in use.

As will be discussed further below, to facilitate synchronisation of the switching of the switching element of the power converter 31 (forward converter) with the formation of the output pulses, in the manner of various embodiments described herein, the configuration of the power converter 31 (forward converter) may also depend on the (range of) output pulse (push) frequencies with which the mass spectrometer 10 is configured to operate. The power converter 31 (forward converter) may be configured to have a range of switching frequencies that is substantially the same as (or overlaps with) the range of output pulse (push) frequencies with which the mass spectrometer 10 is configured to operate. The range of output pulse (push) frequencies with which the mass spectrometer 10 is configured to operate (and so the range of switching frequencies that the power converter 31 is configured for) may be, e.g., between 1 and 100 kHz.

In the embodiment illustrated in FIG. 19, the power converter 31 (forward converter) is configured to step-up (boost) a 24V DC input to a 1 kV DC output for driving the acceleration (pusher) electrode 14. However other input and/or output voltages could be used.

The switching element (regulator) of the power converter 31 (forward converter) may be any suitable switching element for switching the (e.g. switched mode power supply) power converter 31. The switching element of the power converter 31 may comprise one or more semiconductor switches, such as one or more transistor switches, such as one or more field-effect transistors (FETs), such as one or more metal-oxide-semiconductor field-effect transistors (MOSFETs). A (and each) such semiconductor switch (FET) may comprise one or more gate electrodes, wherein application of a suitable gate voltage to the one or more gate electrodes may cause the semiconductor switch (FET) to switch (between switching states (ON and OFF)).

Thus, according to various embodiments, the switching of the switching element of the power converter 31 (forward converter) is caused by applying a gate (voltage) pulse to a gate electrode of the (semiconductor) switching element (FET). As will be described in more detail below, the timing and duty cycle of such gate pulses may be controlled by the control circuitry 32.

A resistor-capacitor snubber network may be connected across the drain and source of the (semiconductor) switching element (FET) so as to reduce high frequency oscillations.

The pulsing circuitry may comprise any suitable circuitry that can form pulses of an output of the power converter 31 (forward converter) suitable for driving the acceleration (pusher) electrode 14.

In various embodiments, such as the embodiment illustrated in FIG. 19, the pulsing circuitry may comprise a pulser switch 33, wherein an output pulse is formed by pulsing the pulser switch 33 (by switching the pulser switch 33 from an OFF state to an ON state, and then back to an OFF state). The pulsing circuitry may form a series of plural such output pulses (by pulsing the pulser switch 33) at the output pulse (push) frequency $f_{pulse}$ (and with an output pulse (push) period $T_{pulse}$).

According to various embodiments, such as the embodiment illustrated in FIG. 19, the pulsing circuitry may further comprise polarity circuitry that may comprise a polarity switch 34. The polarity circuitry may be configured so as to enable selection of the polarity of the output pulses, e.g. the polarity switch 34 may be switchable to select the polarity of the output pulses. Thus, the polarity circuitry (and the polarity switch 34) may cause the output pulses to be formed with a particular voltage polarity (positive or negative). As illustrated in FIG. 19, the polarity circuitry (and the polarity switch 34) (and so the polarity of the output pulses) may be controlled by the control circuitry 32.

It will be appreciated that the polarity of an output pulse will typically be selected (by switching the polarity switch 34 (under the control of the control circuitry 32)) to have the same polarity as ions that are to be pushed by the pusher electrode 14, so as to generate an electric field at the pusher electrode 14 which acts to accelerate (push) the ions away from the electrode 14 and into the flight region 23 of the "ToF" analyser 12.

Where the (puller) drive unit 11 drives a puller electrode, however, then the polarity of an output pulse will typically be selected (by switching the polarity switch 34 (under the control of the control circuitry 32)) to have the opposite polarity as ions that are to be accelerated (pulled) by the puller electrode.

According to various embodiments, such as the embodiment illustrated in FIG. 19, the pulsing circuitry may further comprise offset circuitry 35. The offset circuitry 35 may be configured to apply an offset voltage, $V_{offset}$, to the output pulses (with respect to the (floating) ground (chassis potential) of the (pusher) drive unit 11). Thus, the offset circuitry 35 may cause the output pulses to be generated with respect to the offset voltage, $V_{offset}$. As illustrated in FIG. 19, the offset circuitry 35 (and so the applied offset voltage, $V_{offset}$) may be controlled by the control circuitry 32, e.g. via a digital to analogue converter (DAC).

The offset voltage $V_{offset}$ may be selected as desired. The offset voltage $V_{offset}$ may be chosen to be close to the (floating) ground (chassis potential) of the (pusher) drive unit 11. The polarity of the offset voltage may be chosen so as to be the opposite of the polarity of the output pulses. Alternatively, the polarity of the offset voltage may be chosen so as to be the same as the polarity of the output pulses. Alternatively, the polarity of the offset voltage may independent of the polarity of the output pulses. According to various embodiments, the offset voltage is selected so as to improve ion beam steering.

FIG. 19 shows an embodiment in which the polarity switch 34 is in a positive ion mode (in the case that the drive unit 11 is a pusher drive unit), wherein the polarity switch 34 is switched such that the negative terminal of the switched mode power supply 31 is connected to the offset voltage $V_{offset}$ provided by the offset circuitry 35. In a negative ion mode (in the case that the drive unit 11 is a pusher drive unit), the polarity switch 34 would be switched such that the positive terminal of the switched mode power supply 31 would be connected to the offset voltage $V_{offset}$. It should be noted that in the embodiment illustrated in FIG. 19, the polarity of the offset voltage, $V_{offset}$, is independent of the ion mode, however, as discussed above, this need not be the case.

Thus, according to various embodiments, the pulsing circuitry of the (pusher) drive unit 11 comprises one or more switches, such as the pulser switch 33 and/or the polarity switch 34. A (and each) such switch may comprise one or more semiconductor switches, such as one or more transistor switches, such as one or more field-effect transistors (FETs), such as one or more metal-oxide-semiconductor field-effect transistors (MOSFETs). A (and each) such semiconductor switch (FET) should comprise one or more gate electrodes, wherein application of a suitable gate voltage to the one or more gate electrodes will cause the semiconductor switch (FET) to switch.

In various particular embodiments (such as the embodiment illustrated in FIG. 19), a (and each) switch of the pulsing circuitry (the pulser switch 33 and/or the polarity switch 34) comprises a (high-voltage) changeover switch. In such embodiments, an output pulse may be generated by the pulser switch 33 changing over from one terminal of the switched mode power supply 31 (e.g. the negative terminal) to the other terminal (e.g. the positive terminal), and then back to the original terminal (e.g. the negative terminal).

A (and each) (high-voltage) changeover switch of the pulsing circuitry (the pulser switch 33 and/or the polarity switch 34) should comprise two ON/OFF switches: one for pulling up and one for pulling down. Each such ON/OFF switch may comprise one or more semiconductor switches (FETs) in series. Each such semiconductor switch (FET) may be protected using one or more transient suppression diodes. The transient suppression diodes may also be configured to protect the (pusher) drive unit 11 from discharges (sparking) in the "ToF" analyser 12.

According to embodiments, each ON/OFF switch of the pulsing circuitry (the pulser switch 33 and/or the polarity switch 34) comprises one or more semiconductor switches (FETs) in series, and the gate electrodes of the one or more semiconductor switches (FETs) in series of an ON/OFF switch are driven using a transformer. The transformer for an (and each) ON/OFF switch may comprise a primary winding and, for each of the one or more semiconductor switches (FETs) in series of the (respective) ON/OFF switch, a secondary winding.

The Applicants have found that the use of such a transformer can help to ensure that the one or more semiconductor switches (FETs) in an ON/OFF switch operate as close to simultaneously as possible. Furthermore, transformers are capable of producing large pulses of current which can cause fast switching of the semiconductor switches (FETs). As such, this arrangement can help to avoid output kinks, for example when the pulser switch 33 is changed over (switched). This can help to ensure that the pulsing circuitry forms uniformly shaped output pulses, for example.

A (and each) transformer of the pulsing circuitry may be a planar transformer comprising planar magnetics. This may help to reduce manufacturing costs, for example.

According to various embodiments, the various switches of the pulser circuitry (such as the pulser switch 33 and/or the polarity switch 34) may each be controlled by the control circuitry 32. Thus, a (and each) ON/OFF switch of the pulsing circuitry may be controlled by the control circuitry 32. This may be achieved by the control circuitry 32 causing suitable gate pulses to be applied to gate electrodes of the (semiconductor) switches (FETs). Top-up pulses may be applied to the switches (FETs) so as to hold the switches in an ON (or OFF) state.

Thus, according to various embodiments, the control circuitry 32 causes the pulsing circuitry (pulser switch 33) (to pulse (changeover)) to form the output pulses. The control circuitry 32 may cause the pulsing circuitry to form an output pulse by generating timing signals for causing switches (FETs) of the pulsing circuitry (pulser switch 33) to switch (pulse), e.g. in the manner described below.

Thus, the (pulsing of the) pulsing circuitry (comprising the pulser switch 33) (and so the formation of the output pulses) may be controlled by the control circuitry 32. The control circuitry 32 may in turn be controlled by the master controller 13.

According to various embodiments, the (pusher) drive unit 11 may form pulses synchronised with an external trigger (provided by the master controller 13). Alternatively, the (pusher) drive unit 11 may operate in a "free-running" mode of operation, in which the (controller 32 of the) drive unit 11 itself determines when to form output pulses.

According to various embodiments, when the (pusher) drive unit 11 is not forming output pulses, the (pusher) drive unit 11 may be operated in a "stand-by" mode of operation, in which the power converter 31 (forward converter) is continually operated (by supplying gate pulses to the switching element of the power converter 31 (forward converter)) in substantially the same manner as it would be if output pulses were being generated. This may help to avoid warm up transients.

The (controller 32 of the) drive unit 11 may enter the "stand-by" mode when the (controller 32 of the) drive unit 11 determines that no trigger signals have been received within a certain time period. The drive unit 11 may exit the "stand-by" mode when the (controller 32 of the) drive unit 11 determines that a trigger has been received (from the master controller 13).

According to various embodiments, the acceleration (pusher) electrode 14 may be a single plate, or a plate stack. The acceleration (pusher) electrode 14 may be electrically floating. Thus, the DC load due to the acceleration (pusher) electrode 14 may be zero, and the AC load due to the acceleration (pusher) electrode 14 may be the stray capacitance between the (pusher) electrode 14 and the surrounding chassis. Output pulses of current may flow through the chassis and the (relatively large) capacitor, $C_{offset}$, of the offset voltage buffer of the offset circuitry 35.

The capacitance in the interconnecting wiring between drive unit 11 and the acceleration (pusher) electrode 14 may be minimised by minimising the path length between the drive unit 11 and the acceleration (pusher) electrode 14, and additionally or alternatively by avoiding the use of coaxial cabling.

The damping resistor 36 may control overshoot on the output voltage pulse waveform. Additional damping resistance may be provided in the drive unit 11, and/or in a pulse shaping network of the pulsing circuitry (pulser switch 33).

Figure 20:
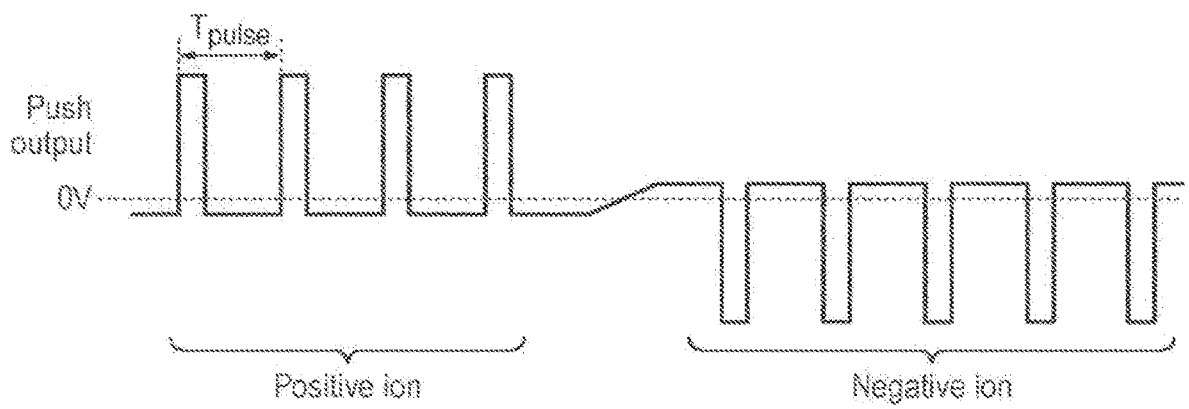
FIG. 20 shows schematically output pulses generated by an acceleration electrode drive unit in accordance with various embodiments.

FIG. 20 shows output pulses generated by the (pusher) drive unit 11 according to various embodiments. The output pulses may be any suitable pulses that can drive the acceleration (pusher) electrode 14 of the mass spectrometer 10. As illustrated in FIG. 20, in particular embodiments, the output pulses are substantially square wave voltage (amplitude) pulses. It will be appreciated that FIG. 20 does not show any output ripple or kinks that may be present. Other pulse shapes could be used.

As already mentioned, the drive unit 11 may be operable to generate pulses of the same polarity as ions that are to be pushed (and/or the opposite polarity as ions that are to be pulled). Thus, as illustrated in FIG. 20, in a positive ion mode, the pusher drive unit 11 may be operable to generate positive polarity voltage square wave pulses, while in a negative ion mode, the pusher drive unit 11 may be operable to generate negative polarity voltage square wave pulses.

FIG. 20 also illustrates how the (pusher) drive unit 11 may generate pulses with respect to the offset voltage $V_{offset}$, e.g. for ion beam steering purposes. FIG. 20 illustrates an offset voltage $V_{offset}$ of opposite polarity to ion polarity; however as mentioned above, (the offset circuitry 35 of) the (pusher) drive unit 11 may also provide an offset voltage $V_{offset}$ of the same polarity as ion polarity, or an offset voltage that is independent of ion polarity, or indeed no offset at all.

The voltage amplitude of an output pulse may be any voltage suitable for driving the acceleration electrode 14. It will be appreciated that the voltage of an output pulse will typically be (substantially) the same as the voltage of the output of the power converter 31 (forward converter). The (peak) voltage amplitude of an output pulse (and the voltage amplitude of the output of the power converter 31 (forward converter)) may be selected from the group consisting of: (i) <600V; (ii) 600V to 700V; (iii) 700V to 800V; (iv) 800V to 900V; (v) 900V to 1000V; (vi) 1000V to 1100V; and (vii) >1100V. The polarity of an output pulse may be positive or negative.

According to various particular embodiments, the (peak) voltage amplitude of an output pulse is selectable to be any voltage between approximately 600V to 1100V. For example, the (peak) voltage of an output pulse may be (±) 1 kV.

The offset voltage $V_{offset}$ may be any suitable voltage. The offset voltage $V_{offset}$ may be selected from the group consisting of: (i) <−10V; (ii) −10V to −5V; (iii) −5V to 0V; (iv) 0V to 5V; (v) 5V to 10V; and (vi) >10V.

As already mentioned, the (pusher) drive unit 11 may generate plural output pulses at a pulse (push) frequency $f_{pulse}$, and with period $T_{pulse}$. The pulse (push) period $T_{pulse}$ may be between 1 s and 100 µs. The pulse (push) period $T_{pulse}$ may be selected from the group consisting of: (i) <1 µs; (ii) 1 µs to 2 µs; (iii) 2 µs to 10 µs; (iv) 10 µs to 20 µs; (v) 20 µs to 50 µs; (vi) 50 µs to 70 µs; (vii) 70 µs to 85 µs; (viii) 85 µs to 100 µs; and (ix) >100 µs. Typical pulse periods, $T_{pulse}$, may be between 20 µs and 50 µs. The power converter 31 may accordingly be configured to be switchable at the same (corresponding) frequencies.

Figure 21:
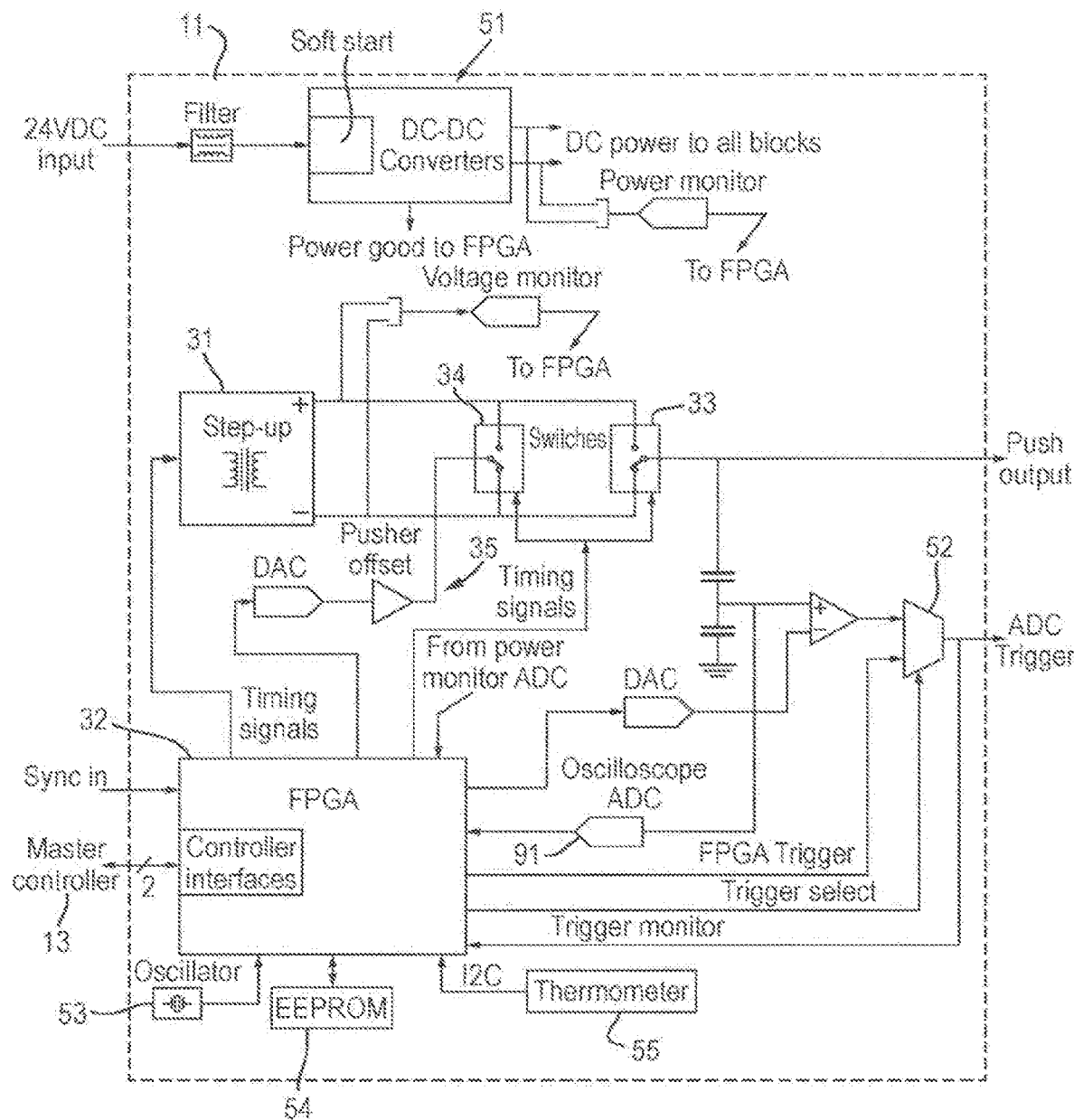
FIG. 21 shows schematically an acceleration electrode drive unit in accordance with various embodiments.

FIG. 21 shows a block diagram of the (pusher) drive unit 11 in more detail according to various embodiments, comprising the power converter 31 (step-up converter), the control circuitry 32 (FPGA), the pulsing circuitry (comprising the pulser switch 33), the polarity circuitry (comprising the polarity switch 34), and the offset circuitry 35.

As shown in FIG. 21, electrical power (supplied by the master power supply 15) may be appropriately filtered and passed through a soft start circuit 51 (and fuse) before being supplied to the power converter 31. Power to other components of the (pusher) drive unit 11 may also be supplied via the soft start circuit 51 (and fuse).

As illustrated in FIG. 21, the (pusher) drive unit 11 may also comprise ADC trigger circuitry 52. The ADC trigger circuitry 52 may be configured to generate an ADC trigger signal synchronised with an output pulse for triggering the ADC unit 16 to start recording a signal from the detector 24 of the "ToF" analyser 12 in synchronisation with the output pulse generated by the (pusher) drive unit 11, e.g. as described above.

The control circuitry 32 may be any suitable circuitry and may be configured to synchronise switching of the switching element of the power converter 31 with formation of output pulses by the pulsing circuitry (by pulsing of the pulser switch 33).

The controller 32 of the (pusher) drive unit 11 may control the power converter 31. The controller 32 of the (pusher) drive unit 11 may (also or instead) control the other components of the (pusher) drive unit 11, such as the pulsing circuitry (the pulser switch 33) and/or the polarity circuitry (the polarity switch 34) and/or the offset circuitry 35 and/or the ADC trigger circuitry 52.

The controller 32 of the (pusher) drive unit 11 may in turn be controlled by the master controller 13 of the mass spectrometer 10. As illustrated in FIG. 21, instructions and/or (configuration) parameters from the master controller 13 may be stored in a memory 54 (EEPROM) accessible by the controller 32, and the controller 32 may operate in accordance with those instructions and/or (configuration) parameters.

A thermometer 55 may be used to monitor the temperature of the (pusher) drive unit 11 so as to ensure stable operation of the controller 32 and (pusher) drive unit 11. Cooling of the drive unit 11 (e.g. by fans) may be controlled based on temperature readings from the thermometer 55.

As discussed above, by synchronising the switching of the switching element of the power converter 31 (forward converter) with the formation of the output pulses by the pulsing circuitry (pulser switch 33), the (pusher) drive unit 11 can generate (more) uniformly shaped output pulses since any ripple on the output of the power converter 31 should have substantially the same effect on the shape of each output pulse, since each pulse should always occur at the same point in the ripple (and switching) cycle.

The controller 32 may synchronise the switching of the switching element of the power converter 31 with the formation of the output pulses in any suitable manner, e.g. by the use of a suitable feedback and/or feedforward mechanism. In various particular embodiments, the controller 32 controls the pulsing circuitry (pulser switch 33) and controls the power converter 31 (forward converter) to switch (pulse) in synchronisation with each other.

In various particular embodiments, such as the embodiment illustrated in FIG. 21, this is achieved by the controller 32 sending suitable (synchronised) timing signals to the power converter 31 (forward converter) and to the pulsing circuitry (comprising the pulser switch 33). As shown in FIG. 21, the controller 32 may generate these timing signals based on the same clock signal, which may be based on oscillations of a single oscillator 53.

The Applicants have recognised that controlling the switching of the switching element of the power converter 31 and formation of the output pulses by the pulsing circuitry based on the same clock signal enables a high degree of synchronisation between the switching of the switching element of the power converter 31 and the formation of the output pulses by the pulsing circuitry, e.g. to within the time resolution of the clock signal. This improves pulse shape uniformity.

The controller 32 may synchronise the switching of the switching element of the power converter 31 with the formation of the output pulses by (the timing signals) causing gate pulses to be applied to a gate electrode of the switching element in synchronisation with the formation of output pulses by the pulsing circuitry. Thus, a gate pulse may be applied to the gate electrode of the switching element to cause the power converter 31 to switch in synchronisation with a changeover of the pulser switch 33.

Figure 22:
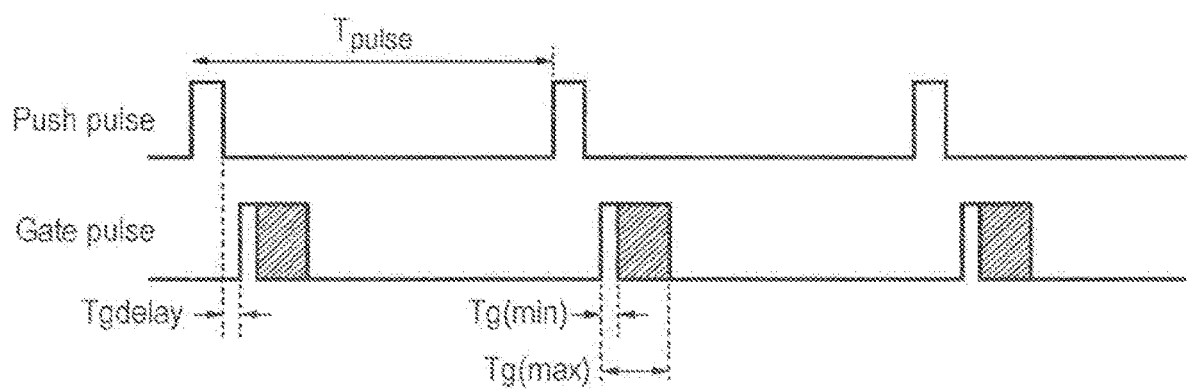
FIG. 22 shows schematically synchronisation between output pulses generated by an acceleration electrode drive unit and gate pulses for switching a switching element of the acceleration electrode drive unit, in accordance with various embodiments.

For example, FIG. 22 shows a series of output pulses (push pulses) formed by (pulsing the pulser switch 33 of) the pulsing circuitry with period $T_{pulse}$. FIG. 22 also illustrates the relative timings of a series of gate pulses applied to a gate electrode of the switching element of the power converter 31 (forward converter) to cause switching (pulsing) of the power converter 31 (forward converter) in synchronisation with the output pulses. Each gate pulse may cause the power converter 31 (forward converter) to switch from an OFF state to an ON state, and then back to an OFF state.

As shown in FIG. 22, the controller 32 may synchronise each gate pulse with an output pulse such that each gate pulse begins after a predetermined time delay, $T_{gdelay}$, following an output pulse. Thus, the controller 32 may cause a gate pulse to be generated (applied) $T_{gdelay}$ after a changeover of the pulser switch 33.

In the illustrated embodiment, each gate pulse is synchronised with the trailing edge of an output pulse, and so begins after a time $T_{gdelay}$ following the trailing edge of an output pulse (and the associated changeover of the pulser switch 33). It will be appreciated, however, that it would also be possible for a gate pulse to be synchronised with a different point on the output pulse waveform, such as the leading edge or middle of the output pulse, or a point in between output pulses. Thus, for example, the parameter $T_{gdelay}$ may alternatively be defined with respect to the leading edge of an output pulse. The difference between synchronisation with leading or trailing edges of output pulses may become significant where output pulse width can vary.

It will also be appreciated that it is possible for each gate pulse to begin before, at the same time as, during, or after an output pulse. Thus, the time delay parameter, $T_{gdelay}$, may be selected to have a positive value, or a negative value (or to be zero), as desired.

According to various embodiments, the time delay between the trailing edge of an output pulse and the beginning of a gate pulse, $T_{gdelay}$, is selected from the group consisting of: (i) <0 ns; (ii) 0 ns to 50 ns; (iii) 50 ns to 100 ns; (iv) 100 ns to 1 µs; (v) 1 µs to 10 µs; (vi) 10 µs to 50 µs; (vii) 50 µs to 85 µs; (viii) 85 µs to 100 µs; and (ix) >100 µs. Typically, $T_{gdelay}$ may be constrained to lie between zero and the output pulse period $T_{pulse}$. A typical value of $T_{gdelay}$ may be 100 ns. According to various embodiments, the tolerance on $T_{gdelay}$ is ±100 ns.

Thus, according to various embodiments, the controller 32 synchronises the switching of the power converter 31 (forward converter) with the formation of the output pulses by controlling the phase between the output pulse waveform and the gate pulse waveform to be a particular fixed, e.g. selected, e.g. predetermined, value ($T_{gdelay}$).

The start of an output pulse (and the associated changeover of the pulser switch 33) may be used as the reference for all the other events in the controller 32, so the controller 32 may determine the start of a gate pulse with respect to the start of the output pulse, based on the width of the output pulse, and the time delay parameter between the trailing edge of the output pulse and the beginning of the gate pulse, $T_{gdelay}$.

As shown in FIG. 22, according to various embodiments, the gate pulse period, $T_{switch}$, may be controlled (by the controller 32) to be (substantially) equal to the output pulse period, $T_{pulse}$. Thus, according to various embodiments, such as the embodiment illustrated in FIG. 22, each output pulse may be associated with a corresponding (single) gate pulse.

However, it would also be possible, for example, for the switching of the switching element of the power converter 31 to be synchronised with the formation of the output pulses such that the frequency (or period) of switching of the switching element of the power converter 31 is equal to an integer times the frequency, $f_{pulse}$, (or period, $T_{pulse}$) of the formation of the output pulses.

Thus, during each acceleration (push) period, $T_{pulse}$, the switching element of the power converter 31 may be switched (and a gate pulse may be generated) any suitable integer number of times, n, such as (n=) 1, 2 or more. It will be appreciated that such embodiments can generate uniformly shaped output pulses since any ripple on the output of the power converter 31 should still have substantially the same effect on the shape of each output pulse.

According to various embodiments, the time delay between (the trailing edge of) an output pulse and (the beginning of) a gate pulse, $T_{gdelay}$, is selected to ensure that each gate pulse (and the switching of the switching element of the power converter 31) occurs at a point in the pulse (push) period before any ions have arrived at the detector 24. The Applicants have recognised that the ion detection system will typically ignore the detector 24 output for a short period of time after an output pulse, so any noise transients generated during this period will be ignored. Such noise transients can be generated by coupling of the output pulses through the detector 24.

Thus, in various particular embodiments, a gate pulse is generated (and applied) shortly after an output pulse. Thus, in various particular embodiments the ratio between the time delay parameter, $T_{gdelay}$, and the output pulse period, $T_{pulse}$, $T_{gdelay}/T_{pulse}$ is selected from the group consisting of: (i) <0.001%; (ii) 0.001% to 0.01%; (iii) 0.01% to 0.1%; (iv) 0.1% to 0.5%; (v) 0.5% to 1%; (vi) 1% to 10%; and (vii) >10%.

As already mentioned, the voltage step-up provided by the power converter 31 (forward converter) may depend on the duty cycle D of the switching element of the power converter 31 (forward converter) (i.e. the fraction of time that the switching element is in the ON state). The voltage step-up provided by the power converter 31 may accordingly depend on the duty cycle D of the gate pulse waveform. Thus, according to various embodiments, the controller 32 causes the width of gate pulses to be varied to control the voltage of the output of the power converter 31 (forward converter).

As illustrated in FIG. 22, the gate pulse width may be constrained to lie within a suitable range, $T_{g(min)}$ to $T_{g(max)}$. $T_{g(min)}$ will be less than $T_{g(max)}$ but may otherwise be selected from the group consisting of: (i) 0 µs; (ii) 0 µs to 1 µs; (iii) 1 µs to 2 µs; (iv) 2 µs to 3 µs; (v) 3 µs to 4 µs; (vi) 4 µs to 5 µs; (vii) 5 µs to 6 µs; (viii) 6 µs to 7 µs; (ix) 7 µs to 8 µs; (x) >8 µs. A typical value of $T_{g(min)}$ may be 0 µs.

$T_{g(max)}$ will be greater than $T_{g(min)}$ but may otherwise be selected from the group consisting of: (i) <1 µs; (ii) 1 µs to 2 µs; (iii) 2 µs to 3 µs; (iv) 3 µs to 4 µs; (v) 4 µs to 5 µs; (vi) 5 µs to 6 µs; (vii) 6 µs to 7 µs; (viii) 7 µs to 8 µs; (ix) >8 µs. A typical value of $T_{g(max)}$ may be 7.65 µs.

Thus according to various embodiments, the width of a gate pulse may be selected from the group consisting of: (i) <1 µs; (ii) 1 µs to 3 µs; (iii) 3 µs to 5 µs; (iv) 5 µs to 7 µs; (v) 7 µs to 8 µs; and (vi) >8 µs.

Figure 23A:
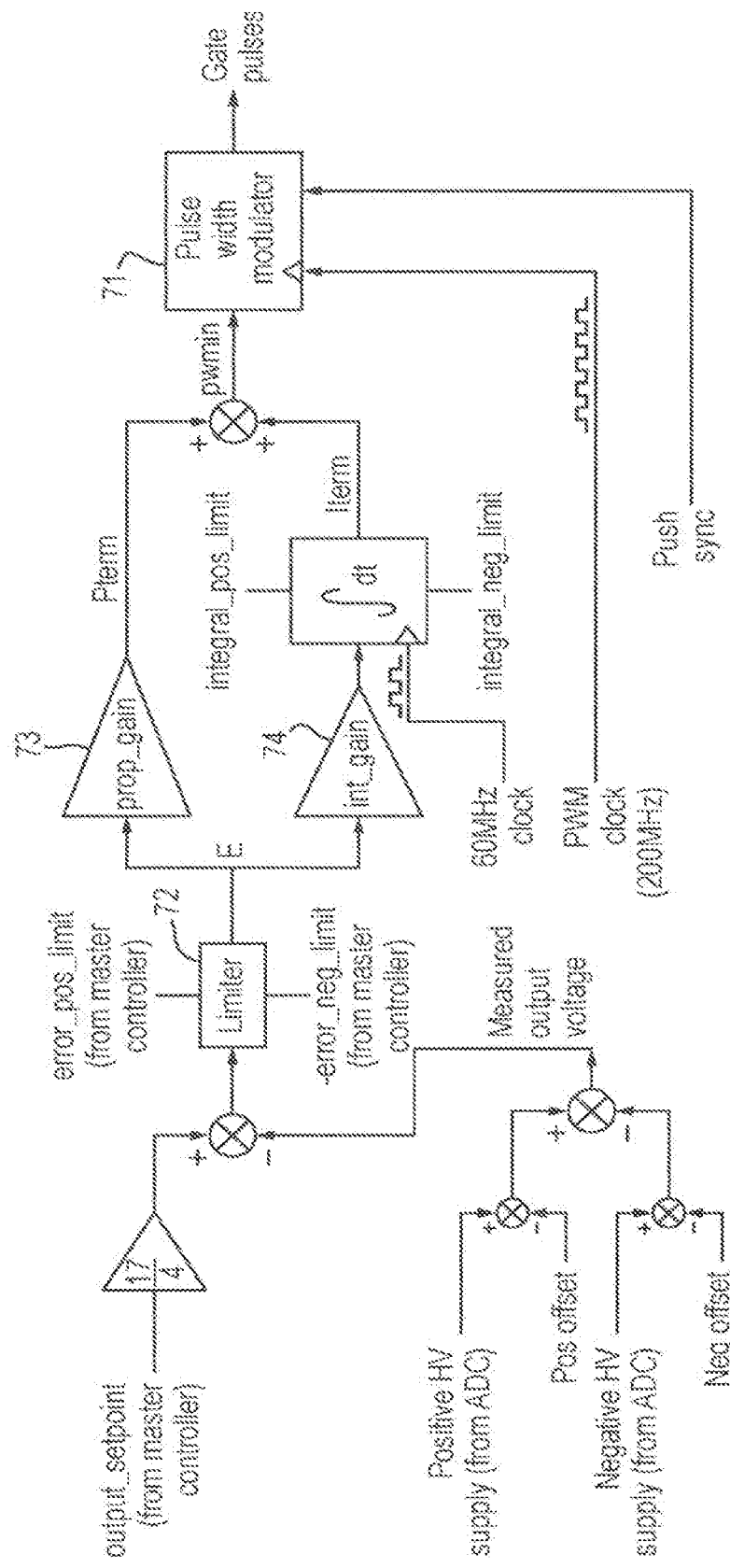
FIG. 23A shows schematically feedback circuitry for controlling an output voltage of an acceleration electrode drive unit in accordance with various embodiments.

FIG. 23A shows a block diagram of the controller 32 comprising feedback circuitry for controlling the voltage of the output of the power converter 31 (forward converter), according to various embodiments.

As shown in FIG. 23A, the controller 32 may comprise a pulse width modulator (PWM) 71 configured to generate the gate pulses for applying to the gate electrode of the switching element of the power converter 31 (forward converter). The PWM 71 may convert a control signal, pwmin, into output gate pulses having widths that are proportional to pwmin. The so-generated gate pulses may then be applied to the gate electrode of the switching element of the power converter 31 (forward converter), e.g. as described above.

As illustrated in FIG. 23A, a voltage setpoint may be provided by the master controller 13, and an error value E corresponding to the difference between the setpoint and a measured output voltage may be determined by the feedback circuitry. The error value E may be constrained by limiter 72 according to limits provided by the master controller 13, such as ±5V. This may help to avoid large changes. The control signal pwmin may then be determined based on proportional 73 and integral 74 gain terms.

Thus, according to various embodiments the control circuitry 32 comprises feedback circuitry configured to control the voltage of the output of the power converter 31. The feedback circuitry may be configured to do this by controlling the width of the gate pulses based on an output voltage feedback signal.

As shown in FIG. 23A, each gate pulse output by PWM 71 may be synchronised with an output pulse based on a timing signal, push sync.

The PWM may be run at a high clock frequency (e.g. 200 MHz), so that the width of the generated gate pulses has a high resolution (e.g. 5 ns). Simulations have shown that such high time resolution helps to limit ripple on the output pulse shape to acceptable levels. Thus, according to various embodiments, the feedback circuitry is operable to control the width of the gate pulses with a resolution selected from the group consisting of: (i) <1 ns; (ii) 1 ns to 5 ns; (iii) 5 ns to 10 ns; (iv) 10 ns to 20 ns; and (v) >10 ns.

The controller 32 may be implemented as desired, e.g. as a suitable microprocessor system. In various particular embodiments, such as the embodiment illustrated in FIG. 21, the controller 32 is implemented in a field-programmable gate array (FPGA).

The Applicants have found that using a FPGA rather than, e.g. an external chip, means that the controller 32 can generate a wide range of switching frequencies in a stable manner. Furthermore, implementing the controller 32 in FPGA allows the feedback circuitry to implement proportional and integral gain terms that can be varied with gate pulse frequency.

The controller 32 may be isolated from the power converter 31, e.g. using a high-speed opto-coupler, e.g. to ensure that the input power supplied to the power converter 31 does not return via the drive unit 11 chassis.

Figure 23B:
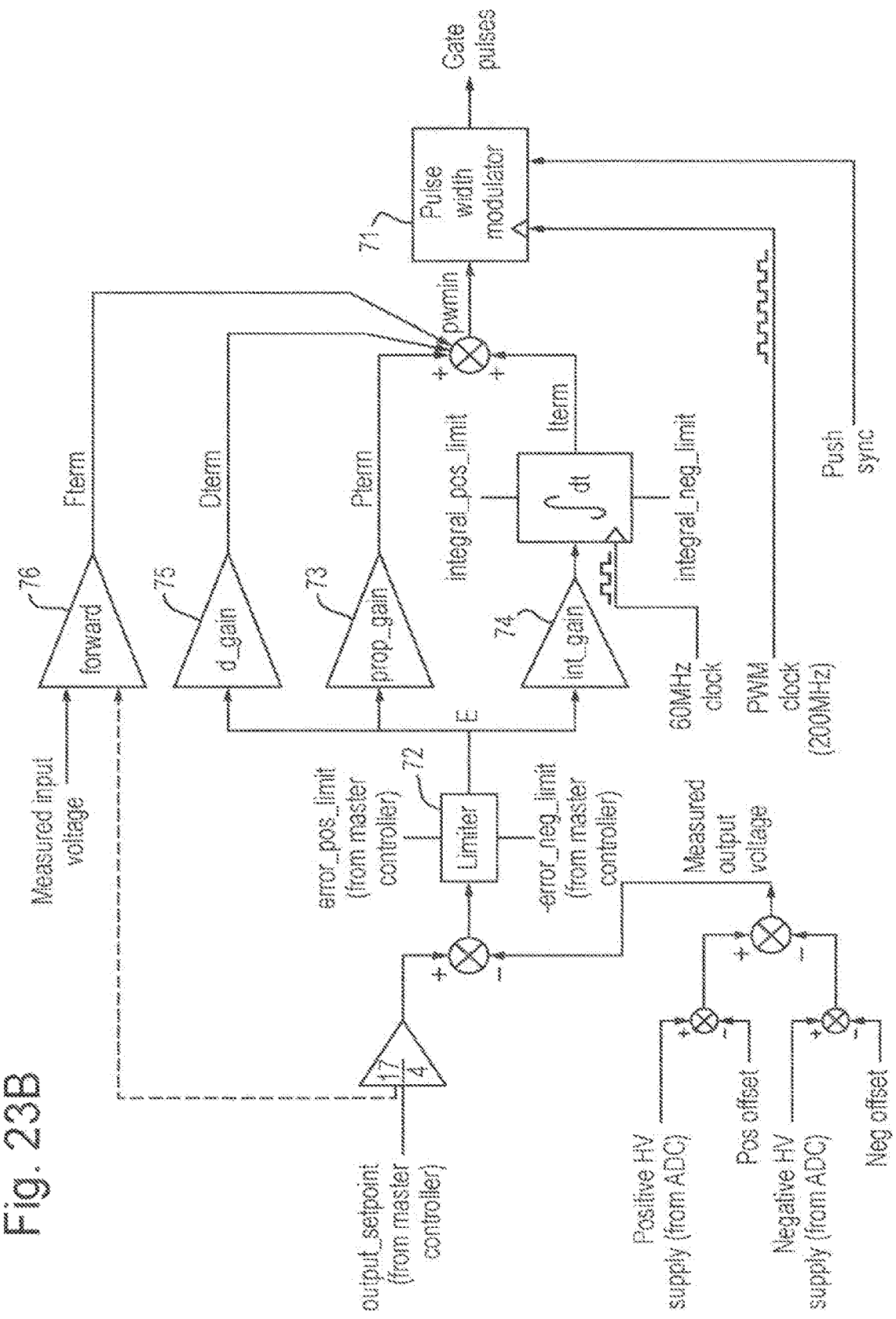
FIG. 23B shows schematically circuitry for controlling an output voltage of an acceleration electrode drive unit in accordance with various embodiments.

FIG. 23B shows a block diagram of the controller 32 comprising circuitry for controlling the voltage of the output of the power converter 31 (forward converter), according to various embodiments.

As shown in FIG. 23B, the controller 32 may comprise a pulse width modulator (PWM) 71 configured to generate gate pulses for applying to the gate electrode of the switching element of the power converter 31 (forward converter). The PWM 71 may convert a control signal, pwmin, into output gate pulses having widths that are proportional to pwmin. The so-generated gate pulses may then be applied to the gate electrode of the switching element of the power converter 31 (forward converter), e.g. as described above.

As illustrated in FIG. 23B, an output voltage set-point may be provided by the master controller 13, and a feedback error value E corresponding to the difference between the set-point and a measured output voltage may be determined by feedback circuitry. The error value E may be constrained by limiter 72 according to limits provided by the master controller 13, such as ±5V. This may help to avoid large changes. The control signal pwmin may then be determined based on one or more, or all, of proportional 73, integral 74 and derivative 75 gain terms.

As shown in FIG. 23B, the control signal pwmin is also determined based on a feedforward term 76. The feedforward term may be based on a measurement of the input DC voltage supplied to the power converter 31 by the master power supply 15.

As discussed above and illustrated in FIG. 17B, in the present embodiment, the master power supply 15 supplies (DC) power to the drive unit 11, as well as to other operational units of the mass spectrometer 10, such as heater 17. The heater may be a source heater and/or a desolvation heater, e.g. as described above. When the heater turns on or off, the load on the master power supply 15 can change abruptly, which can lead to variations on the input voltage supplied by the master power supply 15 to the drive unit 11. Similarly, changes to other operational units of the mass spectrometer 10 can affect the input voltage supplied to the drive unit 11. Such input variations can cause undesirable variations on the output of the drive unit 11.

The Applicants have recognised that while feedback terms alone would eventually correct such an output variation, this takes time. By using a feedforward term (in addition to feedback terms), the operation of the PWM 71 can be adjusted in response to an input change before the output has been adversely affected. Accordingly, line regulation can be improved.

Additionally or alternatively, a feedforward term can be based on an operational parameter. In this case, a feedforward term can be used to provide a predicted correction to the PWM 71 before the output has been adversely affected.

For example, as shown in FIG. 23B, a feedforward term can be based on the output voltage set-point provided by the master controller 13. In this case, a step change or a continuous (e.g. ramping) change to the output voltage set-point can be fed forward to adjust the PWM 71 accordingly.

Similarly, a feedforward term can be based on a change to the output voltage polarity. Such changes can occur, for example, when a change in ion mode (between positive ion and negative ion detection) is required.

In another example, a feedforward term can be based on a change to the required acceleration electrode pulse period ($T_{pulse}$). Typically, the pulse period will change when the mass range of the mass spectrometer 10 is changed. As discussed above, when the pulse period ($T_{pulse}$) is synchronised with the power converter period ($T_{switch}$), such a change to the pulse period will affect the frequency of operation of the power converter 31, and so its output.

It would also be possible for a feedforward term to be based on a non-regular pulse period. In this case, using a feedforward term to compensate for the different delays between subsequent pulses may improve output stability.

It will be appreciated therefore, that the use of a feedforward term 76 can improve the stability of the output of the power converter 31 (forward converter), and so improve pulse shape uniformity of the output pulses provided by the drive unit 11, as compared to using feedback terms alone.

Thus, according to various embodiments the control circuitry 32 controls the voltage of the output of the power converter 31 by controlling the width of the gate pulses based on an input voltage feedforward signal and an output voltage feedback signal.

In various embodiments, when any of the changes described above are required, the PWM 71 may be driven at a fixed rate (or a series of different fixed rates) for a certain time period, during which normal feedback and feedforward control of the PWM 71 may be suspended. This time period may be a fixed time period, or may last until a desired output voltage has been achieved. Once the time period has been completed, the normal feedback and feedforward control of the PWM 71 may be resumed. This may help to stabilise the output in response to an input change faster than would otherwise be possible.

As shown in FIG. 23B, each gate pulse output by PWM 71 may be synchronised with an output pulse based on a timing signal, push sync.

The PWM may be run at a high clock frequency (e.g. 200 MHz), so that the width of the generated gate pulses has a high resolution (e.g. 5 ns). Simulations have shown that such high time resolution helps to limit ripple on the output pulse shape to acceptable levels. Thus, according to various embodiments, the control circuitry is operable to control the width of the gate pulses with a resolution selected from the group consisting of: (i) <1 ns; (ii) 1 ns to 5 ns; (iii) 5 ns to 10 ns; (iv) 10 ns to 20 ns; and (v) >10 ns.

The controller 32 may be implemented as desired, e.g. as a suitable microprocessor system. In various particular embodiments, such as the embodiment illustrated in FIG. 21, the controller 32 is implemented in a field-programmable gate array (FPGA).

The Applicants have found that using a FPGA rather than, e.g. an external chip, means that the controller 32 can generate a wide range of switching frequencies in a stable manner. Furthermore, implementing the controller 32 in FPGA allows the implementation of various feedback and feedforward terms that can be varied with gate pulse frequency.

The controller 32 may be isolated from the power converter 31, e.g. using a high-speed opto-coupler, e.g. to ensure that the input power supplied to the power converter 31 does not return via the drive unit 11 chassis.

Figure 24:
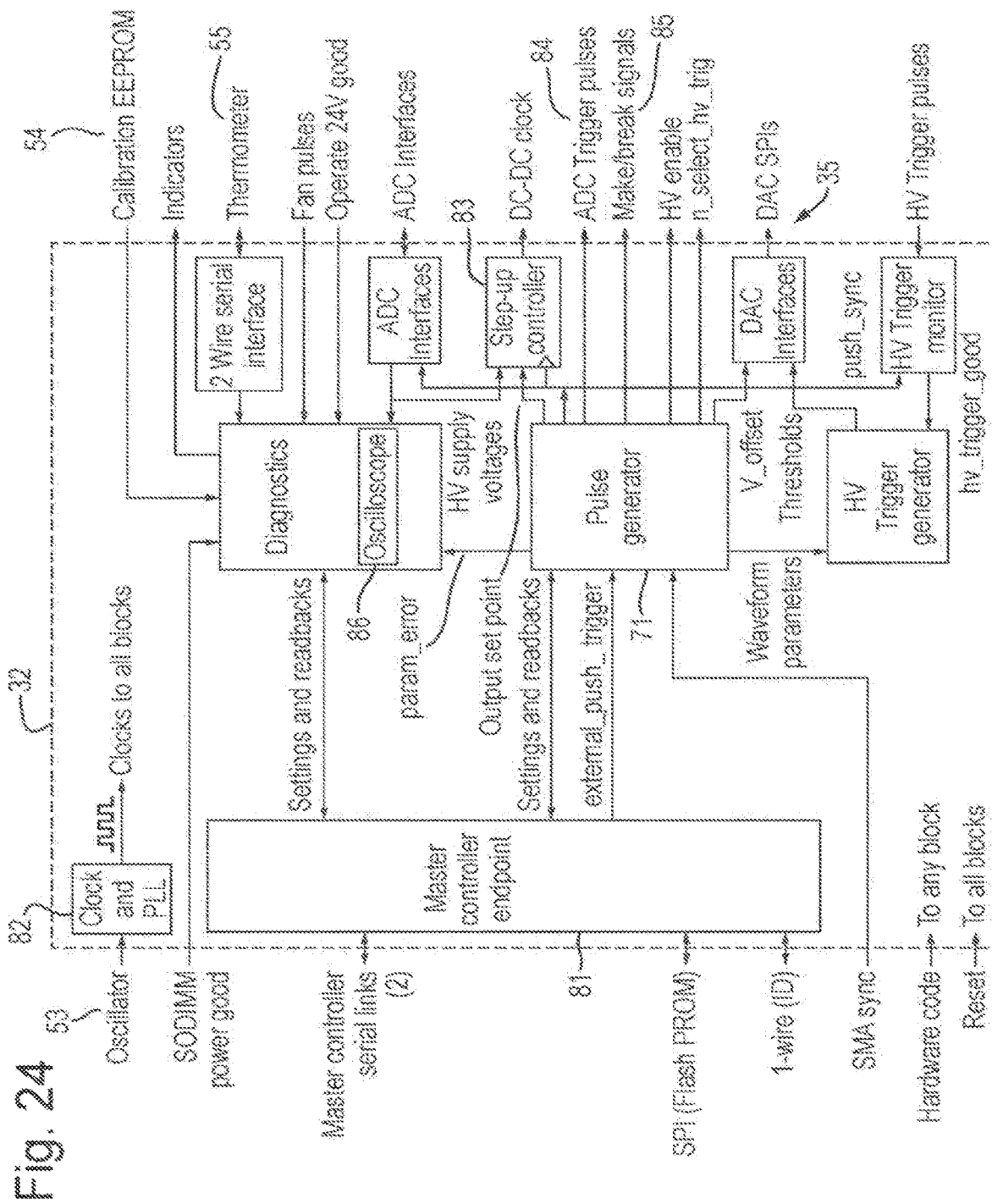
FIG. 24 shows schematically control circuitry of an acceleration electrode drive unit in accordance with various embodiments.

FIG. 24 shows a block diagram of the controller 32 in more detail comprising the pulse generator 71, according to various embodiments.

As shown in FIG. 24, the controller 32 may further comprise circuitry 81 for communicating with the master controller 13, e.g. in the manner as described above. The controller may further comprise a clock 82 for generating the clock signal, which may be controlled by the oscillator 53.

As shown in FIG. 24, according to various embodiments, the pulse generator 71 may generate gate pulses for controlling the power converter 31 via a power converter controller 83 (step-up controller), e.g. as described above.

The pulse generator 71 may also generate suitable timing signals (make/break signals 82) for controlling (the pulsing of) the pulsing circuitry by causing the pulser switch 33 to changeover. The pulse generator 71 may generate the gate pulses and the timing signals in synchronisation with each other, e.g. as described above. The pulse generator 71 may also generate suitable synchronised trigger signals 84 for triggering the ADC 16, e.g. as described above. The pulse generator 71 may use the same clock signal from the same clock 82 to generate these signals in synchronisation with each other.

As also illustrated in FIG. 24, the control circuitry 32 may also comprise diagnostics circuitry which may comprise an oscilloscope 86.

The diagnostics circuitry (e.g. oscilloscope 86) may receive samples of the output pulses generated by the (pusher) drive unit 11, e.g. as described above.

Figure 25:
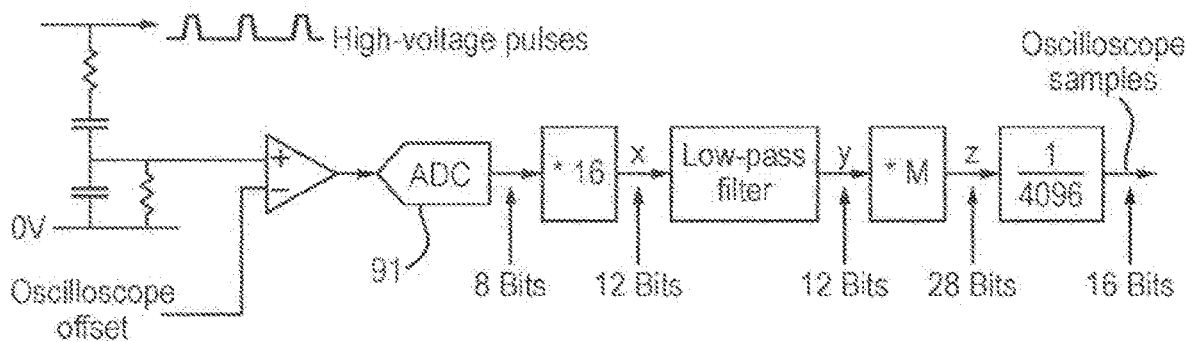
FIG. 25 shows schematically oscilloscope circuitry for monitoring an output voltage of an acceleration electrode drive unit in accordance with various embodiments.

As illustrated in FIGS. 21 and 25, this may be done via an analogue to digital converter (ADC) 91. The output waveform from the pulsing circuitry (pulser switch 33) may be AC coupled to the ADC 91 to allow waveform parameters to be measured, including, for example, peak-to-peak amplitude and rise/fall times. Other waveform characteristics that could be measured include overshoot, undershoot, droop, pre-push disturbance, and post-push disturbance, amongst others.

FIG. 25 illustrates a signal path in accordance with various embodiments in more detail. A resistor may be provided in series with a capacitive divider to damp any high-frequency oscillations. Other damping circuitry arrangements could be used. An oscilloscope offset may be derived from a DAC output (as illustrated in FIGS. 21 and 24). The offset may be calculated so that the analogue waveform is evenly spaced within the conversion range of the oscilloscope ADC 91.

The multiplier block, M (e.g., a 16-bit number), can allow the effects of component tolerances to be calibrated out. The low-pass filter block can filter high frequencies from the output, and may perform further processing, including other ways of averaging over multiple pulses.

It will be appreciated that FIG. 25 shows an example of the signal path in which each block has a specific number of bits, however other numbers of bits could be used at each block, if desired. Correspondingly, multiplication and division factors may be different to those illustrated in FIG. 25.

The ADC may be used to sample the waveform output from the pulsing circuitry (pulser switch 33). The waveform may be acquired by taking a sequence of samples from a single push (pulse). However, in order to increase the timing resolution of the sampling system, the waveform may be acquired by taking sequences of samples from more than one push (pulse). The sequences may be offset in time and the samples from the sequences interleaved so that the resulting waveform has a higher sampling rate than the converter sampling rate.

Figure 26:
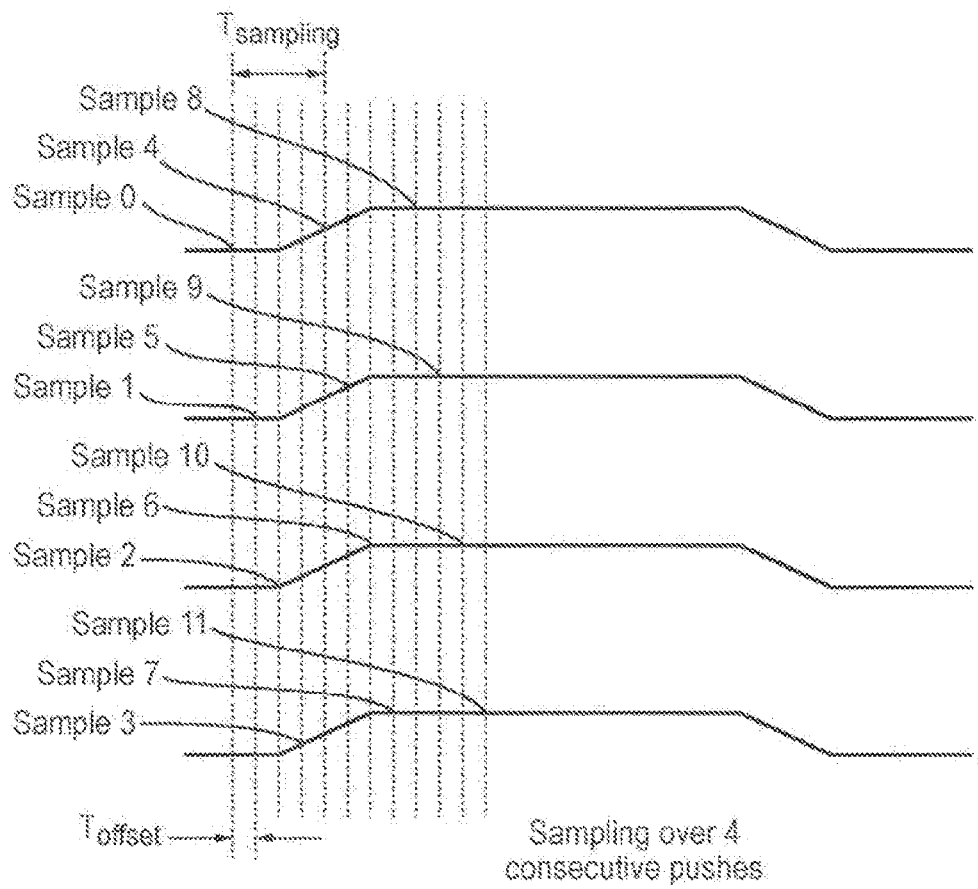
FIG. 26 shows schematically sampling plural output pulses using an oscilloscope in accordance with various embodiments.

FIG. 26 illustrates this sampling arrangement in which sequences of samples are taken from four pushes (pulses). Other numbers of pushes (pulses) could be used, such as one, two, three, or more than four. As illustrated in FIG. 26, for each sequence of samples, the waveform may be sampled periodically with period $T_{sampling}$. The sequences of samples may be offset in time with respect to each other by an offset time $T_{offset}=T_{sampling}/N$, where N is the number of sequences (pulses). For example, in the example illustrated in FIG. 26, $T_{sampling}$ is 20 ns, and $T_{offset}$ is 5 ns.

In various embodiments, the maximum pulse width may be (around) 5 µs and the minimum period may be (around) 20 µs (other arrangements would, however, be possible). In the example illustrated in FIG. 26, having a fixed sampling length of 10 µs (2000 samples at 5 ns intervals) is sufficient to include the maximum width pulses and have a significant inter-pulse capture while still retaining sufficient time from the end of the sampling to the start of the next pulse to accommodate any foreseeable jitter. Other numbers of samples and sample intervals could be used.

A complete waveform may be captured every one or more push (pulse) cycles, e.g. in the example of FIG. 26 every four push (pulse) cycles. The first full capture may be transferred to an averaged waveform. Each subsequent complete waveform may be used to refine the averaged waveform.

An averaging filter algorithm may be used as follows:

$$y_i = y_{i-1} + \frac{x_i - y_{i-1}}{2^n},$$

where $x_i$ is sixteen times the present ADC sample at point j, $y_i$ is the present filter output for point j, $y_{i-1}$ is the previous filter output for point j, and n is a damping factor. n may be, for example, 2.

The oscilloscope samples may be provided, e.g. on request, to the master controller 81 (or elsewhere). Various read back values (diagnostic parameters) may then be (automatically) calculated from these samples.

For example, as illustrated in FIG. 27, one or more or each of the following may be calculated:

1. Peak to peak pulse amplitude. This may be simply the maximum waveform value minus the minimum waveform value.

2. The rise time, e.g. from 20% to 80% or 10% to 90%, of the peak to peak amplitude.

3. The fall time, e.g. from 80% to 20% or 90% to 10%, of the peak to peak amplitude.

Various other parameters of the pulse waveform may be calculated as desired, such as parameters quantifying overshoot, undershoot, droop, pre-push disturbance, and post-push disturbance, e.g. settling time.

The calculated values may then be used and/or displayed, e.g. to facilitate a diagnostic of the pusher unit 11, e.g. to determine whether or not the pusher unit 11 is in a correct operational state.

Although various embodiments described above relate to output pulses produced by an acceleration electrode drive unit being measured by an oscilloscope, it is also possible for other changing (or static) voltages within the instrument, such as a voltage applied to an ion guide, to also or instead be measured by the oscilloscope.

Although various embodiments described above relate to operating a switching element of a power converter of an acceleration electrode drive unit in synchronisation with pulsing circuitry, it is also possible for the switching element of another mass spectrometer power converter to be operated in synchronisation with the pulsing circuitry. This can also improve the operation of the spectrometer, e.g. where the power converter in question produces a ripple. The output of the power converter may be supplied to, for example, an ion source, one or more ion guides, a detector, ion optics, and the like, of the mass spectrometer.

Although various embodiments described above relate to controlling a power converter of an acceleration electrode drive unit based on a feedforward signal, it is also possible for a power converter of another mass spectrometer operational unit to be controlled based on a feedforward signal. This can also improve the operation of the spectrometer, e.g. where a stable output of the power converter in question is desirable. The output of the power converter may be supplied to, for example, an ion source, one or more ion guides, a detector, ion optics, and the like, of the mass spectrometer.

Although the present invention has been described with reference to preferred embodiments, it will be understood by those skilled in the art that various changes in form and detail may be made without departing from the scope of the invention as set forth in the accompanying claims.

The invention claimed is:

1. A mass spectrometer comprising:
a power converter configured to convert an input voltage to an output voltage;
measuring circuitry configured to measure the input voltage; and
control circuitry configured to control the power converter based on the measured input voltage.

2. The mass spectrometer of claim 1, further comprising pulsing circuitry operable to form electrical output pulses from the output of the power converter.

3. The mass spectrometer of claim 2, further comprising:
processing circuitry configured to predict the effect of a change in a desired parameter for the electrical output pulses on the power converter output voltage; and
control circuitry configured to control the power converter based on the prediction.

4. The mass spectrometer of claim 3, wherein the parameter for the electrical output pulses comprises: (i) a voltage amplitude; (ii) a voltage polarity; (iii) a pulse period; (iv) a pulse width; and/or (v) an inter-pulse period; of the electrical output pulses.

5. The mass spectrometer of claim 2, further comprising:
a Time of Flight (ToF) mass analyser comprising an acceleration electrode;
wherein the mass spectrometer is configured such that the electrical output pulses are supplied to the acceleration electrode.

6. The mass spectrometer of claim 1, wherein the power converter comprises a step-up converter comprising a switching element.

7. The mass spectrometer of claim 6, further comprising synchronisation circuitry configured to synchronise the switching element with pulsing circuitry.

8. The mass spectrometer of claim 6, wherein:
the switching element comprises a gate electrode;
the control circuitry comprises pulse generating circuitry configured to generate gate pulses to be applied to a gate electrode of the switching element; and
the control circuitry is configured to control the power converter by controlling one or more properties of gate pulses applied to the gate electrode of the switching element.

9. The mass spectrometer of claim 8, wherein the control circuitry is configured to control the power converter based on the measured input voltage by controlling the width of the gate pulses applied to the gate electrode of the switching element.

10. The mass spectrometer of claim 8, wherein the control circuitry is configured to, in response to a change in a desired parameter for electrical output pulses, cause the pulse generating circuitry to generate gate pulses at a selected rate for a selected time period.

11. The mass spectrometer of claim 1, further comprising:
a master power supply configured to supply the input voltage to the power converter.

12. The mass spectrometer of claim 11, further comprising one or more operational units, wherein the master power supply is configured to supply electrical power to each of the one or more operational units.

13. The mass spectrometer of claim 12, wherein at least one of the one or more operational units comprises a heater.

14. The mass spectrometer of claim 1, further comprising:
measuring circuitry configured to measure the output voltage; and
control circuitry configured to control the power converter based on the measured output voltage.

15. A mass spectrometer comprising:
a power converter configured to convert an input voltage to an output voltage;
pulsing circuitry operable to form electrical output pulses from the output of the power converter;
processing circuitry configured to predict the effect of a change in a desired parameter for the electrical output pulses on the power converter output voltage; and
control circuitry configured to control the power converter based on the prediction.

16. A method of mass spectrometry comprising:
using a power converter to convert an input voltage to an output voltage;
measuring the input voltage; and
controlling the power converter based on the measured input voltage.

17. The method of claim 16, further comprising forming electrical output pulses from the output of the power converter.

18. The method of claim 17, further comprising:
predicting the effect of a change in a desired parameter for the electrical output pulses on the power converter output voltage; and
controlling the power converter based on the prediction.

19. The method of claim 17, further comprising supplying the electrical output pulses to an acceleration electrode of a Time of Flight (ToF) mass analyser.

20. The method of claim 16, wherein the power converter comprises a step-up converter comprising a switching element comprising a gate electrode; and wherein the method comprises:
controlling the power converter by controlling one or more properties of gate pulses applied to the gate electrode of the switching element.

* * * * *